United States Patent
Sato

(10) Patent No.: US 6,693,750 B2
(45) Date of Patent: Feb. 17, 2004

(54) ZOOM LENS SYSTEM

(75) Inventor: Susumu Sato, Yotsukaido (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/244,406

(22) Filed: Sep. 17, 2002

(65) Prior Publication Data

US 2003/0133200 A1 Jul. 17, 2003

(30) Foreign Application Priority Data

Sep. 19, 2001 (JP) ........................................ 2001-285414
May 27, 2002 (JP) ........................................ 2002-152632

(51) Int. Cl.$^7$ .............................................. G02B 15/14
(52) U.S. Cl. ....................................................... 359/687
(58) Field of Search ......................................... 359/687

(56) References Cited

U.S. PATENT DOCUMENTS

| | | | | |
|---|---|---|---|---|
| 4,978,205 A | 12/1990 | Sato | ........................... | 350/423 |
| 5,537,259 A | 7/1996 | Ogawa | ........................ | 359/684 |
| 5,828,490 A | 10/1998 | Sato | ........................... | 359/557 |
| 5,966,246 A | * 10/1999 | Yoshikawa | .................. | 359/686 |
| 6,282,032 B1 | * 8/2001 | Tomita | ........................ | 359/687 |

FOREIGN PATENT DOCUMENTS

| | | |
|---|---|---|
| JP | 6-51202 | 2/1994 |
| JP | 2000-19398 | 1/2000 |
| JP | 2001-356381 | 12/2001 |

OTHER PUBLICATIONS

English Abstract of Japanese patent application Laid–Open No. 7–294816, Nov. 10, 1995.
English Abstract of Japanese patent application Laid–Open No. 2–234115, Sep. 17, 1990.
English Abstract of Japanese patent application Laid–Open No. 9–325269, Dec. 16, 1997.

* cited by examiner

Primary Examiner—Scott J. Sugarman
Assistant Examiner—Darryl J. Collins
(74) Attorney, Agent, or Firm—Miles & Stockbridge P.C.

(57) ABSTRACT

A zoom lens system with superior optical performance capable of carrying out vibration reduction correction. The zoom lens system includes, in order from an object, a first lens group G1 having positive refractive power, a second lens group G2 having negative refractive power, a third lens group G3 having positive refractive power, and a fourth lens group G4 having positive refractive power. Zooming is carried out by moving the second lens group G2 and the third lens group G3 along the optical axis. The fourth lens group G4 is composed of, in order from the object, a front group G4F having positive refractive power, a middle group G4M having negative refractive power, and a rear group G4R having positive refractive power. An imaging position is varied by shifting the middle group G4M in the direction perpendicular to the optical axis resulting in vibration reduction correction.

20 Claims, 56 Drawing Sheets

FIG. 2
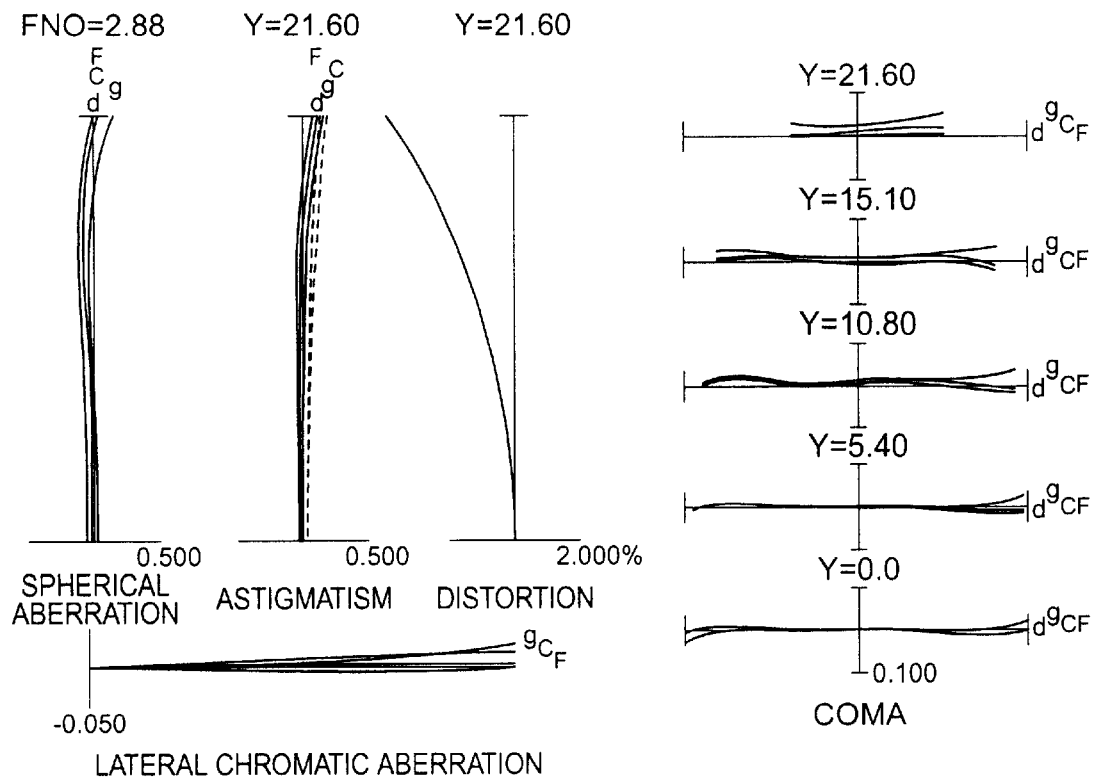
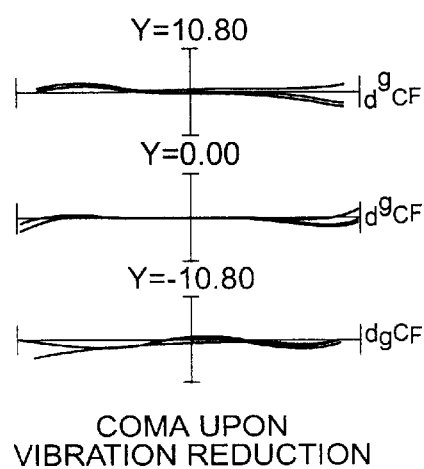

FIG. 3
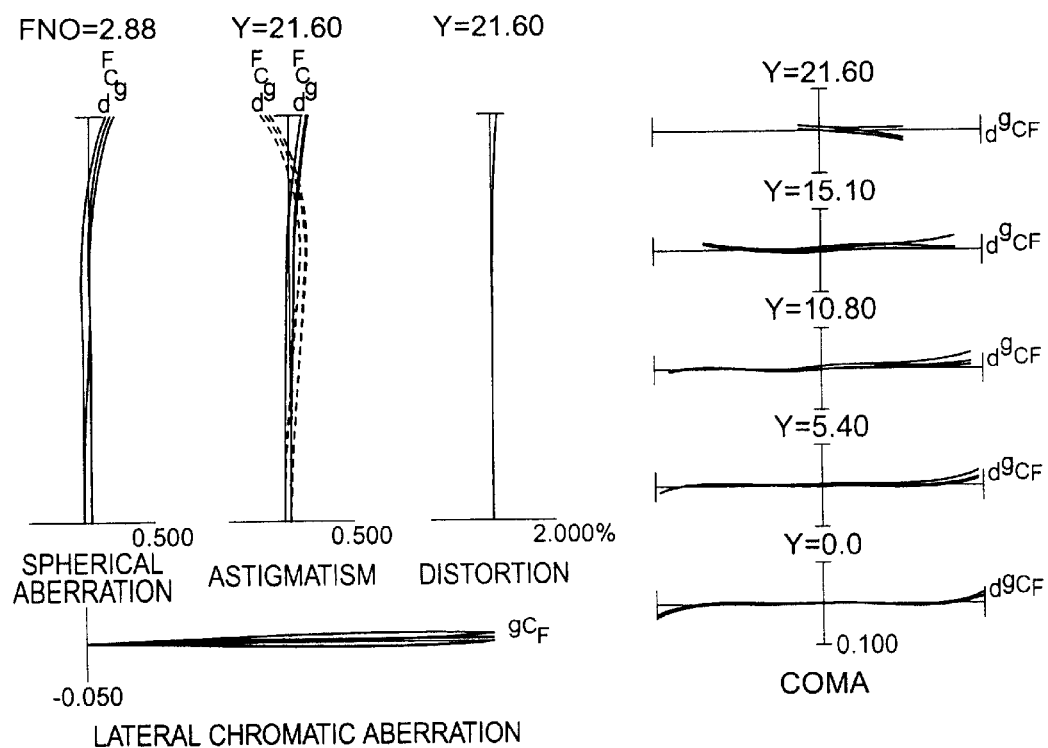
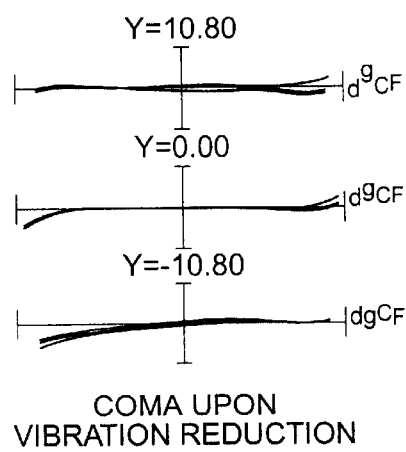

FIG. 4
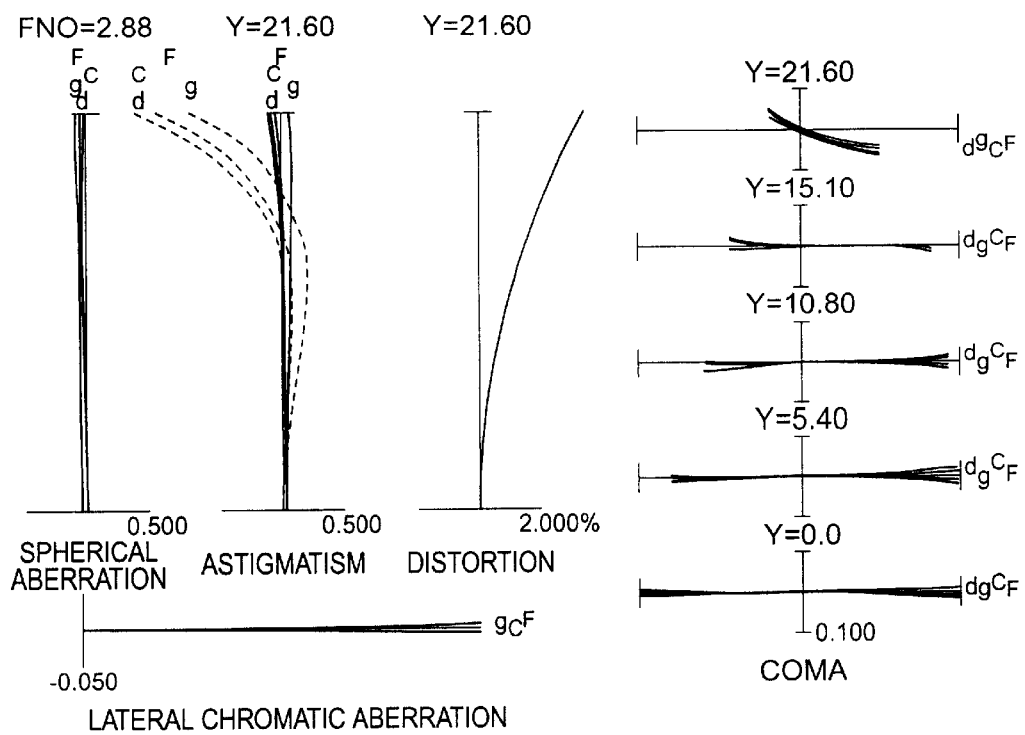
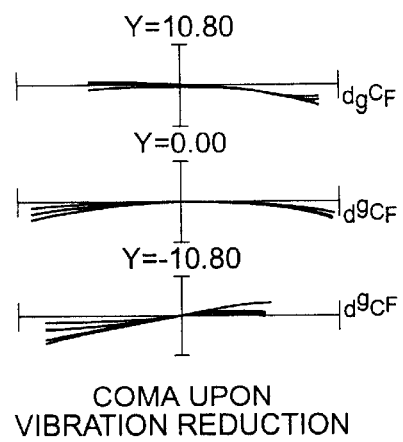
COMA UPON
VIBRATION REDUCTION

FIG. 5
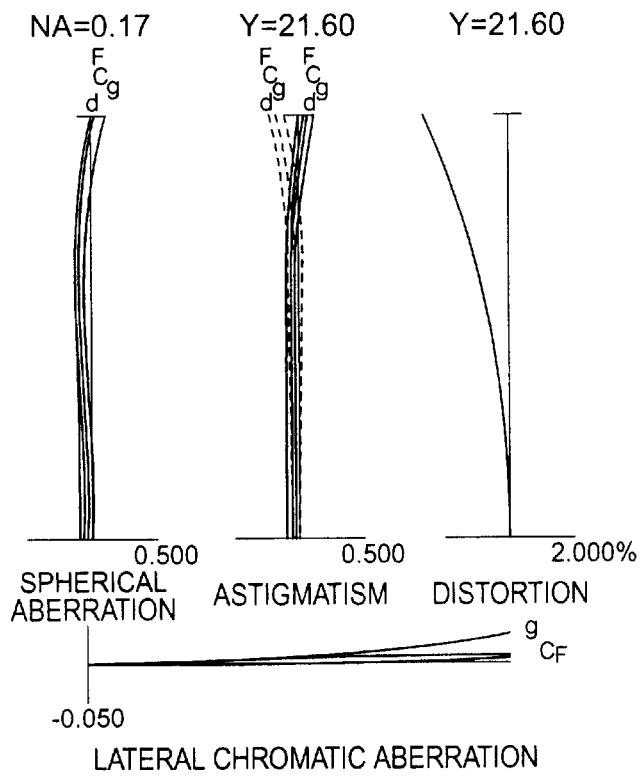
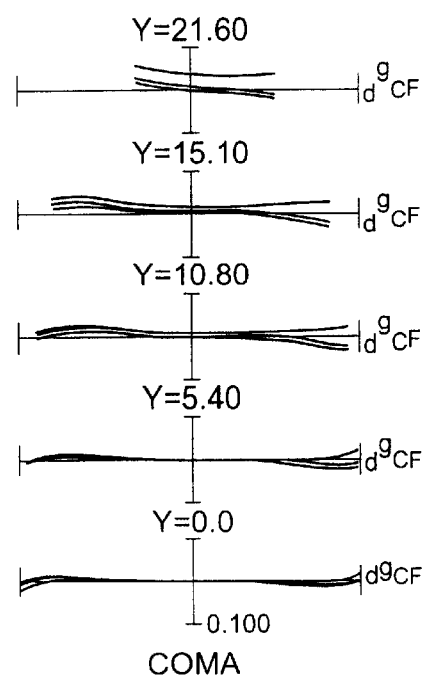
COMA
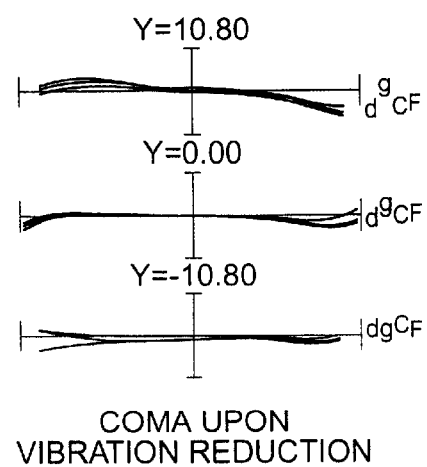
COMA UPON VIBRATION REDUCTION

FIG. 6
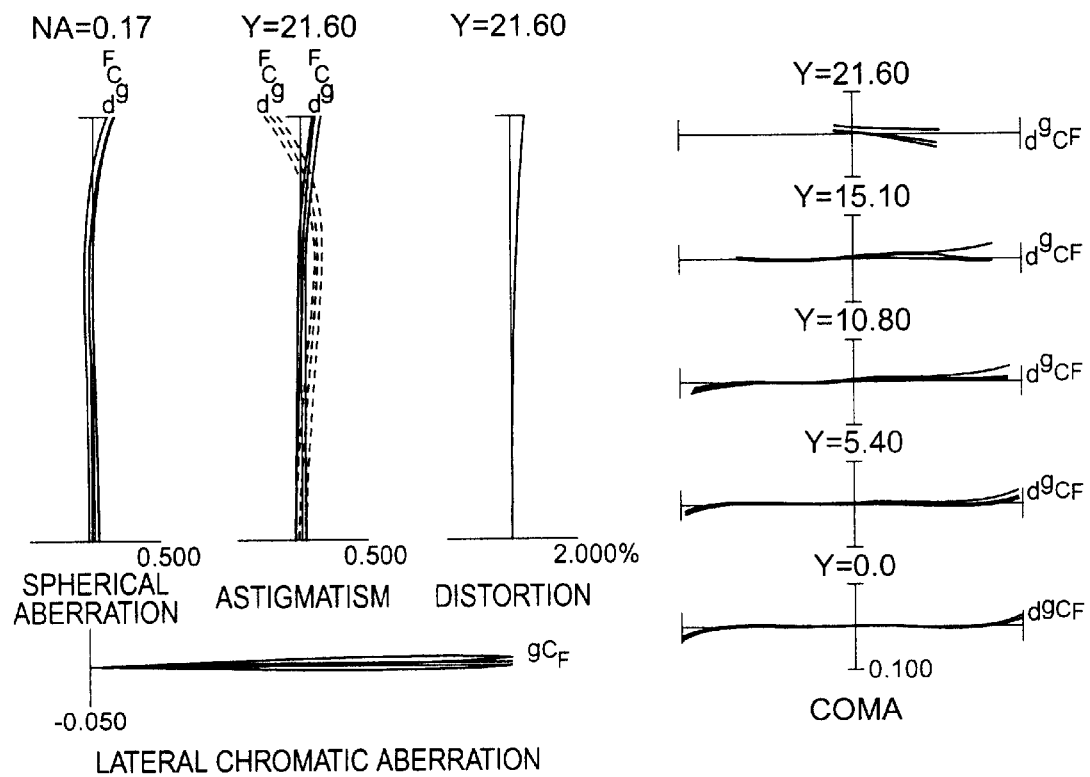
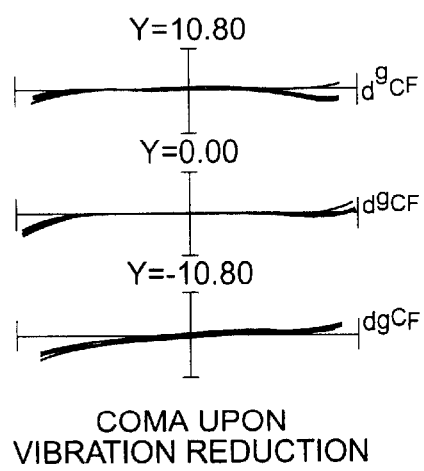
COMA UPON VIBRATION REDUCTION

FIG. 7
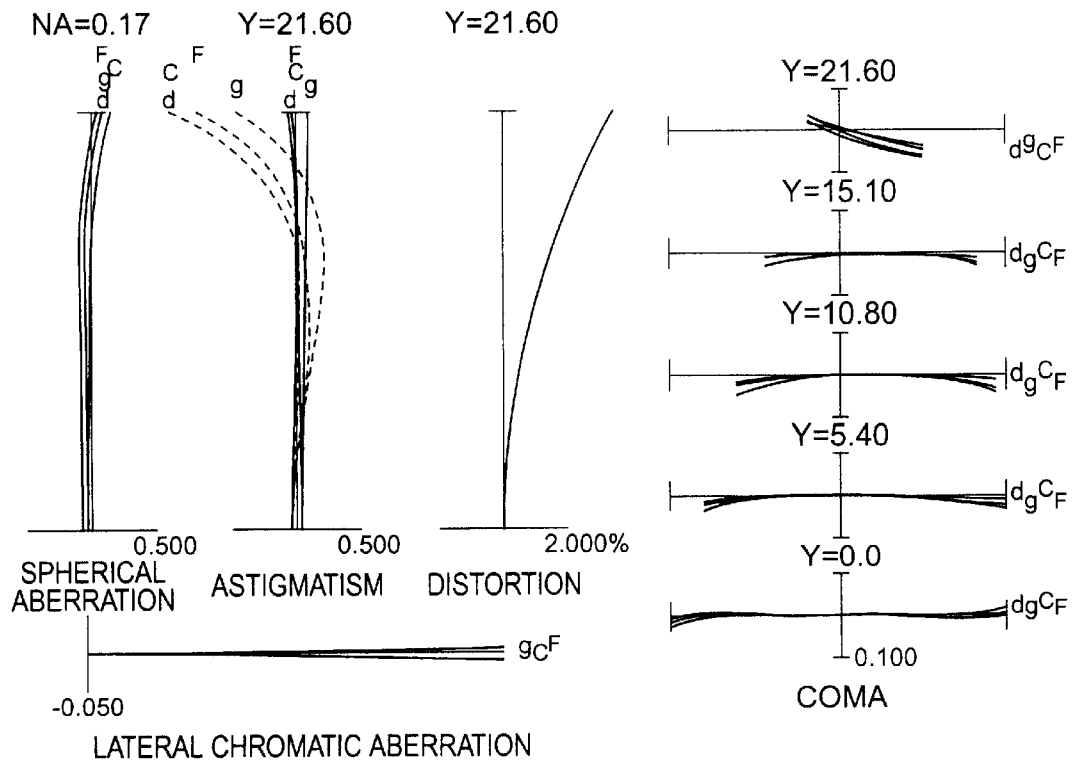
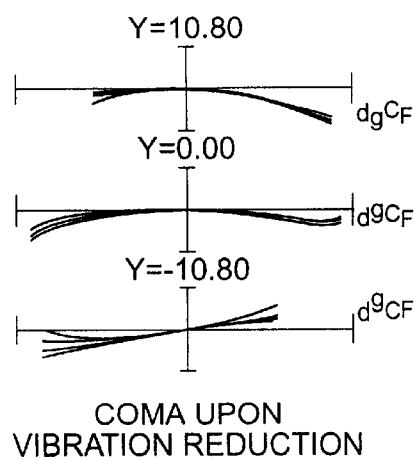

FIG. 9
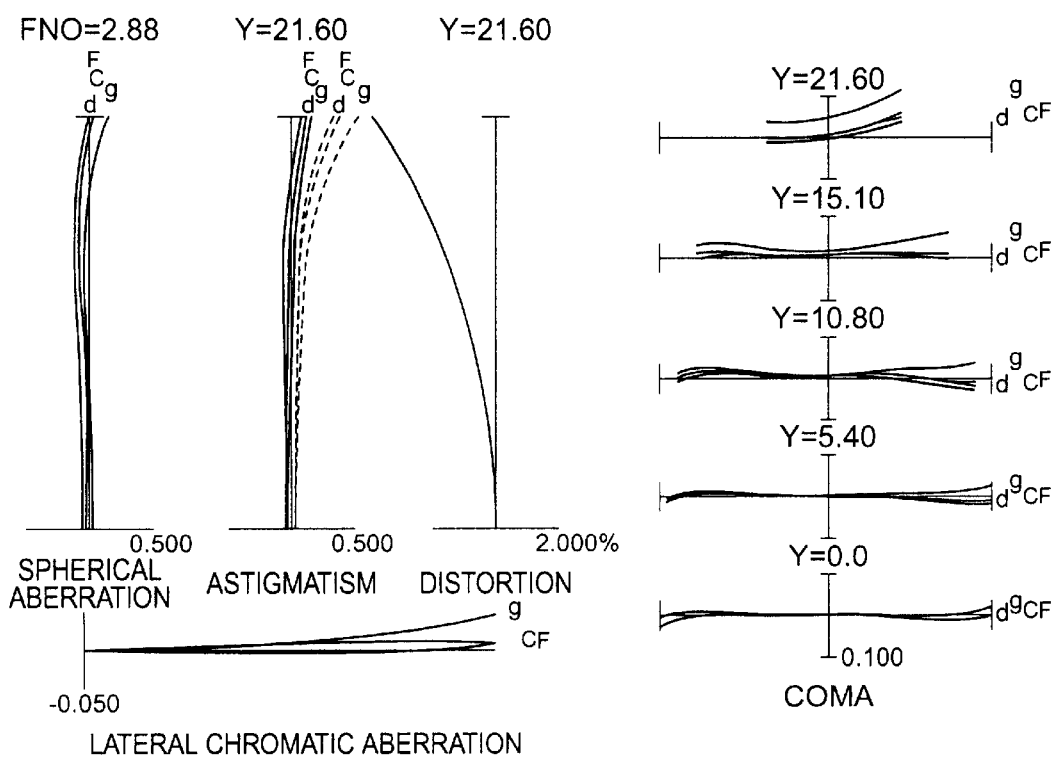
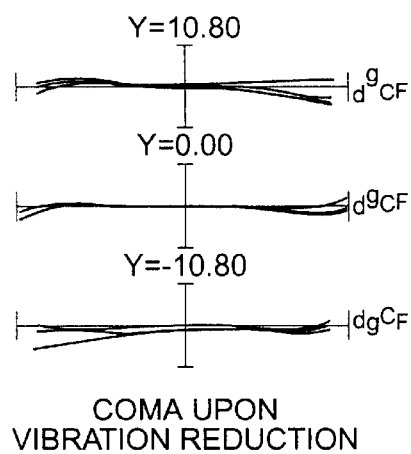
COMA UPON
VIBRATION REDUCTION

FIG. 10
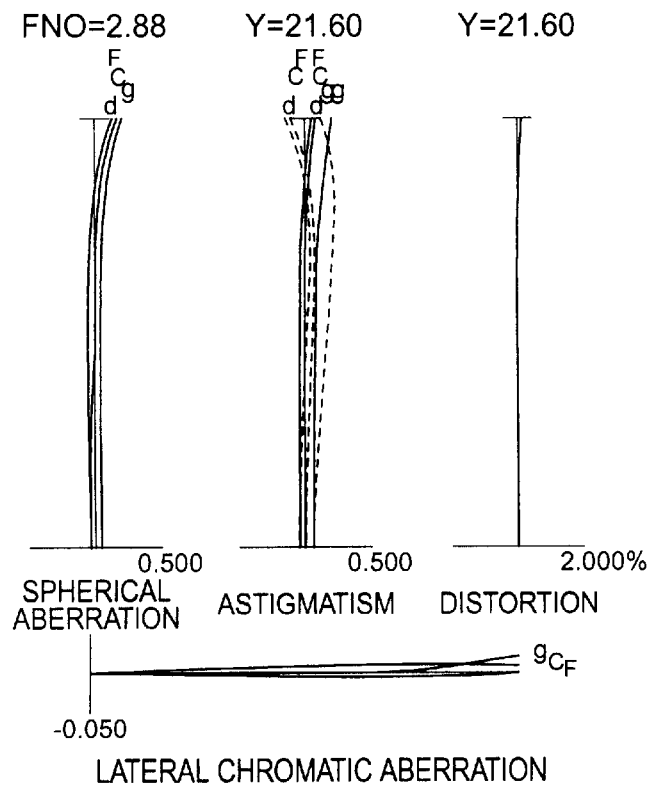
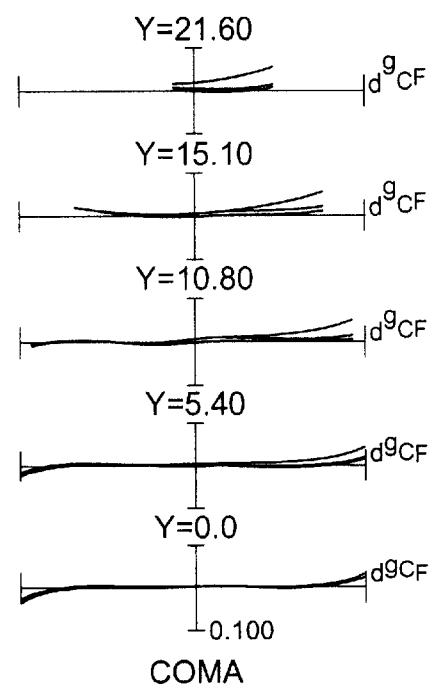
COMA
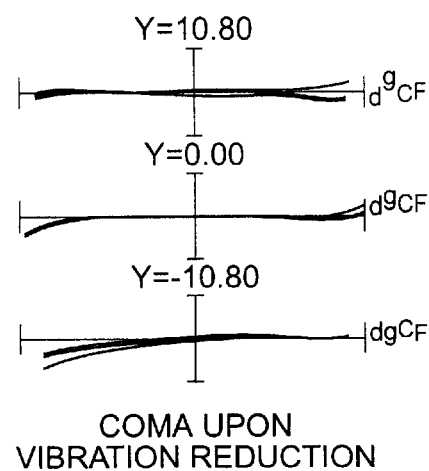
COMA UPON VIBRATION REDUCTION

FIG. 11
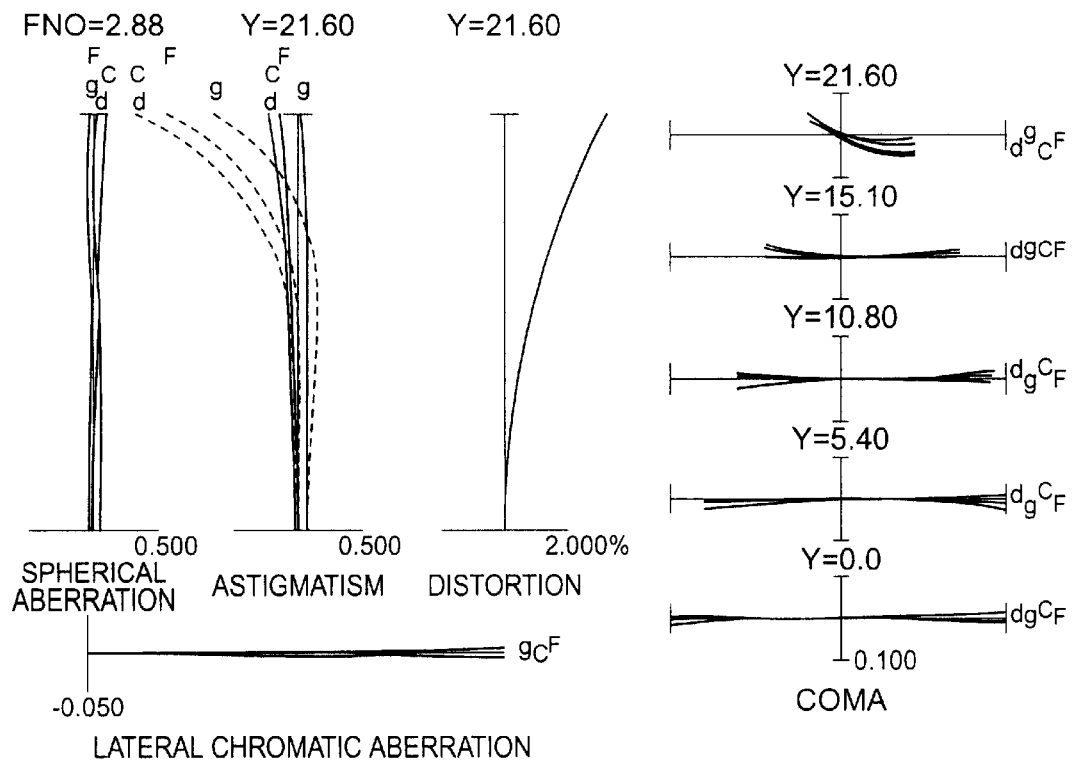
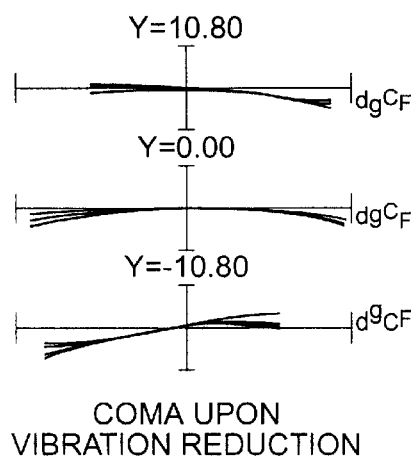

FIG. 12
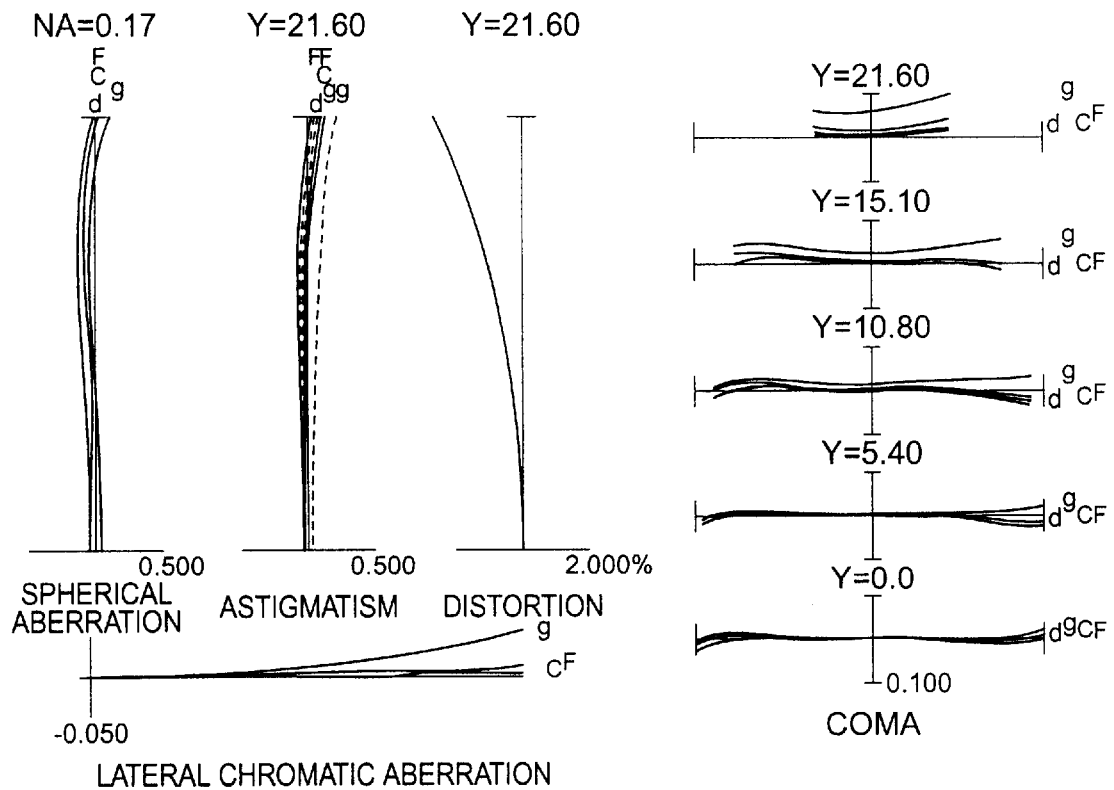
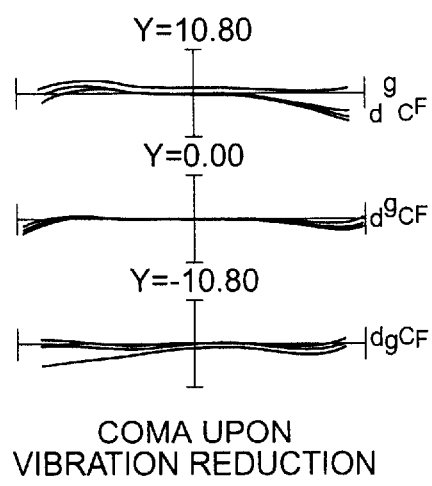

FIG. 13
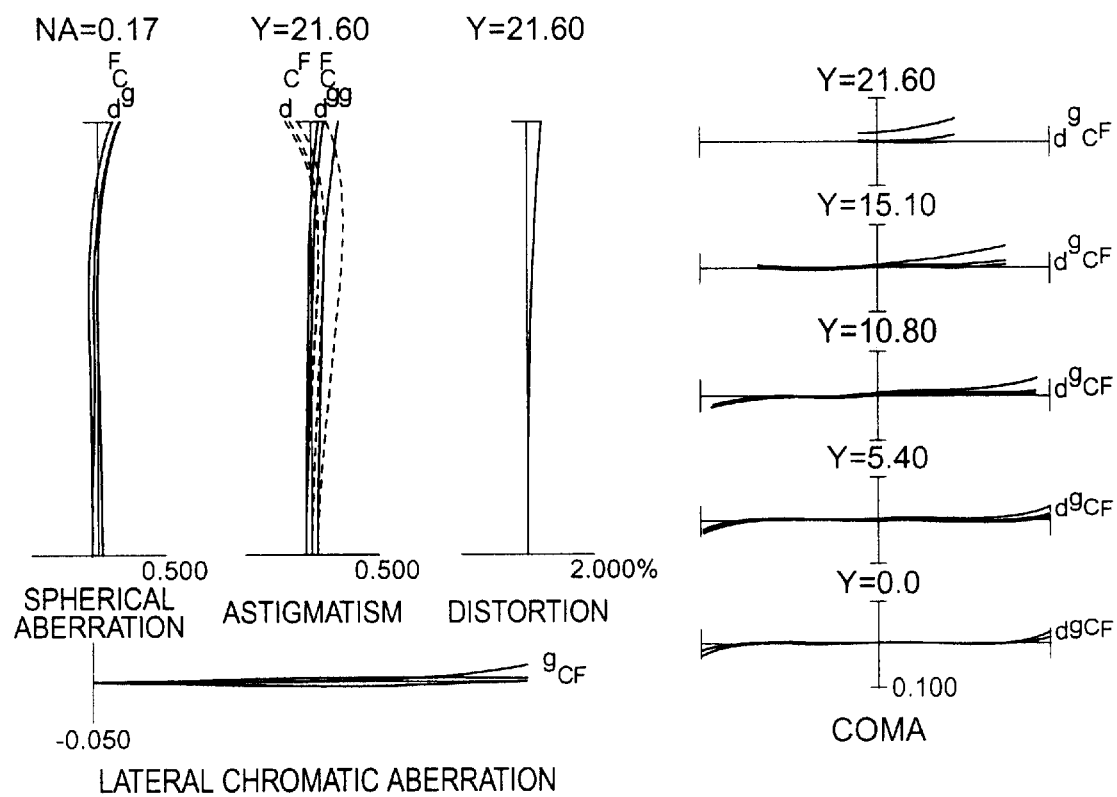
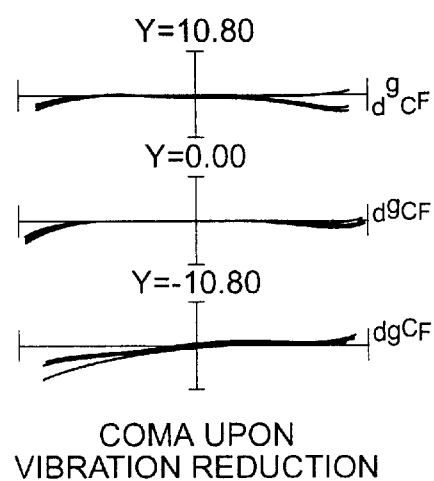

FIG. 14
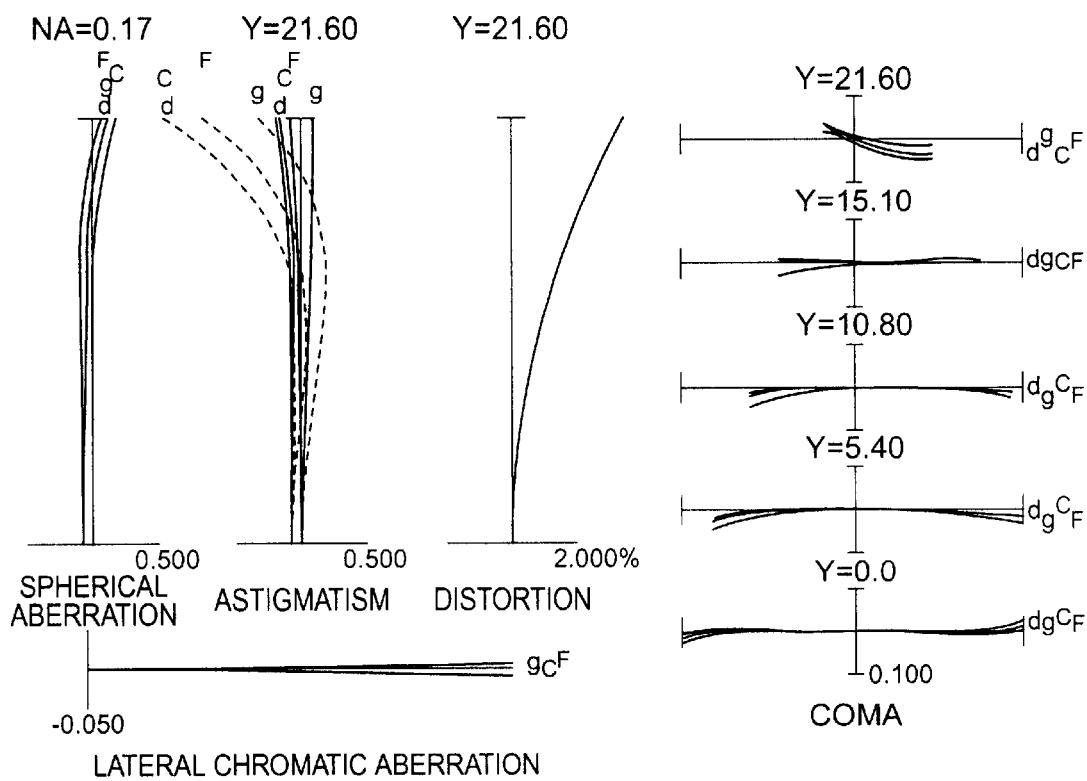
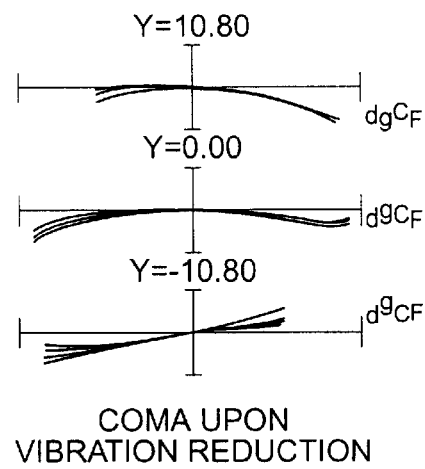

FIG. 16
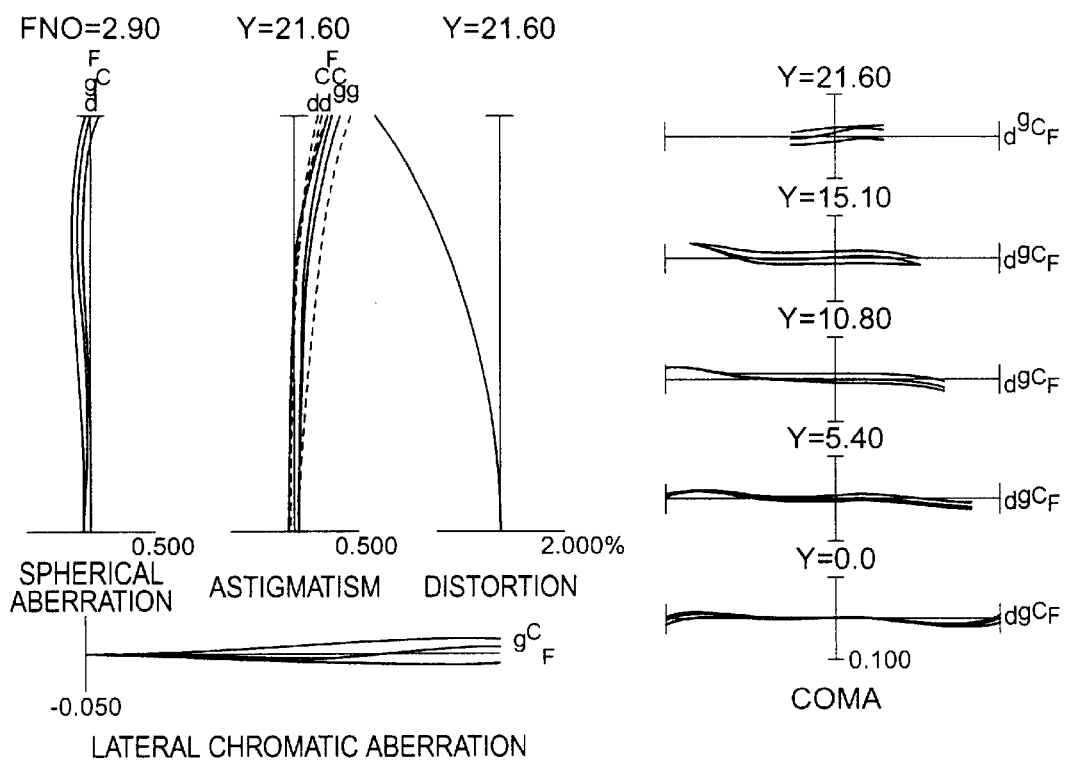
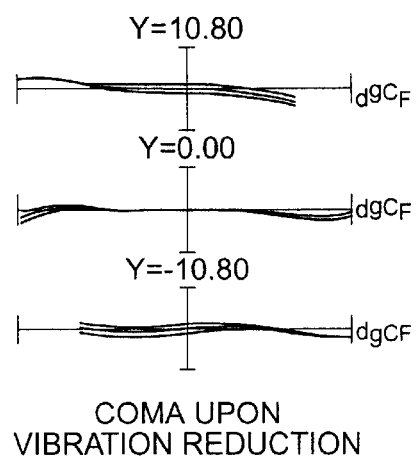

FIG. 17
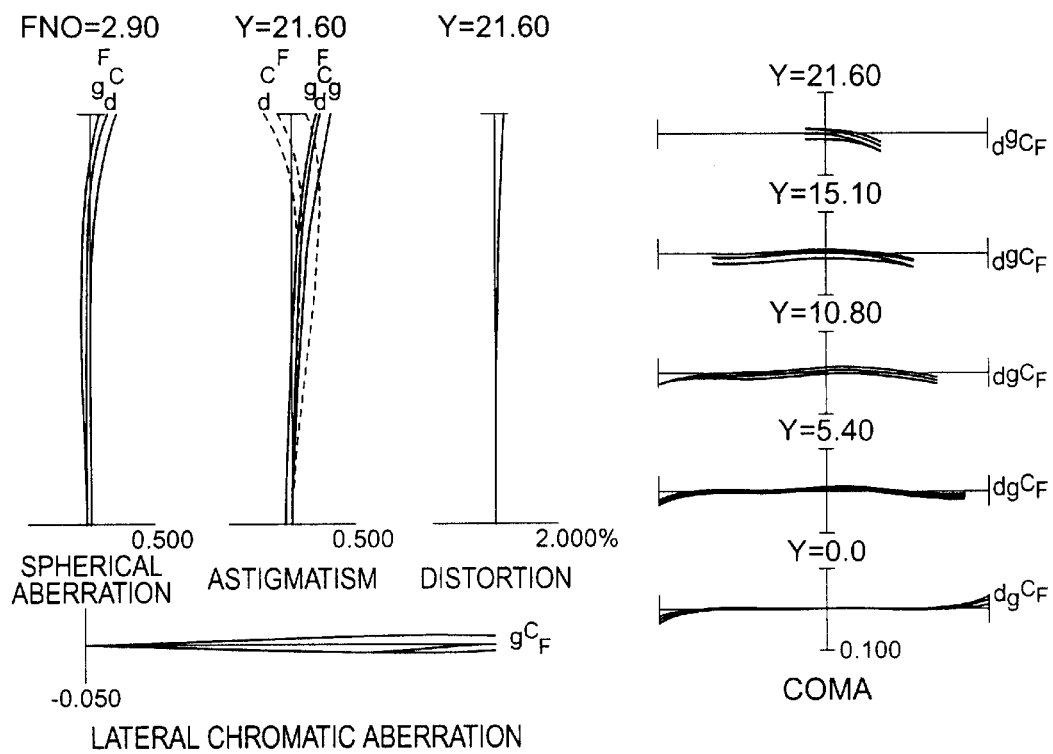
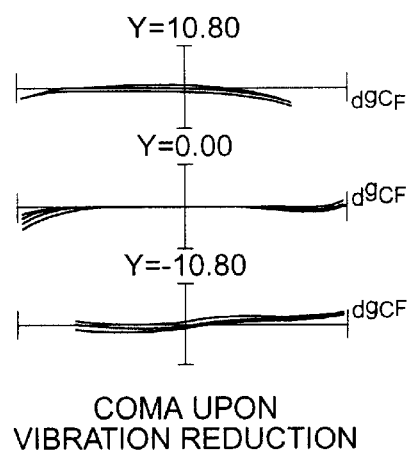
COMA UPON VIBRATION REDUCTION

FIG. 18
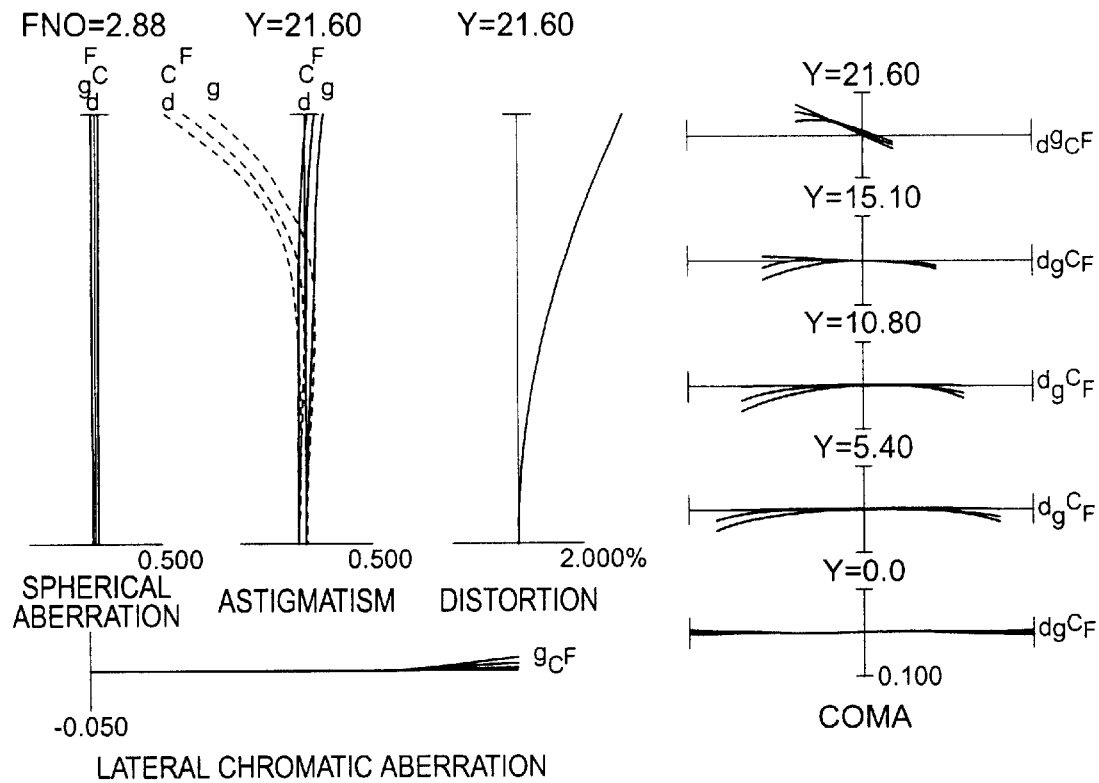
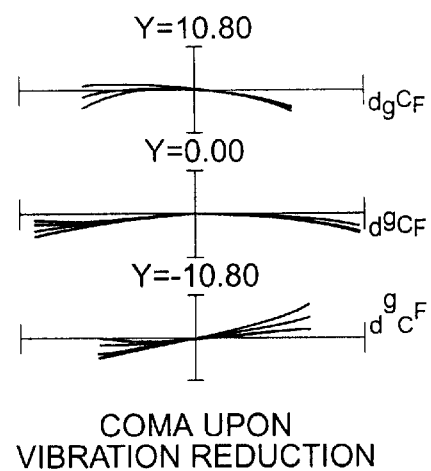
COMA UPON VIBRATION REDUCTION

FIG. 19
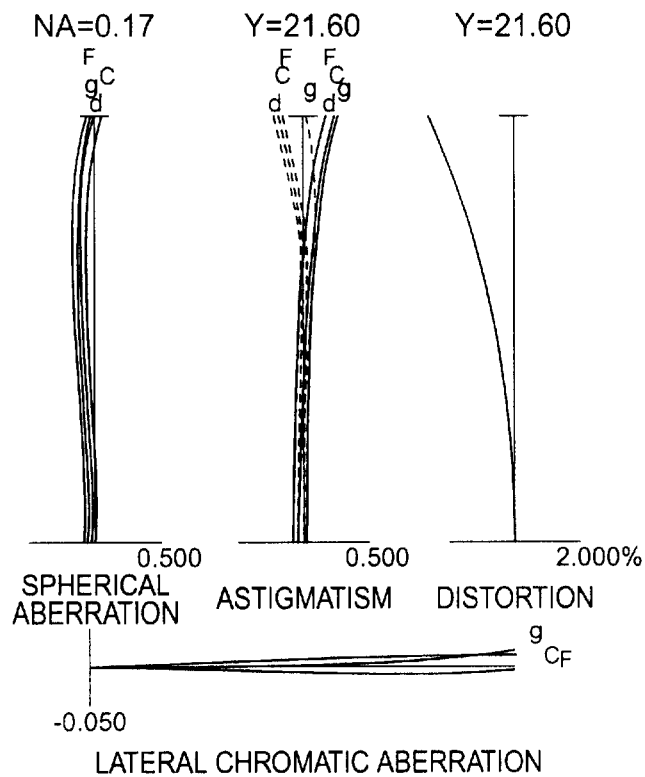
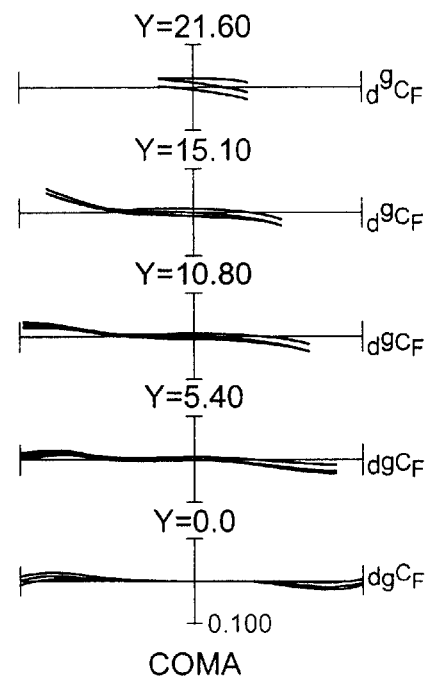
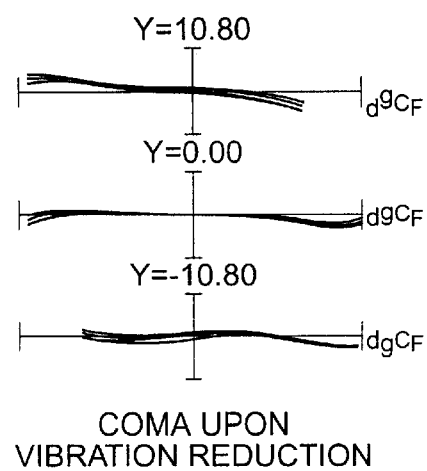

FIG. 20
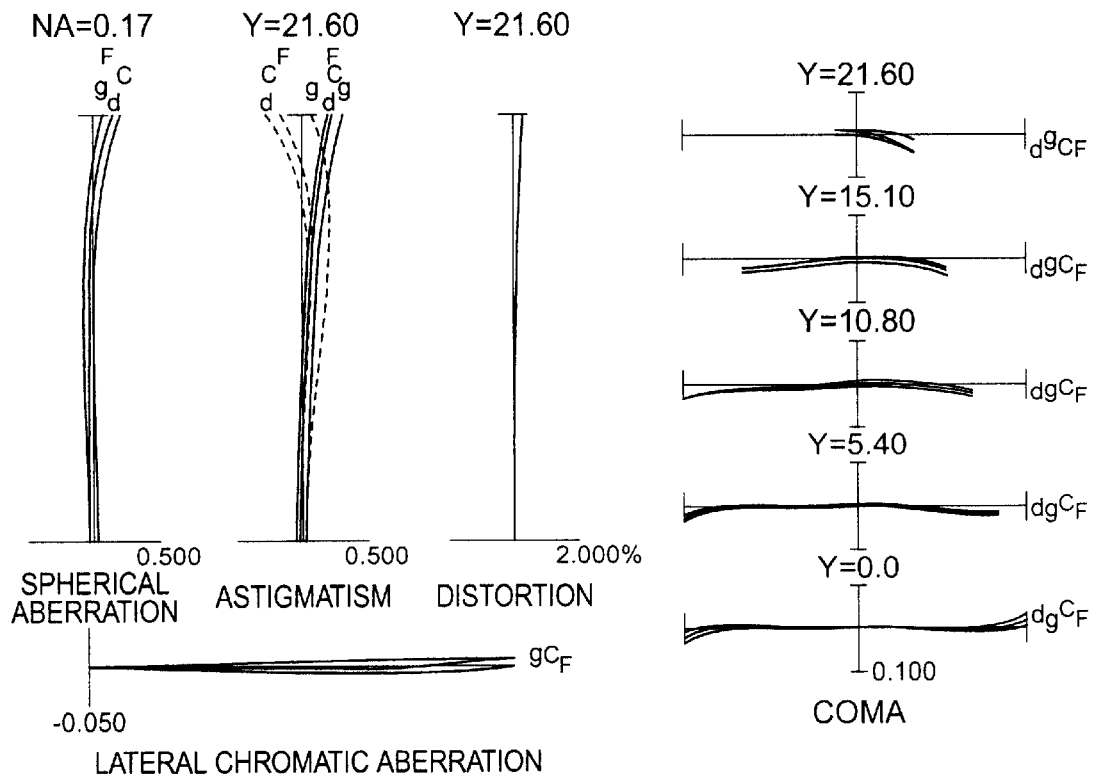
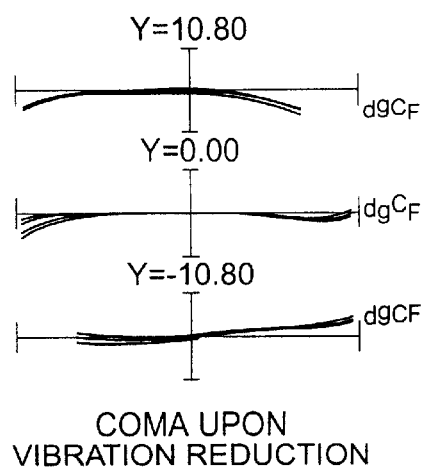

FIG. 21
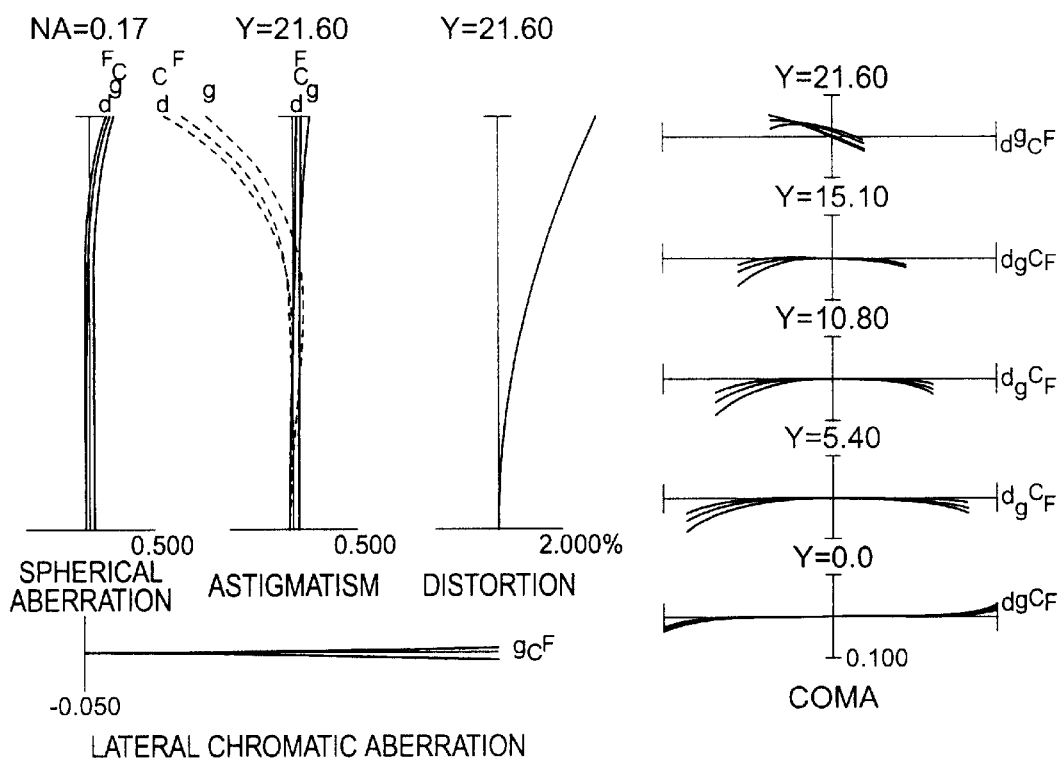
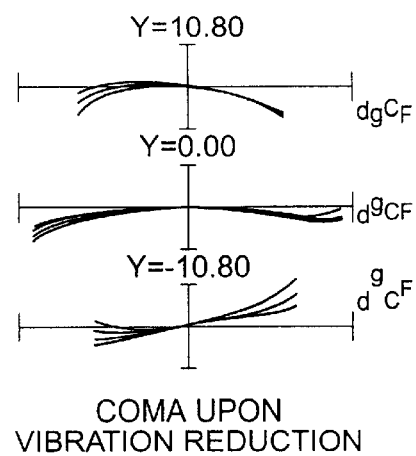

FIG. 23
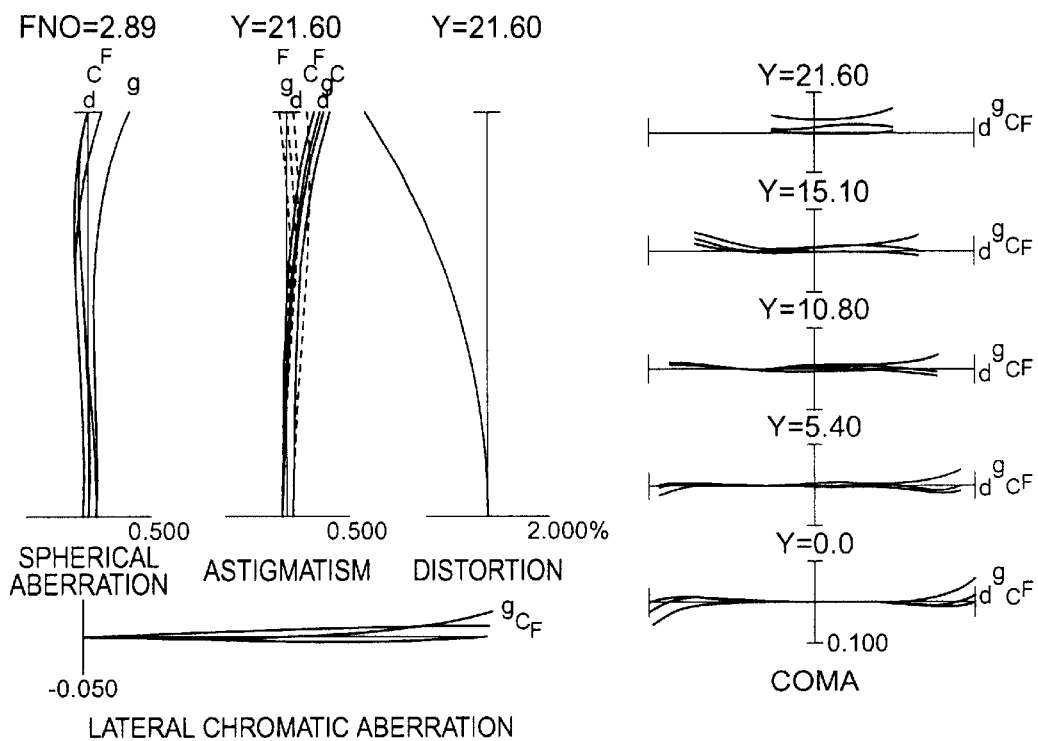
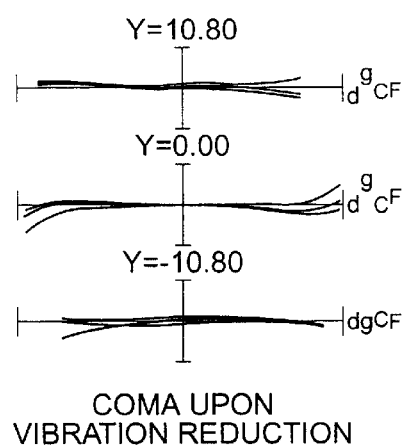

FIG. 24
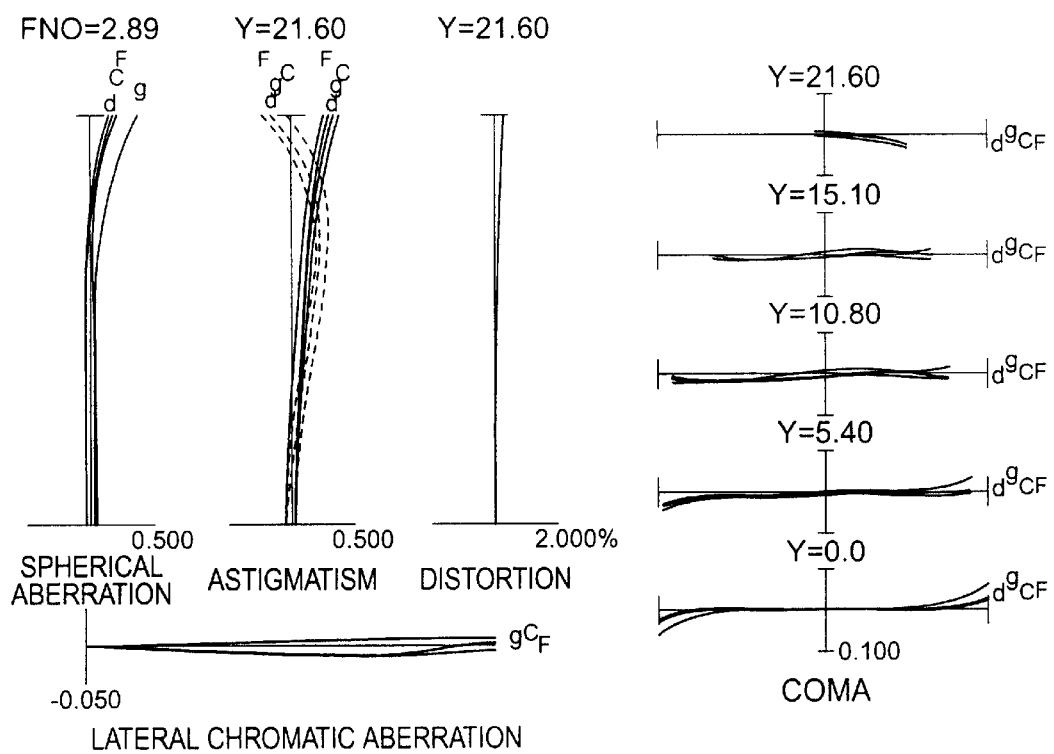
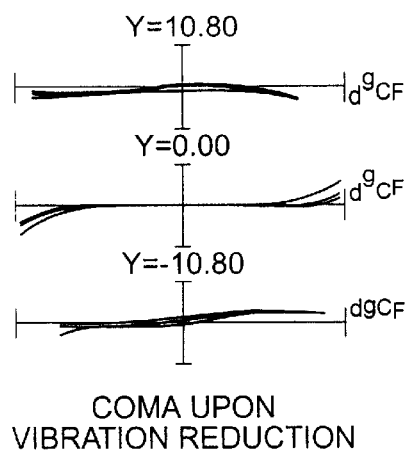
COMA UPON VIBRATION REDUCTION

FIG. 25
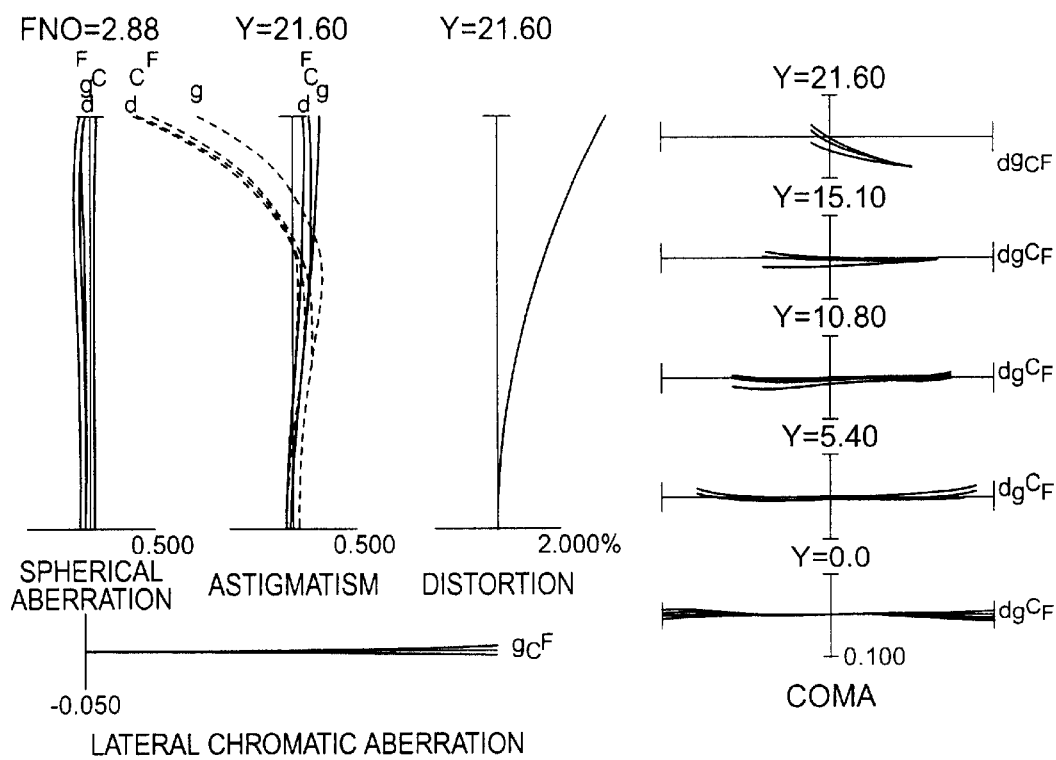
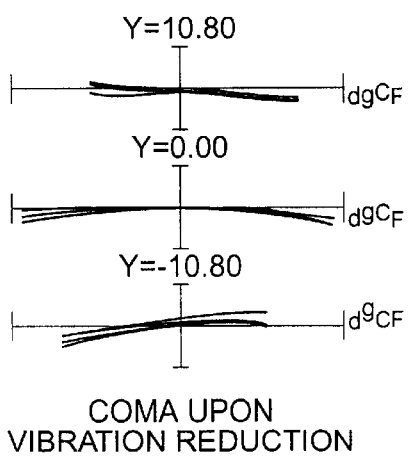

FIG. 26
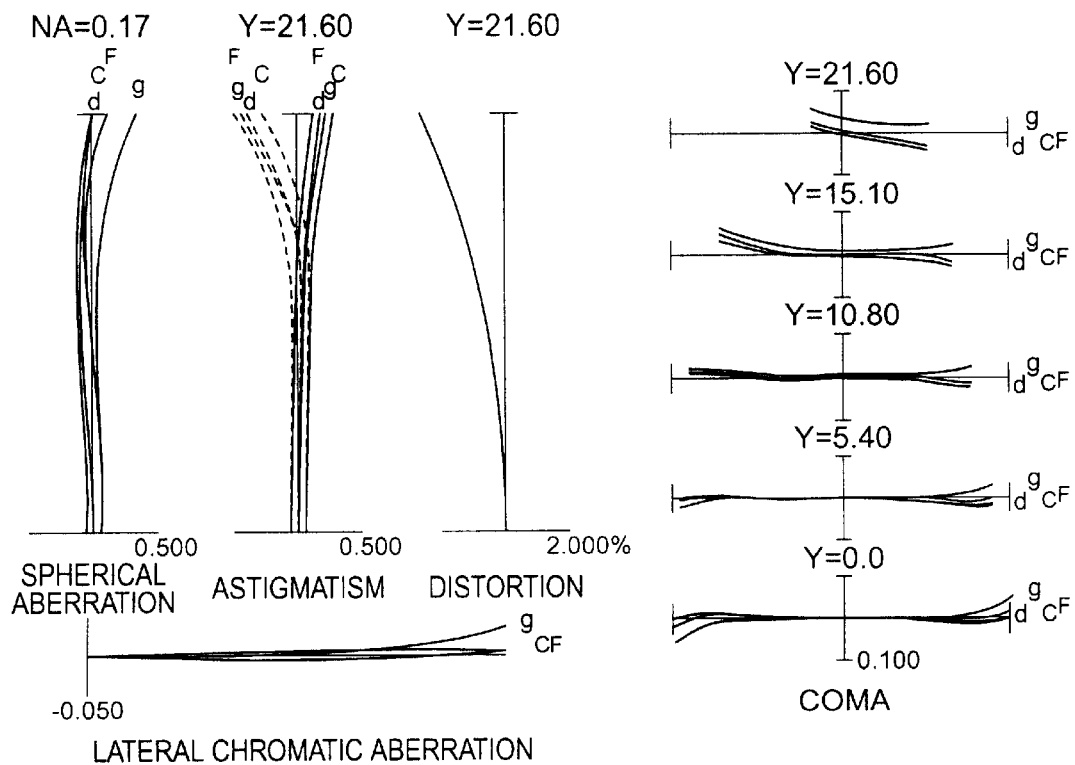
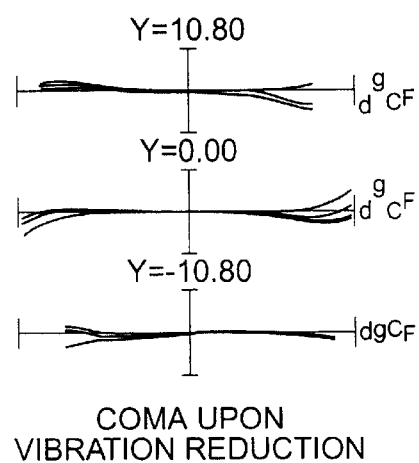

FIG. 27
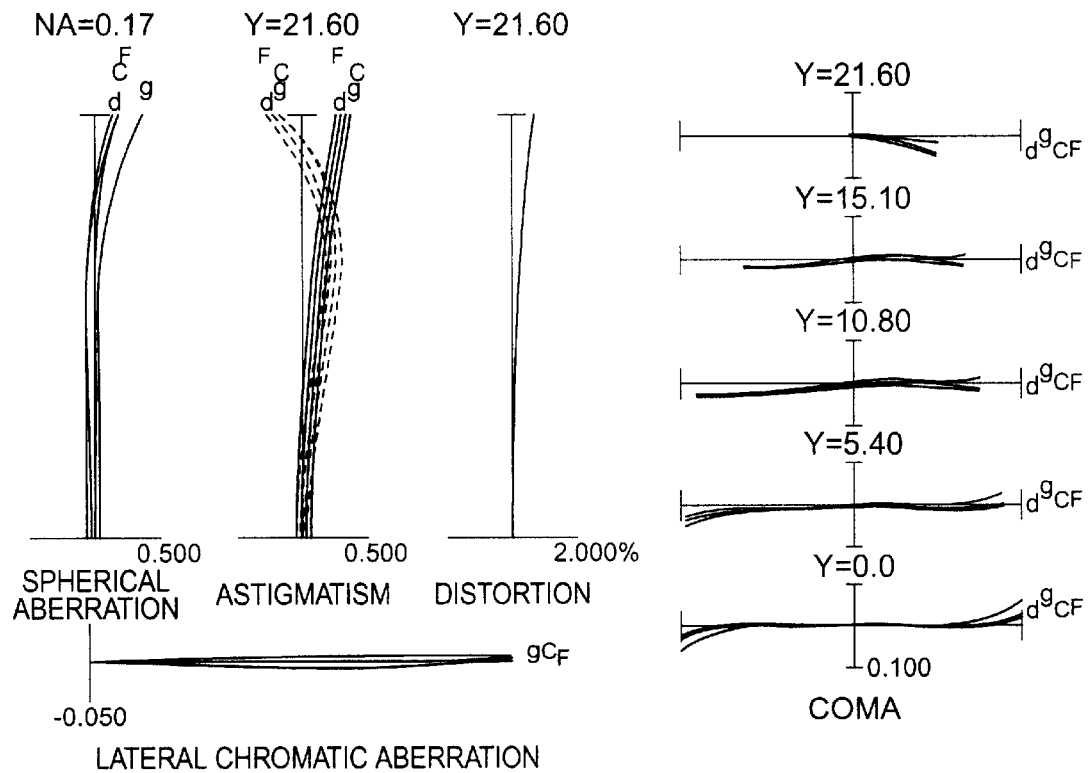
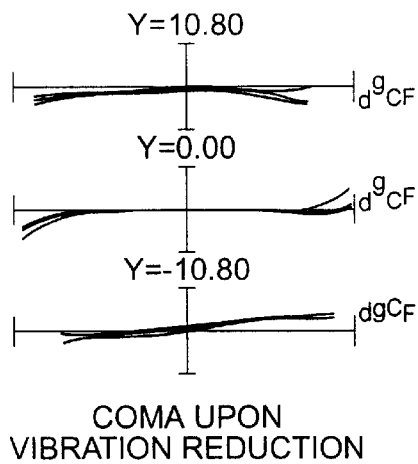

FIG. 28
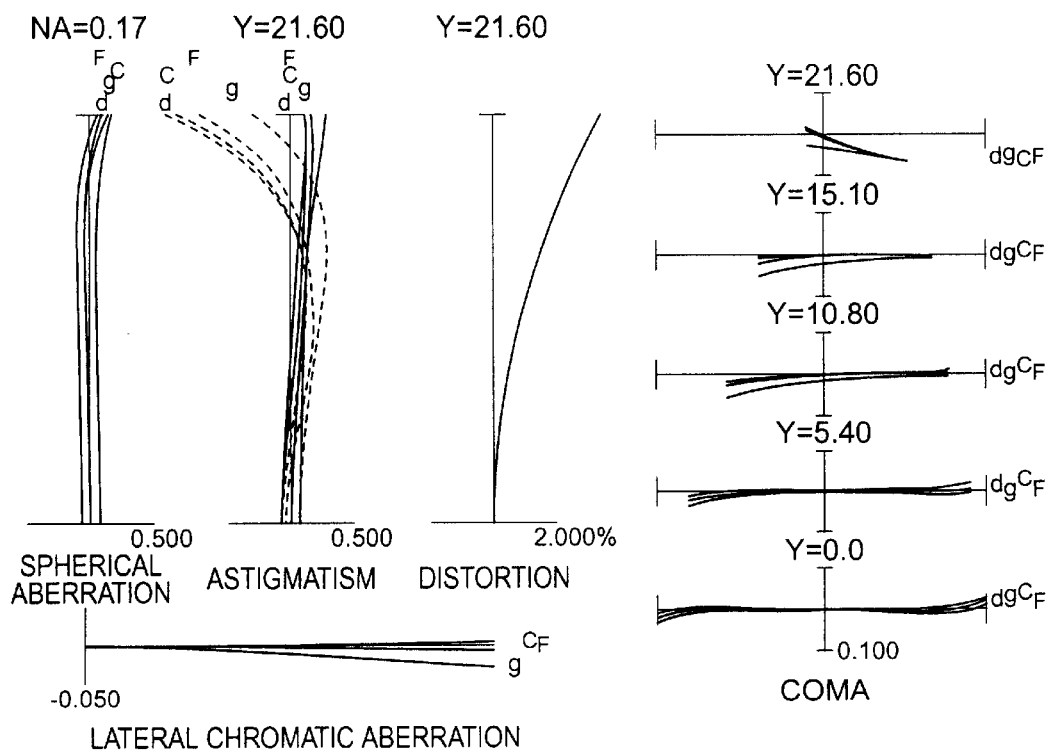
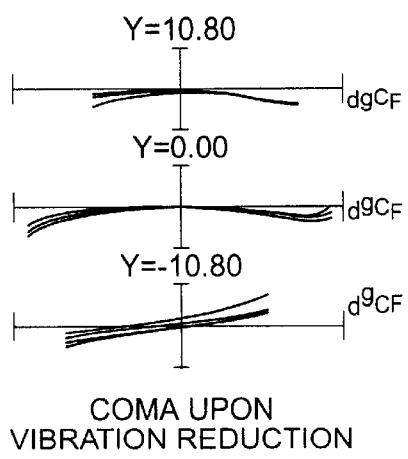

ZOOM LENS SYSTEM

The disclosures of the following priority applications are herein incorporated by reference:
 Japanese Patent Application No. 2001-285414 filed Sep. 19, 2001; and
 Japanese Patent Application No. 2002-152632 filed May 27, 2002.

BACKGROUND OF THE INVENTION

1. Field of the Invention

The present invention relates to a zoom lens system having a vibration reduction correction mechanism suitable for single lens reflex cameras and electronic still cameras, in particular, to a large aperture internal focusing telephoto zoom lens system having the focal length in the telephoto end state of 180 mm or more, the zoom ratio of about 2.7 or more, and the f-number of about three or less.

2. Related Background Art

An optical system whose imaging position is corrected by shifting a portion of lenses or lens groups in the optical system in the direction perpendicular to the optical axis has been used in this kind of optical system as disclosed in Japanese Patent Application Laid-Open Nos. 2-234115 and 9-325269.

However, in the optical system disclosed in Japanese Patent Application Laid-Open No. 2-234115, it is inevitable for the driving actuator to become large in order to control the master lens group of the zoom lens precisely in the direction perpendicular to the optical axis, so that it is not practical. In addition, the optical system disclosed in Japanese Patent Application Laid-Open No. 2-234115 does not mention imaging performance. Moreover, in the optical system disclosed in Japanese Patent Application Laid-Open No. 9-325269, although the driving actuator is able to be small and correction of aberration is preferable since vibration reduction correction is carried out by a portion of the master lens, the f-number is merely four, so that it is not suitable for sports photography.

In this kind of a large aperture telephoto zoom lens using a lens group for focusing suitable for single lens reflex cameras and electronic still cameras, the lens group used for focusing by moving along the optical axis has had a rather large diameter.

However, the above-described large aperture telephoto zoom lens has had disadvantages that because of large diameter of the focusing lens group, the weight of the focusing group is large and heavy load acts to the motor while carrying out auto focusing (AF), so that the large consumption of battery shortens the life time of the battery. Moreover, since the moving distance of the focusing lens group is large for focusing, it takes long time for carrying out auto focusing, so that it is not suitable for quick shooting.

In order to solve the problem, a focusing method has been proposed in Japanese Patent Application Laid-Open No. 6-51202, in which a first lens group fixed upon zooming is divided into two portions of a front lens group having positive refractive power and a rear lens group having positive refractive power, and the rear lens group is used as a focusing lens group being moved along the optical axis. In examples disclosed in Japanese Patent Application Laid-Open No. 6-51202, although the weight of the focusing lens group can successfully be light by constructing the focusing lens group with a single positive lens, the closest focusing distance is very far about 8.3–8.4 m in the telephoto end state, so that it is not acceptable for general shooting. If the focusing lens group is moved up to the shooting distance of 1.5 m, which is the same distance as the present application, then the moving distance of the focusing lens group becomes very large about 16.6–18.7 mm, so that it cannot carry out quick auto focusing. Moreover, since only a single positive lens is used for the focusing lens group, spherical aberration of the focusing lens group is not corrected, so that variation in spherical aberration upon focusing in the telephoto end state becomes too large to be accepted as a general shooting lens.

In order to solve the problem described above, in examples disclosed in Japanese Patent Application Laid-Open Nos. 7-294816 and 2001-356381, a lens portion equivalent to the rear lens group disclosed in Japanese Patent Application Laid-Open No. 6-51202 is moved to the image upon zooming and is moved independently along the optical axis upon focusing. Accordingly, the effective diameter of the focusing lens group can be small, so the focusing lens group can be made light. Moreover, in examples disclosed in Japanese Patent Application Laid-Open No. 7-294816, the moving distance of the focusing lens group can successfully be made short about 8.3–13.4 mm. Furthermore, spherical aberration of the focusing lens group can be corrected by constructing the focusing lens group with two-group two-element of a negative meniscus lens and a positive meniscus lens, so that variation in spherical aberration upon focusing (in particular, in the telephoto end state) is reduced.

On the other hand, since the focusing lens group is moved upon zooming, the moving amount of the focusing lens group upon focusing varied in accordance with the focal length. This means that the lens is no more a zoom lens but a variable focal length lens. Therefore, in order to be able to handle the lens system just like a zoom lens, a connecting member for connecting a focusing barrel with a zooming cam barrel upon zooming had to be added. Accordingly, the connecting member for connecting with the zooming lens groups is provided in addition to the lens barrel for the focusing lens group, the load for auto focusing becomes heavy, so that it is not preferable for driving AF motor. Moreover, in terms of lens assembling, when the focusing lens group, which is the front lens group of a telephoto type lens system, is decentered, the image plane tends to tilt severely. However, since the play of the focusing lens group disclosed in Japanese Patent Application Laid-Open No. 7-294816 is the sum of the play of the moving part for focusing and that of the connecting member with the zooming lens groups, the play produces a large decentered amount, so that it is extremely difficult for the actual product to maintain the flatness of the image plane.

Furthermore, in examples disclosed in Japanese Patent Application Laid-Open Nos. 2000-19398 and 2001-356381, the above-described problems are solved such that a first lens group of a four-group afocal zoom lens is divided into a front group and a rear group, and the distance between the front group and the rear group is widened. However, in order to accomplish the specification of the focal length in the wide-angle end state of about 80 mm, and the zoom ratio of about 2.4, the total lens length tends to become long because the widened distance becomes dead space.

In spite of being small in the effective diameter of the focusing lens group, the thickness along the optical axis of the positive lens in the focusing lens group is relatively thick. If the zoom ratio is made higher without changing lens type, the effective diameter of the focusing lens group is obliged to be larger. Accordingly, the thickness along the optical axis of the positive lens in the focusing lens group is obliged to be thick, so that the increase of the weight in accordance with the increase of the volume is disadvantageous to the focusing response.

SUMMARY OF THE INVENTION

The present invention was made in view of the aforementioned problems and has an object to provide a zoom lens system having a relatively small thickness along the optical axis of a positive lens in the focusing lens group, and a vibration reduction correction mechanism with keeping superior optical performance and, in particular, a large aperture internal focusing telephoto zoom lens having the focal length in the wide-angle end state of 72 mm or less, the focal length in the telephoto end state of 180 mm or more, the zoom ratio of 2.7 or more, and the f-number of 3 or less.

According to one aspect of the present invention, an afocal zoom lens system includes, in order from an object, a first lens group having positive refractive power, a second lens group having negative refractive power, a third lens group having positive refractive power, and a fourth lens group having positive refractive power. Zooming is carried out by moving the second lens group and the third lens group along the optical axis. The fourth lens group is composed of, in order from the object, a front group having positive refractive power, a middle group having negative refractive power, and a rear group having positive refractive power. An imaging position is varied by shifting the middle group in the direction perpendicular to the optical axis. The front group includes a positive lens and a negative lens. The middle group includes a positive lens and two negative lenses. The rear group includes two positive lenses and a negative lens. The following conditional expression is satisfied;

$$0.70 < |(F4 \times F4M)/(F4F \times F4R)| < 1.20$$

where F4 denotes the focal length of the fourth lens group, F4F denotes the focal length of the front group, F4M denotes the focal length of the middle group, and F4R denotes the focal length of the rear group.

In one preferred embodiment of the present invention, the following conditional expression is satisfied;

$$0.008 < F4/(F4F \times F4R \times Nd) < 0.015$$

where Nd denotes the average refractive index at d-line of the lens elements consisting of the middle group in the fourth lens group.

In one preferred embodiment of the present invention, the following conditional expression is satisfied;

$$0.40 < |(\Phi F \times F4R)/(F4 \times \Phi M)| < 0.80$$

where $\Phi F$ denotes the maximum effective diameter of the front group, and $\Phi M$ denotes the maximum effective diameter of the middle group.

In one preferred embodiment of the present invention, the following conditional expression is satisfied;

$$0.70 < |(FT \times F23T \times F4M)/(F1 \times F4F \times F4R)| < 1.20$$

where FT denotes the focal length of the zoom lens system in the telephoto end state, F1 denotes the focal length of the first lens group, and F23T denotes the composite focal length of the second lens group and the third lens group in the telephoto end state.

In one preferred embodiment of the present invention, the front group is composed of two positive lenses and a negative lens, and the rear group is composed of two positive lenses and a negative lens.

In one preferred embodiment of the present invention, the first lens group having positive refractive power is composed of a front lens group fixed along the optical axis and a rear lens group movable along the optical axis. Focusing is carried out by moving the rear lens group along the optical axis.

According to another aspect of the present invention, a telephoto zoom lens system includes, in order from an object, a first lens group having positive refractive power, a second lens group having negative refractive power, a third lens group having positive refractive power, and a fourth lens group having positive refractive power. Zooming is carried out by moving the second lens group and the third lens group along the optical axis. The first lens group is composed of, in order from the object, a front lens group having positive refractive power, and a rear lens group having stronger positive refractive power than that of the front lens group. Focusing is carried out by moving the rear lens group along the optical axis. The front lens group is composed of, in order from the object, a negative meniscus lens having a convex surface facing to the object, a positive lens having a convex surface facing to the object, and a positive lens having a convex surface facing to the object. The rear lens group is composed of, in order from the object, a negative meniscus lens having a convex surface facing to the object, and a positive lens. The following conditional expressions are satisfied;

$$0.5 < (F1 \times F4)/(|F23W| \times FW) < 1.2$$

$$1.0 \times 10^{-3} < v15/(F1 \times F1R \times N15) < 2.6 \times 10^{-3}$$

where FW denotes the focal length of the zoom lens system in the wide-angle end state, F1 denotes the focal length of the first lens group, F1R denotes the focal length of the rear lens group of the first lens group, N15 denotes the refractive index of the positive lens in the rear lens group at d-line, v15 denotes Abbe number of the positive lens in the rear lens group, F23W denotes the composite focal length of the second lens group and the third lens group in the wide-angle end states, F4 denotes the focal length of the fourth lens group.

In one preferred embodiment of the present invention, the following conditional expression is satisfied;

$$0.10 < |F23T|/|F23W| < 0.45$$

where F23T denotes the composite focal length of the second lens group and the third lens group in the telephoto end state.

In one preferred embodiment of the present invention, the following conditional expression is satisfied;

$$0.015 < FW/(F1 \times |F2|) < 0.028$$

where F2 denotes the focal length of the second lens group.

Other features and advantages according to the invention will be readily understood from the detailed description of the preferred embodiments in conjunction with the accompanying drawings.

BRIEF DESCRIPTION OF THE DRAWINGS

FIG. 2 graphically shows various aberrations of the zoom lens system according to Example 1 of the first embodiment in a wide-angle end state when the system is focused at infinity.

FIG. 3 graphically shows various aberrations of the zoom lens system according to Example 1 of the first embodiment in an intermediate focal length state when the system is focused at infinity.

FIG. 4 graphically shows various aberrations of the zoom lens system according to Example 1 of the first embodiment in a telephoto end state when the system is focused at infinity.

FIG. 5 graphically shows various aberrations of the zoom lens system according to Example 1 of the first embodiment in the wide-angle end state when the system is focused at the closest focusing distance.

FIG. 6 graphically shows various aberrations of the zoom lens system according to Example 1 of the first embodiment in the intermediate focal length state when the system is focused at the closest focusing distance.

FIG. 7 graphically shows various aberrations of the zoom lens system according to Example 1 of the first embodiment in the telephoto end state when the system is focused at the closest focusing distance.

FIG. 9 graphically shows various aberrations of the zoom lens system according to Example 2 of the first embodiment in a wide-angle end state when the system is focused at infinity.

FIG. 10 graphically shows various aberrations of the zoom lens system according to Example 2 of the first embodiment in an intermediate focal length state when the system is focused at infinity.

FIG. 11 graphically shows various aberrations of the zoom lens system according to Example 2 of the first embodiment in a telephoto end state when the system is focused at infinity.

FIG. 12 graphically shows various aberrations of the zoom lens system according to Example 2 of the first embodiment in the wide-angle end state when the system is focused at the closest focusing distance.

FIG. 13 graphically shows various aberrations of the zoom lens system according to Example 2 of the first embodiment in the intermediate focal length state when the system is focused at the closest focusing distance.

FIG. 14 graphically shows various aberrations of the zoom lens system according to Example 2 of the first embodiment in the telephoto end state when the system is focused at the closest focusing distance.

FIG. 16 graphically shows various aberrations of the zoom lens system according to Example 3 of the first embodiment in a wide-angle end state when the system is focused at infinity.

FIG. 17 graphically shows various aberrations of the zoom lens system according to Example 3 of the first embodiment in an intermediate focal length state when the system is focused at infinity.

FIG. 18 graphically shows various aberrations of the zoom lens system according to Example 3 of the first embodiment in a telephoto end state when the system is focused at infinity.

FIG. 19 graphically shows various aberrations of the zoom lens system according to Example 3 of the first embodiment in the wide-angle end state when the system is focused at the closest focusing distance.

FIG. 20 graphically shows various aberrations of the zoom lens system according to Example 3 of the first embodiment in the intermediate focal length state when the system is focused at the closest focusing distance.

FIG. 21 graphically shows various aberrations of the zoom lens system according to Example 3 of the first embodiment in the telephoto end state when the system is focused at the closest focusing distance.

FIG. 23 graphically shows various aberrations of the zoom lens system according to Example 4 of the first embodiment in a wide-angle end state when the system is focused at infinity.

FIG. 24 graphically shows various aberrations of the zoom lens system according to Example 4 of the first embodiment in an intermediate focal length state when the system is focused at infinity.

FIG. 25 graphically shows various aberrations of the zoom lens system according to Example 4 of the first embodiment in a telephoto end state when the system is focused at infinity.

FIG. 26 graphically shows various aberrations of the zoom lens system according to Example 4 of the first embodiment in the wide-angle end state when the system is focused at the closest focusing distance.

FIG. 27 graphically shows various aberrations of the zoom lens system according to Example 4 of the first embodiment in the intermediate focal length state when the system is focused at the closest focusing distance.

FIG. 28 graphically shows various aberrations of the zoom lens system according to Example 4 of the first embodiment in the telephoto end state when the system is focused at the closest focusing distance.

DESCRIPTION OF THE PREFERRED EMBODIMENTS

Embodiments of the present invention are going to be explained below with reference to accompanying drawings.

[First Embodiment]

Figure 1:
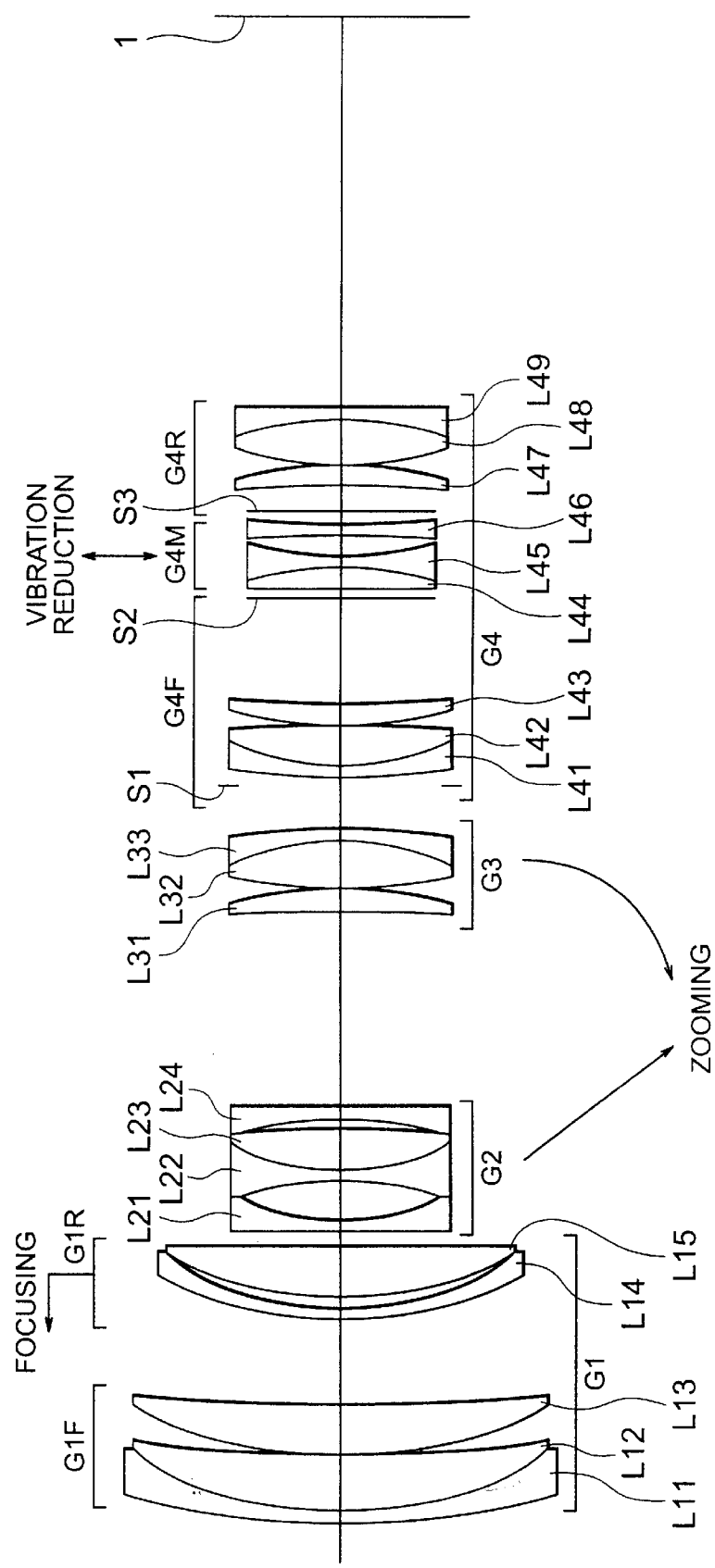
FIG. 1 is a diagram showing the lens arrangement of a large aperture internal focusing telephoto zoom lens system according to Example 1 of a first embodiment of the present invention.

In a first embodiment of the present invention, as shown in FIG. 1, a large aperture internal focusing telephoto zoom lens system, which is an afocal telephoto zoom lens system, includes, in order from an object, a first lens group G1 having positive refractive power, a second lens group G2 having negative refractive power, a third lens group G3 having positive refractive power, and a fourth lens group G4 having positive refractive power. Zooming is carried out by moving the second lens group G2 and the third lens group G3 along the optical axis. The fourth lens group G4 includes, in order from the object, a front group G4F having positive refractive power, a middle group G4M having negative refractive power, and a rear group G4R having positive refractive power. The zoom lens system has the construction that the imaging position is shifted (hereinafter called by "vibration reduction correction") by moving the middle group G4M in the direction perpendicular to the optical axis. The front group G4F includes a positive lens element and a negative lens element. The middle group G4M includes a positive lens element and two negative lens elements. The rear group G4R includes two positive lens elements and a negative lens element. The following conditional expression (1) is satisfied;

$$0.70 < |(F4 \times F4M)/(F4F \times F4R)| < 1.20 \qquad (1)$$

where F4 denotes the focal length of the fourth lens groupG4, F4F denotes the focal length of the front group G4F, F4M denotes the focal length of the middle group G4M, and F4R denotes the focal length of the rear group G4R.

When the value |(F4×F4M)/(F4F×F4R)| exceeds the upper limit of conditional expression (1), the flatness of the image plane becomes worse. When the value falls below the lower limit of conditional expression (1), variation of spherical aberration caused by vibration reduction correction becomes large, so that it is no good. When the upper limit is set to 1.10, it is preferable that the diameter of the middle group G4M and variation of spherical aberration caused by vibration reduction correction can be balanced well. When the lower limit is set to 0.85, it is more preferable that the diameter of the middle group G4M and variation of spherical aberration caused by vibration reduction correction can further be balanced well.

In order to obtain good vibration reduction correction effect, the following conditional expression (2) is preferably satisfied;

$$0.008 < F4/(F4F \times F4R \times Nd) < 0.015 \qquad (2)$$

where Nd denotes the average refractive index at d-line of the lens elements consisting of the middle group G4M.

When the ratio F4/(F4F×F4R×Nd) exceeds the upper limit of conditional expression (2), degradation of imaging performance caused by vibration reduction correction becomes large in the periphery, so that it is not preferable. When the ratio falls below the lower limit of conditional expression (2), the diameter of the middle group G4M becomes large, so that it is not preferable that the weight of the middle group G4M, which is the lens group for vibration reduction correction, becomes heavy. When the upper limit is set to 0.012, degradation of optical performance caused by vibration reduction correction and the weight of the vibration reduction correction lens group can be balanced well. Furthermore, when the lower limit of conditional expression (2) is set to 0.010, degradation of optical performance caused by vibration reduction correction and the weight of the vibration reduction correction lens group can further be balanced well.

The following conditional expression (3) defines an appropriate range of the ratio of the diameter and refractive power of the fourth lens group including the vibration reduction correction lens group;

$$0.40 < |(\Phi F \times F4R)/(F4 \times \Phi M)| < 0.80 \qquad (3)$$

where ΦF denotes the maximum diameter of the front group G4F, and ΦM denotes the maximum diameter of the middle group G4M.

When the ratio exceeds the upper limit of conditional expression (3), positive distortion becomes large in the telephoto end state, so that it is undesirable. On the other hand, when the ratio falls below the lower limit of conditional expression (3), telephoto ratio of the fourth lens group becomes large, and the total lens length becomes large, so that it is undesirable. Moreover, the diameter of the middle group G4M becomes large, so that the weight of the middle group, which is the vibration reduction correction lens group, becomes heavy. Therefore, it is undesirable. The upper and lower limits are preferably set to 0.70 and 0.50, respectively.

Then, the preferable power distribution of each lens group is explained. The following conditional expression (4) is preferably satisfied;

$$0.70 < |(FT \times F23T \times F4M)/(F1 \times F4F \times F4R)| < 1.20 \qquad (4)$$

where FT denotes the focal length of the zoom lens system in the telephoto end state, F1 denotes the focal length of the first lens group G1, and F23T denotes the composite focal length of the second lens group G2 and the third lens group G3 in the telephoto end state.

When the value |(FT×F23T×F4M)/(F1×F4F×F4R)| exceeds the upper limit of conditional expression (4), the effective diameter of each lens group located to the image side of the second lens group becomes large, so that the diameter of the lens barrel becomes large. It is undesirable. In addition, it is undesirable that the total lens length of the zoom lens system becomes large. On the other hand, when the value falls below the lower limit of conditional expression (4), variation of spherical aberration upon zooming becomes large, so that it is undesirable. When the upper limit is set to 1.00, it is preferable that the balance of the total lens length, the lens diameter, and aberration becomes good. Moreover, when the lower limit is set to 0.90, it is preferable that the balance of the total lens length, the lens diameter, and aberration becomes good.

Examples according to the first embodiment of the present invention are explained below with reference to accompanying drawings. In examples as shown in FIGS. 1, 8, 15, 22, the large aperture internal focusing telephoto zoom lens system according to the first embodiment of the present invention include, in order from an object, a first lens group G1 having positive refractive power, a second lens group G2 having negative refractive power, a third lens group G3 having positive refractive power, and a fourth lens group G4 having positive refractive power.

Zooming is carried out by moving the second lens group G2 and the third lens group G3 along the optical axis.

The fourth lens group G4 is composed of, in order from the object, a front group G4F having positive refractive power, a middle group G4M having negative refractive power, and a rear group G4R having positive refractive power.

Vibration reduction correction is carried out by shifting the middle group G4M in the direction perpendicular to the optical axis.

The first lens group G1 having positive refractive power is composed of a front lens group G1F fixed along the optical axis relative to the image plane I and a rear lens group G1R movable along the optical axis. Focusing is carried out by moving the rear lens group G1R along the optical axis.

EXAMPLE 1

FIG. 1 is a diagram showing the lens arrangement of a large aperture internal focusing telephoto zoom lens system according to Example 1 of a first embodiment of the present invention, together with the lens group positions in a wide-angle end state when the system is focused at infinity. The first lens group G1 is composed of, in order from the object, the front lens group G1F and the rear lens group G1R. The front lens group G1F is composed of, in order from the object, a cemented negative lens constructed by a negative meniscus lens L11 having a convex surface facing to the object cemented with a positive meniscus lens L12 having a convex surface facing to the object, and a positive meniscus lens L13 having a convex surface facing to the object. The rear lens group G1R is composed of, in order from the object, a negative meniscus lens L14 having a convex surface facing to the object, and a positive meniscus lens L15 having a convex surface facing to the object. The second lens group G2 is composed of, in order from the object, a double concave lens L21 having a stronger concave surface facing to the image, a cemented positive lens constructed by a double concave lens L22 cemented with a double convex lens L23, and a double concave lens L24 having a stronger concave surface facing to the object. The third lens group G3 is composed of, in order from the object, a positive meniscus lens L31 having a concave surface facing to the object, and a cemented positive lens constructed by a double convex lens L32 cemented with a negative meniscus lens L33 having a concave surface facing to the object. The fourth lens group G4 is composed of, in order from the object, a front group G4F having positive refractive power, a middle group G4M having negative refractive power, and a rear group G4R having positive refractive power. The front group G4F is composed of, in order from the object, an aperture stop S1, a cemented positive lens constructed by a negative meniscus lens L41 having a convex surface facing to the object cemented with a double convex lens L42, a positive meniscus lens L43 having a convex surface facing to the object, and a field stop S2 separated by a wide air space. The middle group G4M is composed of, in order from the object, a cemented negative lens constructed by a double convex lens L44 cemented with a double concave lens L45, and a double concave lens L46. The rear group G4R is composed of, in order from the object, a field stop S3, a positive meniscus lens L47 having a concave surface facing to the object, a cemented positive lens constructed by a double convex lens L48 cemented with a negative meniscus lens L49 having a concave surface facing to the object.

Various values associated with Example 1 are listed in Table 1. In Table 1, F denotes the focal length of the zoom lens system, FNO denotes the f-number, β denotes the imaging magnification, BF denotes back focal length, D0 denotes the distance between an object and the object side surface of the lens L11 in the first lens group G1. The number in the left side column denotes surface number in order from the object, r denotes radius of curvature of each optical surface, d denotes a distance along the optical axis between adjacent optical surfaces, nd denotes refractive index of a medium between adjacent optical surfaces at d-line (λ=587.6 nm), ν denotes Abbe number of a medium between adjacent optical surfaces, and refractive index of the air 1.000000 is abbreviated. ΦF denotes the maximum diameter of the front group G4F, and ΦM denotes the maximum diameter of the middle group G4M.

In the tables for various values, "mm" is generally used for the unit of length such as the focal length, the radius of curvature, and the separation between optical surfaces. However, since an optical system proportionally enlarged or reduced its dimension can be obtained similar optical performance, the unit is not necessary to be limited to "mm" and any other suitable unit can be used.

The above-mentioned explanation can be applied to any other examples in the present invention.

TABLE 1

(Specifications)

| F: | 71.40 | 194.00 mm |
|---|---|---|
| FNO: | 2.9 | |

(Lens Data)

| | r | d | ν | nd | Φ |
|---|---|---|---|---|---|
| 1) | 136.2696 | 2.2000 | 46.58 | 1.804000 | |
| 2) | 65.9210 | 9.0000 | 82.52 | 1.497820 | |
| 3) | 184.6175 | 0.1000 | | | |
| 4) | 73.1041 | 8.9000 | 82.52 | 1.497820 | |

TABLE 1-continued

| | | | | | |
|---|---|---|---|---|---|
| 5) | 435.0246 | (D5) | | | |
| 6) | 65.0851 | 1.8000 | 23.78 | 1.846660 | |
| 7) | 51.8175 | 1.9200 | | | |
| 8) | 63.2160 | 8.7000 | 60.09 | 1.640000 | |
| 9) | 1772.4929 | (D9) | | | |
| 10) | −1067.2040 | 1.9000 | 52.67 | 1.741000 | |
| 11) | 34.3923 | 6.8350 | | | |
| 12) | −61.8566 | 1.8000 | 70.41 | 1.487490 | |
| 13) | 39.4340 | 7.0000 | 25.43 | 1.805180 | |
| 14) | −223.2401 | 1.8030 | | | |
| 15) | −64.5266 | 1.9000 | 39.59 | 1.804400 | |
| 16) | 872.3457 | (D16) | | | |
| 17) | −599.1428 | 3.9000 | 82.52 | 1.497820 | |
| 18) | −73.5485 | 0.2000 | | | |
| 19) | 93.8405 | 8.0000 | 82.52 | 1.497820 | |
| 20) | −48.5670 | 2.0000 | 52.67 | 1.741000 | |
| 21) | −149.5043 | (D21) | | | |
| 22> | | 1.0000 | | Aperture Stop S1 | |
| 23) | 117.0055 | 2.0000 | 25.43 | 1.805180 | ΦF = 37.4 |
| 24) | 44.6950 | 7.0000 | 55.52 | 1.696800 | |
| 25) | −325.3499 | 0.1000 | | | |
| 26) | 76.1777 | 3.5000 | 65.47 | 1.603000 | |
| 27) | 152.3247 | 19.0000 | | | |
| 28) | | 1.6216 | | Field Stop S2 | |
| 29) | 376.5966 | 3.8000 | 23.78 | 1.846660 | ΦM = 30.4 |
| 30) | −57.8860 | 1.5000 | 52.67 | 1.741000 | |
| 31) | 50.0430 | 3.9000 | | | |
| 32) | −246.5579 | 1.5000 | 52.67 | 1.741000 | |
| 33) | 102.2448 | 2.6784 | | | |
| 34) | | 4.0000 | | Field Stop S3 | |
| 35) | −427.7771 | 4.0000 | 82.52 | 1.497820 | |
| 36) | −58.2736 | 0.1000 | | | |
| 37) | 68.1118 | 7.5000 | 52.67 | 1.741000 | |
| 38) | −60.1400 | 2.0000 | 23.78 | 1.846660 | |
| 39) | −641.0882 | BF | | | |

(Variable distance upon focusing and zooming)

| | Wide-angle | Middle | Telephoto |
|---|---|---|---|
| | <Focused at infinity> | | |
| F | 71.4000 | 105.0000 | 194.0000 |
| D0 | ∞ | ∞ | ∞ |
| D5 | 14.15950 | 14.15950 | 14.15950 |
| D9 | 2.52314 | 17.06549 | 31.15139 |
| D16 | 34.06279 | 25.29743 | 1.96176 |
| D21 | 7.92945 | 2.15247 | 11.40223 |
| BF | 66.21049 | 66.21049 | 66.21049 |
| | <Focused at closest distance> | | |
| β | −0.06001 | −0.08825 | −0.16473 |
| D0 | 1241.9566 | 1241.9566 | 1241.9566 |
| D5 | 4.43994 | 4.43994 | 4.43994 |
| D9 | 12.24271 | 26.78505 | 40.87095 |
| D16 | 34.06279 | 25.29743 | 1.96176 |
| D21 | 7.92945 | 2.15247 | 11.40223 |
| BF | 66.21049 | 66.21049 | 66.21049 |

(Moving Amount for Vibration reduction correction)
<Focused at infinity>

| F | 71.4000 | 105.0000 | 194.0000 |
|---|---|---|---|
| G4M | 0.257 | 0.378 | 0.706 |
| Image Plane | −0.374 | −0.550 | −1.026 |
| | <Focused at closest distance> | | |
| β | −0.06001 | −0.08825 | −0.16473 |
| G4M | 0.324 | 0.477 | 0.890 |
| Image Plane | −0.471 | −0.693 | −1.294 |

TABLE 1-continued (Values for Conditional Expressions)

<Various Values>

FT = 196.0000
F1 = 99.1163
F23T = −56.8024
F4 = 110.8427
F4F = 94.9170
F4M = −46.9447
F4R = 55.9165
ΦF = 37.4
ΦM = 30.4
nd1 = 1.84666
nd2 = 1.74100
nd3 = 1.74100
Nd = 1.77622

(1) | (F4 · F4M)/(F4F · F4R)| = 0.98
(2) F4/(F4F · F4R · Nd) = 0.012
(3) | (ΦF · F4R)/(F4 · ΦM)| = 0.62
(4) | (FT · F23T · F4M)/(F1 · F4F · F4R)| = 0.99

FIGS. 2, 3, 4 graphically show various aberrations of the zoom lens system according to Example 1 of the first embodiment in the wide-angle end state, the intermediate focal length state, and the telephoto end state, respectively, when the system is focused at infinity. FIGS. 5, 6, 7 graphically show various aberrations of the zoom lens system in the wide-angle end state, the intermediate focal length state, and the telephoto end state, respectively, when the system is focused at the closest focusing distance (R=1500 mm). As is apparent from the respective graphs showing various aberrations, excellent compensation is made for various aberrations upon operating vibration reduction correction as well as common use.

In respective graphs, Y denotes an image height, FNO denotes the f-number, d denotes d-line (λ=587.6 nm), g denotes g-line (λ=435.6 nm), C denotes C-line (λ=656.3 nm), and F denotes F-line (λ=486.1 nm). In the graphs showing spherical aberration, f-number according to the maximum aperture or the maximum NA value is shown. In the graphs showing astigmatism or distortion, the value of the maximum image height Y is shown. In the graphs showing coma, the value of each image height Y is shown. In the graphs showing astigmatism, a solid line indicates a sagittal image plane, and a broken line indicates a meridional image plane. In all aberration graphs of the following examples, the same denotations are applied.

EXAMPLE 2

Figure 8:
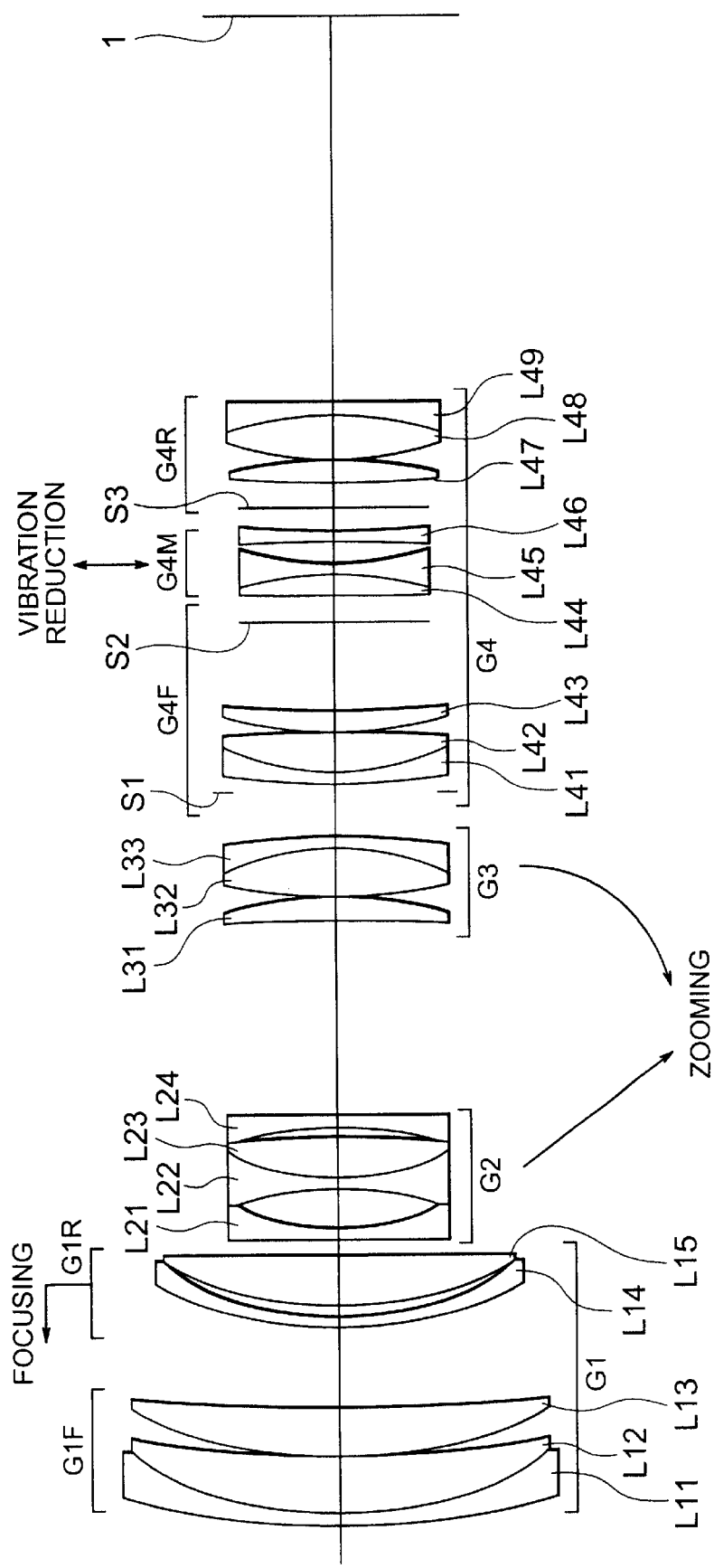
FIG. 8 is a diagram showing the lens arrangement of a large aperture internal focusing telephoto zoom lens system according to Example 2 of the first embodiment of the present invention.

FIG. 8 is a diagram showing the lens arrangement of a large aperture internal focusing telephoto zoom lens system according to Example 2 of the first embodiment of the present invention, together with the lens group positions in a wide-angle end state when the system is focused at infinity. The first lens group G1 is composed of, in order from the object, the front lens group G1F and the rear lens group G1R. The front lens group G1F is composed of, in order from the object, a cemented negative lens constructed by a negative meniscus lens L11 having a convex surface facing to the object cemented with a positive meniscus lens L12 having a convex surface facing to the object, and a positive meniscus lens L13 having a convex surface facing to the object. The rear lens group G1R is composed of, in order from the object, a negative meniscus lens L14 having a convex surface facing to the object, and a positive meniscus lens L15 having a convex surface facing to the object. The second lens group G2 is composed of, in order from the object, a double concave lens L21 having a stronger concave surface facing to the image, a cemented positive lens constructed by a double concave lens L22 cemented with a double convex lens L23, and a double concave lens L24 having a stronger concave surface facing to the object. The third lens group G3 is composed of, in order from the object, a positive meniscus lens L31 having a concave surface facing to the object, and a cemented positive lens constructed by a double convex lens L32 cemented with a negative meniscus lens L33 having a concave surface facing to the object. The fourth lens group G4 is composed of, in order from the object, a front group G4F having positive refractive power, a middle group G4M having negative refractive power, and a rear group G4R having positive refractive power. The front group G4F is composed of, in order from the object, an aperture stop S1, a cemented positive lens constructed by a negative meniscus lens L41 having a convex surface facing to the object cemented with a double convex lens L42, a positive meniscus lens L43 having a convex surface facing to the object, and a field stop S2 separated by a wide air space. The middle group G4M is composed of, in order from the object, a cemented negative lens constructed by a double convex lens L44 cemented with a double concave lens L45, and a double concave lens L46. The rear group G4R is composed of, in order from the object, a field stop S3, a double convex lens L47, a cemented positive lens constructed by a double convex lens L48 cemented with a double concave lens L49 having a stronger concave surface facing to the object.

Various values associated with Example 2 are listed in Table 2.

TABLE 2

(Specifications)

F: 71.40 194.00 mm
FNO: 2.9

(Lens Data)

| | r | d | ν | nd | Φ |
|---|---|---|---|---|---|
| 1) | 126.3773 | 2.2000 | 46.58 | 1.804000 | |
| 2) | 65.7766 | 9.0000 | 82.52 | 1.497820 | |
| 3) | 159.5964 | 0.1000 | | | |
| 4) | 73.8770 | 8.9000 | 82.52 | 1.497820 | |
| 5) | 451.9658 | (D5) | | | |
| 6) | 67.1317 | 1.8000 | 23.78 | 1.846660 | |
| 7) | 51.9368 | 1.9200 | | | |
| 8) | 60.7960 | 8.7000 | 60.09 | 1.640000 | |
| 9) | 1565.8593 | (D9) | | | |
| 10) | −1112.7902 | 1.9000 | 52.67 | 1.741000 | |
| 11) | 34.3494 | 6.8350 | | | |
| 12) | −62.3446 | 1.8000 | 70.41 | 1.487490 | |
| 13) | 38.8362 | 7.0000 | 25.43 | 1.805180 | |
| 14) | −193.0012 | 1.8030 | | | |
| 15) | −63.6864 | 1.9000 | 39.59 | 1.804400 | |
| 16) | 540.0800 | (D16) | | | |
| 17) | −1202.2321 | 3.9000 | 82.52 | 1.497820 | |
| 18) | −76.5701 | 0.2000 | | | |
| 19) | 90.1566 | 8.0000 | 82.52 | 1.497820 | |
| 20) | −48.0656 | 2.0000 | 52.67 | 1.741000 | |
| 21) | −122.4072 | (D21) | | | |
| 22> | | 1.0000 | | Aperture Stop S1 | |
| 23) | 129.6536 | 2.0000 | 25.43 | 1.805180 | ΦF = 36.53 |
| 24) | 45.4526 | 7.0000 | 55.52 | 1.696800 | |
| 25) | −1801.6164 | 0.1000 | | | |
| 26) | 82.8502 | 3.5000 | 65.47 | 1.603000 | |
| 27) | 216.6834 | 16.0000 | | | |
| 28) | | 4.5189 | | Field Stop S2 | |

TABLE 2-continued

| | | | | |
|---|---|---|---|---|
| 29) | 335.1253 | 3.8000 | 23.78 | 1.846660 ΦM = 30.10 |
| 30) | −64.4592 | 1.5000 | 52.67 | 1.741000 |
| 31) | 51.9884 | 3.9000 | | |
| 32) | −251.8830 | 1.5000 | 52.32 | 1.754999 |
| 33) | 110.1392 | 4.7734 | | |
| 34) | | 4.0000 | | Field Stop S3 |
| 35) | 201.3765 | 4.0000 | 47.10 | 1.623741 |
| 36) | −72.0797 | 0.1000 | | |
| 37) | 72.9037 | 7.5000 | 52.67 | 1.741000 |
| 38) | −66.5189 | 2.0000 | 23.78 | 1.846660 |
| 39) | 302.5105 | BF | | |

(Variable distance upon focusing and zooming)

| | Wide-angle | Middle | Telephoto |
|---|---|---|---|
| <Focused at infinity> | | | |
| F | 71.4000 | 105.0000 | 196.0000 |
| D0 | ∞ | ∞ | ∞ |
| D5 | 13.31963 | 13.31963 | 13.31963 |
| D9 | 2.58690 | 17.43453 | 31.12481 |
| D16 | 33.75993 | 24.90255 | 1.83433 |
| D21 | 8.30728 | 2.31703 | 11.69497 |
| BF | 64.53453 | 64.53453 | 64.53452 |
| <Focused at closest distance> | | | |
| β | −0.06004 | −0.08829 | −0.16482 |
| D0 | 1241.9624 | 1241.9624 | 1241.9624 |
| D5 | 3.60012 | 3.60012 | 3.60012 |
| D9 | 12.30641 | 27.15404 | 40.84432 |
| D16 | 33.75993 | 24.90255 | 1.83433 |
| D21 | 8.30728 | 2.31703 | 11.69497 |
| BF | 64.53713 | 64.54015 | 64.53534 |

(Moving Amount for Vibration reduction correction)

| | Wide-angle | Middle | Telephoto |
|---|---|---|---|
| <Focused at infinity> | | | |
| F | 71.4000 | 105.0000 | 194.0000 |
| G4M | 0.271 | 0.399 | 0.744 |
| Image Plane | −0.374 | −0.550 | −1.026 |
| <Focused at closest distance> | | | |
| β | −0.06004 | −0.08829 | −0.16482 |
| G4M | 0.342 | 0.502 | 0.939 |
| Image Plane | −0.471 | −0.693 | −1.294 |

(Values for Conditional Expressions)

<Various Values>

FT = 196.0000
F1 = 99.1163
F23T = −64.4749
F4 = 121.2375
F4F = 115.2040
F4M = −49.5136
F4R = 55.9165
ΦF = 36.6
ΦM = 30.1
nd1 = 1.84666
nd2 = 1.74100
nd3 = 1.75500
Nd = 1.78089

(1) | (F4 · F4M)/(F4F · F4R) | = 0.93
(2) F4/(F4F · F4R · Nd) = 0.011
(3) | (ΦF · F4R)/(F4 · ΦM) | = 0.56
(4) | (FT · F23T · F4M)/(F1 · F4F · F4R) | = 0.98

FIGS. 9, 10, 11 graphically show various aberrations of the zoom lens system according to Example 2 of the first embodiment in the wide-angle end state, the intermediate focal length state, and the telephoto end state, respectively, when the system is focused at infinity. FIGS. 12, 13, 14 graphically show various aberrations of the zoom lens system in the wide-angle end state, the intermediate focal length state, and the telephoto end state, respectively, when the system is focused at the closest focusing distance (R=1500 mm). As is apparent from the respective graphs showing various aberrations, excellent compensation is made for various aberrations upon operating vibration reduction correction as well as common use.

EXAMPLE 3

Figure 15:
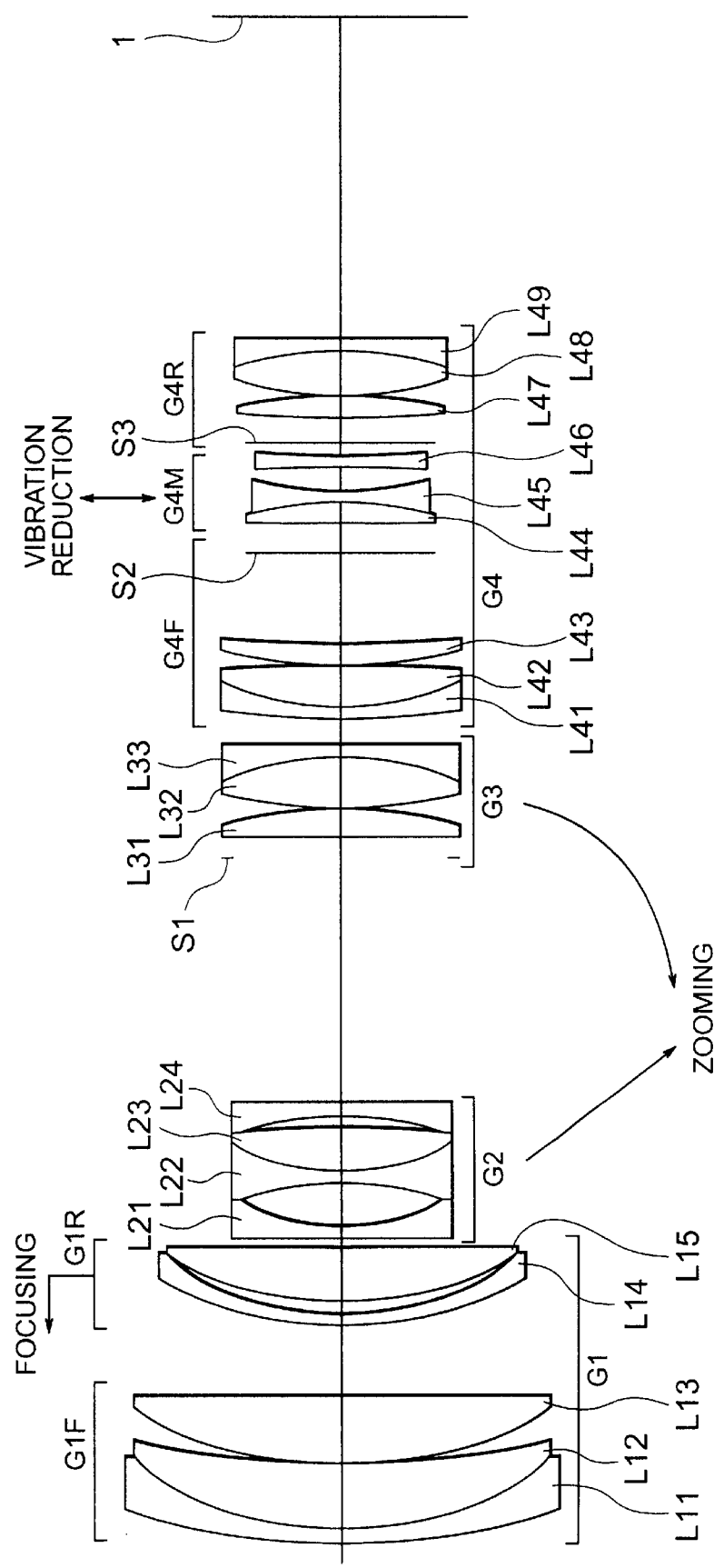
FIG. 15 is a diagram showing the lens arrangement of a large aperture internal focusing telephoto zoom lens system according to Example 3 of the first embodiment of the present invention.

FIG. 15 is a diagram showing the lens arrangement of a large aperture internal focusing telephoto zoom lens system according to Example 3 of the first embodiment of the present invention, together with the lens group positions in a wide-angle end state when the system is focused at infinity. The first lens group G1 is composed of, in order from the object, the front lens group G1F and the rear lens group G1R. The front lens group G1F is composed of, in order from the object, a cemented negative lens constructed by a negative meniscus lens L11 having a convex surface facing to the object cemented with a positive meniscus lens L12 having a convex surface facing to the object, and a positive meniscus lens L13 having a convex surface facing to the object. The rear lens group G1R is composed of, in order from the object, a negative meniscus lens L14 having a convex surface facing to the object, and a positive meniscus lens L15 having a convex surface facing to the object. The second lens group G2 is composed of, in order from the object, a negative meniscus lens L21 having a convex surface facing to the object, a cemented positive lens constructed by a double concave lens L22 cemented with a double convex lens L23, and a negative meniscus lens L24 having a concave surface facing to the object. The third lens group G3 is composed of, in order from the object, an aperture stop S1, a double convex lens L31, and a cemented positive lens constructed by a double convex lens L32 cemented with a double concave lens L33. The fourth lens group G4 is composed of, in order from the object, a front group G4F having positive refractive power, a middle group G4M having negative refractive power, and a rear group G4R having positive refractive power. The front group G4F is composed of, in order from the object, a cemented positive lens constructed by a negative meniscus lens L41 having a convex surface facing to the object cemented with a double convex lens L42, a positive meniscus lens L43 having a convex surface facing to the object, and a field stop S2 separated by a wide air space. The middle group G4M is composed of, in order from the object, a cemented negative lens constructed by a double convex lens L44 cemented with a double concave lens L45, and a double concave lens L46. The rear group G4R is composed of, in order from the object, a field stop S3, a double convex lens L47, a cemented positive lens constructed by a double convex lens L48 cemented with a negative meniscus lens L49 having a concave surface facing to the object.

Various values associated with Example 3 are listed in Table 3.

TABLE 3

(Specifications)

| F: | 71.40 | 194.00 mm |
|---|---|---|
| FNO: | 2.9 | |

(Lens Data)

| | r | d | ν | nd | Φ |
|---|---|---|---|---|---|
| 1) | 109.0944 | 2.2000 | 46.58 | 1.804000 | |
| 2) | 55.0918 | 10.0000 | 82.52 | 1.497820 | |
| 3) | 135.5123 | 0.1000 | | | |

TABLE 3-continued

| | | | | | |
|---|---|---|---|---|---|
| 4) | 65.5193 | 11.0000 | 82.52 | 1.497820 | |
| 5) | 878.5311 | (D5) | | | |
| 6) | 59.8131 | 1.8000 | 23.78 | 1.846660 | |
| 7) | 47.9430 | 1.9200 | | | |
| 8) | 59.3584 | 8.7000 | 60.09 | 1.640000 | |
| 9) | 1206.2633 | (D9) | | | |
| 10) | 1053.7403 | 1.9000 | 52.67 | 1.741000 | |
| 11) | 31.2921 | 7.5000 | | | |
| 12) | −69.6566 | 1.8000 | 70.41 | 1.487490 | |
| 13) | 35.4608 | 7.0000 | 25.43 | 1.805180 | |
| 14) | −419.3723 | 2.5000 | | | |
| 15) | −56.2072 | 1.9000 | 39.59 | 1.804400 | |
| 16) | −2565.1581 | (D16) | | | |
| 17> | | 3.0000 | | Aperture Stop S1 | |
| 18) | 687.5841 | 5.0000 | 69.98 | 1.518601 | |
| 19) | −74.6081 | 0.2000 | | | |
| 20) | 75.9721 | 8.0000 | 82.52 | 1.497820 | |
| 21) | −56.4588 | 2.0000 | 52.67 | 1.741000 | |
| 22) | 878.4289 | (D22) | | | |
| 23) | 113.7215 | 2.0000 | 25.43 | 1.805180 | ΦF = 38.8 |
| 24) | 45.3259 | 7.0000 | 55.52 | 1.696800 | |
| 25) | −307.1976 | 0.1000 | | | |
| 26) | 75.0582 | 3.5000 | 65.47 | 1.603000 | |
| 27) | 156.8938 | 15.0000 | | | |
| 28) | | 4.4821 | | Field Stop S2 | |
| 29) | 2411.5564 | 3.8000 | 23.78 | 1.846660 | ΦM = 28.8 |
| 30) | −46.0408 | 1.5000 | 52.67 | 1.741000 | |
| 31) | 51.6170 | 3.9000 | | | |
| 32) | −331.9035 | 1.5000 | 48.04 | 1.716999 | |
| 33) | 88.9391 | 2.2442 | | | |
| 34) | | 3.8000 | | Field Stop S3 | |
| 35) | 814.4461 | 4.0000 | 82.52 | 1.497820 | |
| 36) | −65.2212 | 0.1000 | | | |
| 37) | 66.7128 | 7.5000 | 52.67 | 1.741000 | |
| 38) | −60.5069 | 2.0000 | 23.78 | 1.846660 | |
| 39) | −682.7106 | BF | | | |

(Variable distance upon focusing and zooming)

| | Wide-angle | Middle | Telephoto |
|---|---|---|---|
| <Focused at infinity> | | | |
| F | 71.4000 | 105.0000 | 196.0000 |
| D0 | ∞ | ∞ | ∞ |
| D5 | 11.75253 | 11.75253 | 11.75253 |
| D9 | 1.19540 | 12.93312 | 24.62715 |
| D16 | 39.76191 | 30.17697 | 3.78764 |
| D22 | 4.19534 | 2.04255 | 16.73787 |
| BF | 73.81741 | 73.81741 | 73.81741 |
| <Focused at closest distance> | | | |
| β | −0.06013 | −0.08842 | −0.16505 |
| D0 | 1235.2254 | 1235.2254 | 1235.2254 |
| D5 | 3.48889 | 3.48889 | 3.48889 |
| D9 | 9.45904 | 21.19676 | 32.89078 |
| D16 | 39.76191 | 30.17697 | 3.78763 |
| D22 | 4.19534 | 2.04255 | 16.73787 |
| BF | 73.81741 | 73.81741 | 73.81741 |

(Moving Amount for Vibration reduction correction)

| | Wide-angle | Middle | Telephoto |
|---|---|---|---|
| <Focused at infinity> | | | |
| F | 71.4000 | 105.0000 | 194.0000 |
| G4M | 0.226 | 0.332 | 0.619 |
| Image Plane | −0.374 | −0.550 | −1.026 |
| <Focused at closest distance> | | | |
| β | −0.06013 | −0.08842 | −0.16505 |
| G4M | 0.285 | 0.419 | 0.782 |
| Image Plane | −0.472 | −0.694 | −1.296 |

TABLE 3-continued (Values for Conditional Expressions)

<Various Values>

FT = 196.0000
F1 = 89.3190
F23T = −47.3622
F4 = 105.1234
F4F = 90.0000
F4M = −44.5975
F4R = 53.1207
ΦF = 38.8
ΦM = 29.8
nd1 = 1.84666
nd2 = 1.74100
nd3 = 1.71700
Nd = 1.76822
(1) | (F4 · F4M)/(F4F · F4R) | = 0.98
(2) F4/ (F4F · F4R · Nd) = 0.012
(3) | (ΦF · F4R)/(F4 · ΦM) | = 0.66
(4) | (FT · F23T · F4M)/(F1 · F4F · F4R) | = 0.97

FIGS. 16, 17, 18 graphically show various aberrations of the zoom lens system according to Example 3 of the first embodiment in the wide-angle end state, the intermediate focal length state, and the telephoto end state, respectively, when the system is focused at infinity. FIGS. 19, 20, 21 graphically show various aberrations of the zoom lens system in the wide-angle end state, the intermediate focal length state, and the telephoto end state, respectively, when the system is focused at the closest focusing distance (R=1500 mm). As is apparent from the respective graphs showing various aberrations, excellent compensation is made for various aberrations upon operating vibration reduction correction as well as common use.

EXAMPLE 4

Figure 22:
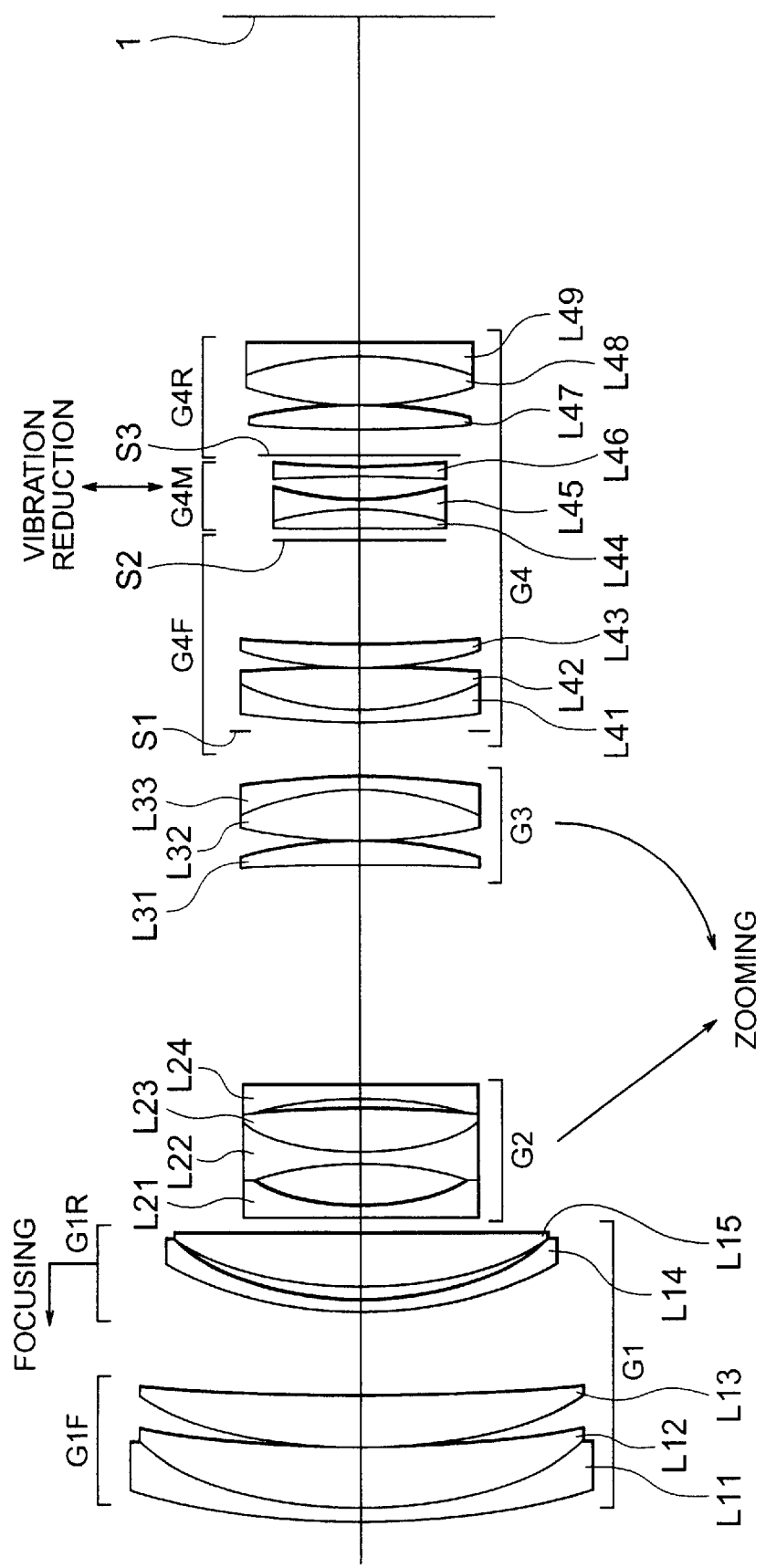
FIG. 22 is a diagram showing the lens arrangement of a large aperture internal focusing telephoto zoom lens system according to Example 4 of the first embodiment of the present invention.

FIG. 22 is a diagram showing the lens arrangement of a large aperture internal focusing telephoto zoom lens system according to Example 4 of the first embodiment of the present invention, together with the lens group positions in a wide-angle end state when the system is focused at infinity. The first lens group G1 is composed of, in order from the object, the front lens group G1F and the rear lens group G1R. The front lens group G1F is composed of, in order from the object, a cemented negative lens constructed by a negative meniscus lens L11 having a convex surface facing to the object cemented with a positive meniscus lens L12 having a convex surface facing to the object, and a positive meniscus lens L13 having a convex surface facing to the object. The rear lens group G1R is composed of, in order from the object, a negative meniscus lens L14 having a convex surface facing to the object, and a positive meniscus lens L15 having a convex surface facing to the object. The second lens group G2 is composed of, in order from the object, a double concave lens L21 having a stronger concave surface facing to the image, a cemented positive lens constructed by a double concave lens L22 cemented with a double convex lens L23, and a negative meniscus lens L24 having a concave surface facing to the object. The third lens group G3 is composed of, in order from the object, a positive meniscus lens L31 having a concave surface facing to the object, and a cemented positive lens constructed by a double convex lens L32 cemented with a negative meniscus lens L33 having a concave surface facing to the object. The fourth lens group G4 is composed of, in order from the object, a front group G4F having positive refractive power, a middle group G4M having negative refractive power, and a rear group G4R having positive refractive power. The front group G4F is composed of, in order from the object, an aperture stop S1, a cemented positive lens constructed by a negative meniscus lens L41 having a convex surface facing to the object cemented with a double convex lens L42, a positive meniscus lens L43 having a convex surface facing to the object, and a field stop S2 separated by a wide air space. The middle group G4M is composed of, in order from the object, a cemented negative lens constructed by a double convex lens L44 cemented with a double concave lens L45, and a double concave lens L46. The rear group G4R is composed of, in order from the object, a field stop S3, a positive meniscus lens L47 having a concave surface facing to the object, a cemented positive lens constructed by a double convex lens L48 cemented with a negative meniscus lens L49 having a concave surface facing to the object.

Various values associated with Example 4 are listed in Table 4.

TABLE 4

(Specifications)

| F: | 71.40 | 194.00 mm |
|---|---|---|
| FNO: | 2.9 | |

(Lens Data)

| | r | d | ν | nd | Φ |
|---|---|---|---|---|---|
| 1) | 112.7919 | 2.2000 | 46.58 | 1.804000 | |
| 2) | 61.3912 | 10.0000 | 82.52 | 1.497820 | |
| 3) | 152.6280 | 0.1000 | | | |
| 4) | 70.7792 | 9.5000 | 82.52 | 1.497820 | |
| 5) | 490.0069 | (D5) | | | |
| 6) | 65.8897 | 1.8000 | 23.78 | 1.846660 | |
| 7) | 50.2390 | 1.9200 | | | |
| 8) | 58.8118 | 8.7000 | 60.09 | 1.640000 | |
| 9) | 1374.5711 | (D9) | | | |
| 10) | −1062.4201 | 1.9000 | 52.67 | 1.741000 | |
| 11) | 31.8517 | 6.8350 | | | |
| 12) | −57.1143 | 1.8000 | 70.41 | 1.487490 | |
| 13) | 38.1561 | 7.0000 | 25.43 | 1.805180 | |
| 14) | −212.6685 | 1.8030 | | | |
| 15) | −63.9088 | 1.9000 | 39.59 | 1.804400 | |
| 16) | −1030.2355 | (D16) | | | |
| 17) | −8754.5308 | 3.9000 | 82.52 | 1.497820 | |
| 18) | −95.7952 | 0.2000 | | | |
| 19) | 106.0199 | 8.0000 | 82.52 | 1.497820 | |
| 20) | −53.8938 | 2.0000 | 52.67 | 1.741000 | |
| 21) | −168.9201 | (D21) | | | |
| 22> | | 1.0000 | | | Aperture Stop S1 |
| 23) | 108.4963 | 2.0000 | 25.43 | 1.805180 | ΦF = 37.4 |
| 24) | 39.3588 | 7.0000 | 55.52 | 1.696800 | |
| 25) | −284.6682 | 0.1000 | | | |
| 26) | 72.8187 | 3.5000 | 46.54 | 1.804109 | |
| 27) | 112.6497 | 19.0000 | | | |
| 28) | | 1.4631 | | | Field Stop S2 |
| 29) | 376.5966 | 3.8000 | 23.78 | 1.846660 | ΦM = 26.8 |
| 30) | −57.8860 | 1.5000 | 52.67 | 1.741000 | |
| 31) | 50.0430 | 3.9000 | | | |
| 32) | −246.5579 | 1.5000 | 52.67 | 1.741000 | |
| 33) | 102.2448 | 2.7087 | | | |
| 34) | | 4.0000 | | | Field Stop S3 |
| 35) | −996.3581 | 4.0000 | 82.52 | 1.497820 | |
| 36) | −63.7397 | 0.1000 | | | |
| 37) | 68.7664 | 7.5000 | 52.67 | 1.741000 | |
| 38) | −63.3264 | 2.0000 | 23.78 | 1.846660 | |
| 39) | −580.2262 | BF | | | |

TABLE 4-continued (Variable distance upon focusing and zooming)

| | Wide-angle | Middle | Telephoto |
|---|---|---|---|
| <Focused at infinity> | | | |
| F | 71.4000 | 105.0000 | 196.0000 |
| D0 | ∞ | ∞ | ∞ |
| D5 | 12.68549 | 12.68549 | 12.68549 |
| D9 | 3.33478 | 15.78418 | 28.06737 |
| D16 | 39.14669 | 29.08243 | 1.82331 |
| D21 | 8.16563 | 5.78049 | 20.75642 |
| BF | 66.58874 | 66.58874 | 66.58874 |
| <Focused at closest distance> | | | |
| β | −0.06006 | −0.08833 | −0.16487 |
| D0 | 1235.4488 | 1235.4488 | 1235.4488 |
| D5 | 3.55394 | 3.55394 | 3.55394 |
| D9 | 12.46633 | 24.91574 | 37.19892 |
| D16 | 39.14669 | 29.08243 | 1.82331 |
| D21 | 8.16563 | 5.78049 | 20.75642 |
| BF | 66.58874 | 66.58874 | 66.58874 |

(Moving Amount for Vibration reduction correction)

| | <Focused at infinity> | | |
|---|---|---|---|
| F | 71.4000 | 105.0000 | 194.0000 |
| G4M | 0.256 | 0.376 | 0.701 |
| Image Plane | −0.374 | −0.550 | −1.026 |
| | <Focused at closest distance> | | |
| β | −0.06006 | −0.08833 | −0.16487 |
| G4M | 0.323 | 0.475 | 0.886 |
| Image Plane | −0.472 | −0.694 | −1.296 |

(Values for Conditional Expressions)

<Various Values>

FT = 196.0000
F1 = 94.0200
F23T = 50.7126
F4 = 105.7238
F4F = 90.0000
F4M = −46.9447
F4R = 55.9165
ΦF = 36.4
ΦM = 30.4
nd1 = 1.84666
nd2 = 1.74100
nd3 = 1.74100
Nd = 1.77622
(1) | (F4 · F4M)/(F4F · F4R) | = 0.99
(2) F4/(F4F · F4R · Nd) = 0.012
(3) | (ΦF · F4R)/(F4 · ΦM) | = 0.63
(4) | (FT · F23T · F4M)/(F1 · F4F · F4R) | = 0.99

FIGS. 23, 24, 25 graphically show various aberrations of the zoom lens system according to Example 4 of the first embodiment in the wide-angle end state, the intermediate focal length state, and the telephoto end state, respectively, when the system is focused at infinity. FIGS. 26, 27, 28 graphically show various aberrations of the zoom lens system in the wide-angle end state, the intermediate focal length state, and the telephoto end state, respectively, when the system is focused at the closest focusing distance (R=1500 mm). As is apparent from the respective graphs showing various aberrations, excellent compensation is made for various aberrations upon operating vibration reduction correction as well as common use.

In the above-described examples, if you do not mind that the diameter of the lens barrel becomes large, it may be possible that vibration reduction correction is carried out by the front group G4F of the fourth lens group G4.

[Second Embodiment]

Figure 29:
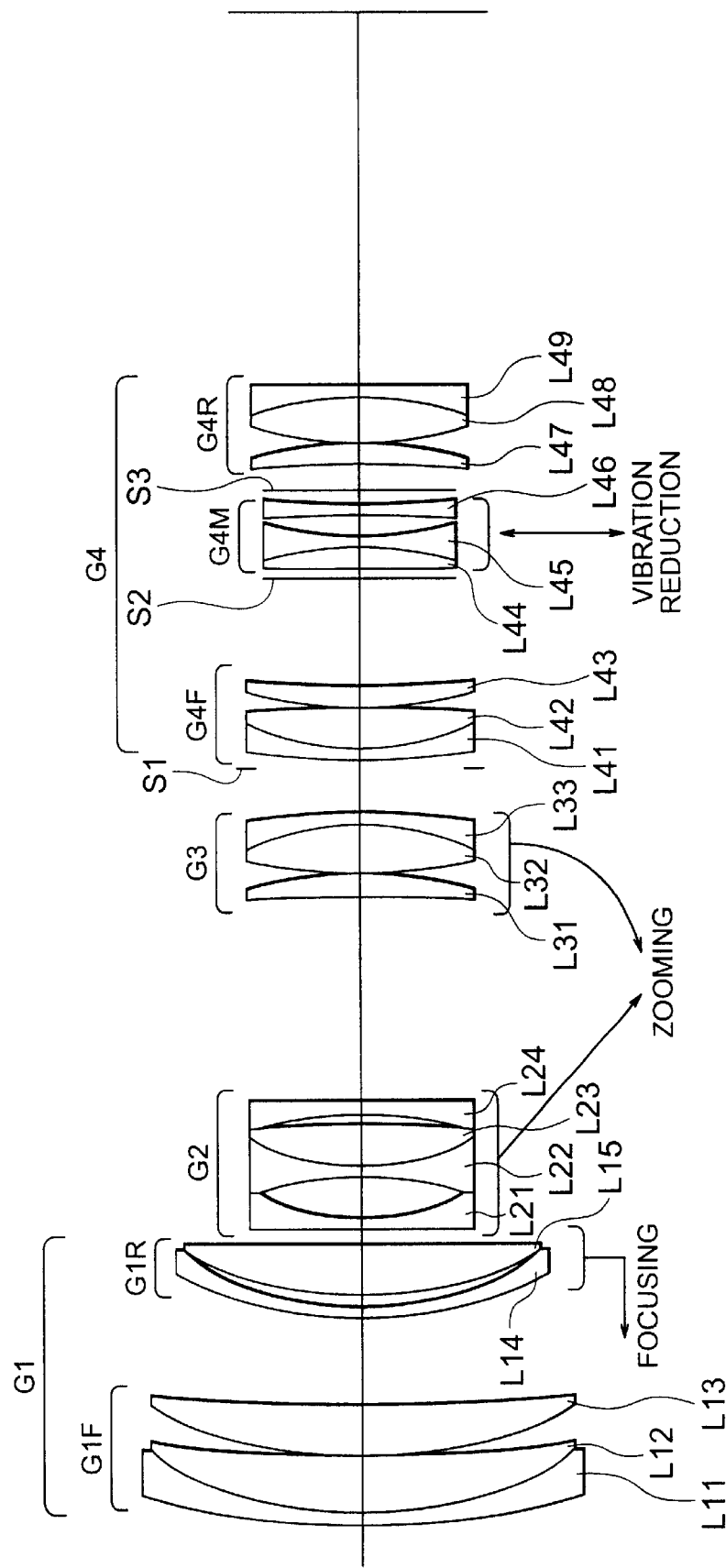
FIG. 29 is a diagram showing the lens arrangement of a large aperture internal focusing telephoto zoom lens system according to Example 5 of a second embodiment of the present invention.

In a second embodiment of the present invention, as shown in FIG. 29, a large aperture internal focusing telephoto zoom lens system includes, in order from an object, a first lens group G1 having positive refractive power, a second lens group G2 having negative refractive power, a third lens group G3 having positive refractive power, and a fourth lens group G4 having positive refractive power. Zooming is carried out by moving the second lens group G2 and the third lens group G3 along the optical axis.

The first lens group G1 is composed of, in order from the object, a front lens group G1F having positive refractive power, and a rear lens group G1R having stronger positive refractive power than that of the front lens group G1F. The focusing at closest distance is carried out by moving the rear lens group G1R along the optical axis.

The front lens group G1F is composed of, in order from the object, a negative meniscus lens L11 having a convex surface facing to the object, a positive lens L12 having a convex surface facing to the object, and a positive lens L13 having a convex surface facing to the object.

The rear lens group G1R is composed of, in order from the object, a negative meniscus lens L14 having a convex surface facing to the object, and a positive lens L15.

The following conditional expressions (5) and (6) are satisfied;

$$0.5<(F1 \times F4)/(|F23W| \times FW)<1.2 \qquad (5)$$

$$1.0 \times 10^{-3} < v5/(F1 \times F1R \times N15) < 2.6 \times 10^{-3} \qquad (6)$$

where FW denotes the focal length of the zoom lens system in the wide-angle end state, F1 denotes the focal length of the first lens group G1, F1R denotes the focal length of the rear lens group G1R, N15 denotes refractive index of the positive lens L15 in the rear lens group G1R at d-line, v15 denotes Abbe number of the positive lens L15 in the rear lens group G1R, |F23W| denotes the composite focal length of the second lens group G2 and the third lens group G3 in the wide-angle end state, and F4 denotes the focal length of the fourth lens group G4.

When the ratio (F1×F4)/(|F23W|×FW) exceeds the upper limit of conditional expression (5), the effective diameter of the fourth lens group G4 becomes too large, so that it is undesirable. On the other hand, when the ratio falls below the lower limit of conditional expression (5), variation of spherical aberration upon zooming becomes large, so that it is undesirable. When the upper limit of conditional expression (5) is set to 1.0, the effective diameter of the lens barrel can be smaller. Moreover, when the lower limit of conditional expression (5) is set to 0.7, variation of spherical aberration upon zooming can further be smaller.

When the ratio v15/(F1×F1R×N15) exceeds the upper limit of conditional expression (6), positive refractive power of the rear lens group G1R (focusing lens group) becomes strong. Moreover, the radius of curvature to the object side of the positive lens L15 consisting of the rear lens group G1R tends to become small. In either case, in order to secure the predetermined effective diameter, the thickness of the positive lens L15 in the rear lens group G1R becomes large. Accordingly, the weight of the focusing lens group becomes heavy, so that it is undesirable. On the other hand, when the ratio falls below the lower limit of conditional expression (6), the moving amount of the focusing lens group upon focusing becomes large, so that it is undesirable. When the upper limit of conditional expression (6) is set to $2.5 \times 10^{-3}$, the focusing lens group can further be smaller. When the lower limit of conditional expression (6) is set to $1.55 \times 10^{-3}$, the moving amount of focusing lens group upon focusing can further be smaller.

Furthermore, in the large aperture internal focusing telephoto zoom lens system according to the present invention, to be smaller the variation of distortion upon zooming, the following conditional expression (7) is satisfied;

$$0.10<|F23|/|F23W|<0.45 \qquad (7)$$

where F23T denotes the composite focal length of the second lens group G2 and the third lens group G3 in the telephoto end state.

When the ratio |F23T|/|F23W| exceeds the upper limit of conditional expression (7), the back focal distance BF becomes too long, so that it is undesirable. On the other hand, when the ratio falls below the lower limit of conditional expression (7), variation of distortion upon zooming becomes large, so that it is undesirable. When the upper limit is set to 0.40, variation of distortion upon zooming becomes preferable. When the lower limit is set to 0.20, the back focal length BF becomes preferable.

Furthermore, in the large aperture internal focusing telephoto zoom lens system according to the present invention, to obtain good optical performance with respect to image flatness, the following conditional expression (8) is satisfied;

$$0.015<FW/(F1 \times |F2|)<0.028 \qquad (8)$$

where F2 denotes the focal length of the second lens group G2.

When the ratio FW/(F1×|F2|) exceeds the upper limit of conditional expression (8), image flatness between intermediate focal length state and telephoto end state become worse, so that it is undesirable. In addition, the lens length of the focusing lens group become long, so that it is undesirable. On the other hand, when the ratio falls below the lower limit of conditional expression (8), the total lens length becomes long, so that it is undesirable. When the upper limit is set to 0.027, the image flatness further improves. When the lower limit is set to 0.020, the total lens length of the zoom lens system becomes further appropriate.

In addition, it is possible to carry out vibration reduction correction by shifting a portion of the fourth lens group G4 in the direction perpendicular to the optical axis.

Examples according to the second embodiment of the present invention are explained below with reference to accompanying drawings. In examples as shown in FIGS. 29, 36, 43, 50, the large aperture internal focusing telephoto zoom lens system according to the second embodiment of the present invention includes, in order from an object, a first lens group G1 having positive refractive power, a second lens group G2 having negative refractive power, a third lens group G3 having positive refractive power, and a fourth lens group G4 having positive refractive power.

Zooming is carried out by moving the second lens group G2 and the third lens group G3 along the optical axis.

The fourth lens group G4 is composed of, in order from the object, a front group G4F having positive refractive power, a middle group G4M having negative refractive power, and a rear group G4R having positive refractive power.

The first lens group G1 having positive refractive power is composed of a front lens group G1F fixed along the optical axis relative to the image plane and a rear lens group G1R movable along the optical axis.

Focusing is carried out by moving the rear lens group G1R along the optical axis.

Each numerical example according to the second embodiment is explained below with reference to accompanying drawings.

EXAMPLE 5

FIG. 29 is a diagram showing the lens arrangement of a large aperture internal focusing telephoto zoom lens system according to Example 5 of the second embodiment of the present invention, together with the lens group positions in a wide-angle end state when the system is focused at infinity. The first lens group G1 is composed of, in order from the object, the front lens group G1F and the rear lens group G1R. The front lens group G1F is composed of, in order from the object, a cemented negative lens constructed by a negative meniscus lens L11 having a convex surface facing to the object cemented with a positive meniscus lens L12 having a convex surface facing to the object, and a positive meniscus lens L13 having a convex surface facing to the object. The rear lens group G1R is composed of, in order from the object, a negative meniscus lens L14 having a convex surface facing to the object, and a positive meniscus lens L15 having a convex surface facing to the object. The second lens group G2 is composed of, in order from the object, a double concave lens L21 having a stronger concave surface facing to the image, a cemented positive lens constructed by a double concave lens L22 cemented with a double convex lens L23, and a double concave lens L24 having a stronger concave surface facing to the object. The third lens group G3 is composed of, in order from the object, a positive meniscus lens L31 having a concave surface facing to the object, and a cemented positive lens constructed by a double convex lens L32 cemented with a negative meniscus lens L33 having a concave surface facing to the object. The fourth lens group G4 is composed of, in order from the object, a front group G4F having positive refractive power, a middle group G4M having negative refractive power, and a rear group G4R having positive refractive power. The front group G4F is composed of, in order from the object, an aperture stop S1, a cemented positive lens constructed by a negative meniscus lens L41 having a convex surface facing to the object cemented with a double convex lens L42, and a positive meniscus lens L43 having a convex surface facing to the object. The middle group G4M is composed of, in order from the object, a field stop S2 separated from the front group G4F by a wide air space, a cemented negative lens constructed by a double convex lens L44 cemented with a double concave lens L45, and a double concave lens L46. The rear group G4R is composed of, in order from the object, a field stop S3, a positive meniscus lens L47 having a concave surface facing to the object, a cemented positive lens constructed by a double convex lens L48 cemented with a negative meniscus lens L49 having a concave surface facing to the object.

Vibration reduction correction is carried out by varying the imaging position by means of shifting the middle group G4M in the fourth lens group G4 in the direction perpendicular to the optical axis.

Various values associated with Example 5 are listed in Table 5.

TABLE 5

(Specifications)

| F: | 71.40 | 194.00 mm |
|---|---|---|
| FNO: | 2.9 | |

(Lens Data)

| | r | d | ν | nd | Φ |
|---|---|---|---|---|---|
| 1) | 136.2696 | 2.2000 | 46.58 | 1.804000 | |
| 2) | 65.9210 | 9.0000 | 82.52 | 1.497820 | |
| 3) | 184.6154 | 0.1000 | | | |

TABLE 5-continued

| | r | d | ν | nd | |
|---|---|---|---|---|---|
| 4) | 73.1041 | 8.9000 | 82.52 | 1.497820 | |
| 5) | 435.0246 | (D5) | | | |
| 6) | 65.0850 | 1.8000 | 23.78 | 1.846660 | |
| 7) | 51.8175 | 1.9280 | | | |
| 8) | 63.2157 | 8.7000 | 60.09 | 1.640000 | |
| 9) | 1776.4073 | (D9) | | | |
| 10) | −1055.8275 | 1.9000 | 52.67 | 1.741000 | |
| 11) | 34.3923 | 6.8180 | | | |
| 12) | −61.8572 | 1.8000 | 70.41 | 1.487490 | |
| 13) | 39.4340 | 7.0000 | 25.43 | 1.805180 | |
| 14) | −223.2318 | 1.8030 | | | |
| 15) | −64.5268 | 1.9000 | 39.59 | 1.804400 | |
| 16) | 879.4447 | (D16) | | | |
| 17) | −603.0187 | 3.9000 | 82.52 | 1.497820 | |
| 18) | −73.6536 | 0.2000 | | | |
| 19) | 93.84058 | 8.0000 | 82.52 | 1.497820 | |
| 20) | −48.5670 | 2.0000 | 52.67 | 1.741000 | |
| 21) | −149.5043 | (D21) | | | |
| 22> | | 1.0000 | | Aperture Stop S1 | |
| 23) | 117.0045 | 2.0000 | 25.43 | 1.805180 | ΦG4 = 37.4 |
| 24) | 44.6950 | 7.0000 | 55.52 | 1.696800 | |
| 25) | −325.3419 | 0.1000 | | | |
| 26) | 76.1767 | 3.5000 | 65.47 | 1.603000 | |
| 27) | 152.3286 | 19.0000 | | | |
| 28) | | 1.6213 | | Field Stop S2 | |
| 29) | 376.6169 | 3.8000 | 23.78 | 1.846660 | |
| 30) | −57.8860 | 1.5000 | 52.67 | 1.741000 | |
| 31) | 50.0430 | 3.9000 | | | |
| 32) | −246.4873 | 1.5000 | 52.67 | 1.741000 | |
| 33) | 102.2323 | 2.6886 | | | |
| 34) | | 4.0000 | | Field Stop S3 | |
| 35) | −434.5973 | 4.0000 | 82.52 | 1.497820 | |
| 36) | −58.2730 | 0.1000 | | | |
| 37) | 68.1122 | 7.5000 | 52.67 | 1.741000 | |
| 38) | −60.2580 | 2.0000 | 23.78 | 1.846660 | |
| 39) | −653.6392 | BF | | | |

(Variable distance upon focusing and zooming)

| | Wide-angle | Middle | Telephoto |
|---|---|---|---|
| <Focused at infinity> | | | |
| F | 71.4000 | 105.0000 | 196.0000 |
| D0 | ∞ | ∞ | ∞ |
| D5 | 14.14643 | 14.14643 | 14.14643 |
| D9 | 2.54301 | 17.07908 | 31.15816 |
| D16 | 34.10864 | 25.33675 | 1.98516 |
| D21 | 7.88238 | 2.11819 | 11.39070 |
| BF | 66.19885 | 66.19885 | 66.19885 |
| <Focused at closest distance> | | | |
| β | −0.06001 | −0.08825 | −0.16473 |
| D0 | 1241.9617 | 1241.9617 | 1241.9617 |
| D5 | 4.42910 | 4.42910 | 4.42910 |
| D9 | 12.26034 | 26.79641 | 40.87549 |
| D16 | 34.10864 | 25.33675 | 1.98516 |
| D21 | 7.88238 | 2.11819 | 11.39070 |
| BF | 66.19885 | 66.19885 | 66.19885 |

(Values for Conditional Expressions)

<Various Values>

FW = 71.4000
FT = 196.0000
F1 = 99.1071
F1R = 151.7802
F2 = −28.8496
F23W = −193.7940
F23T = −56.8149
F4 = 110.8731
N15 = 1.640000
ν15 = 60.09

(5) $(F1 \times F4)/(|F23W| \times FW) = 0.795$
(6) $\nu 15/(F1 \times F1R \times N15) = 2.44 \times 10^{-3}$ TABLE 5-continued (7) |F23T|/|F23W| = 0.293
(8) FW/(F1 × |F2|) = 0.0250

In Example 5, since the maximum diameter ΦG4 of the fourth lens group G4 is 37.4 mm, it can be said that the optical design is rather compact.

Figure 30:
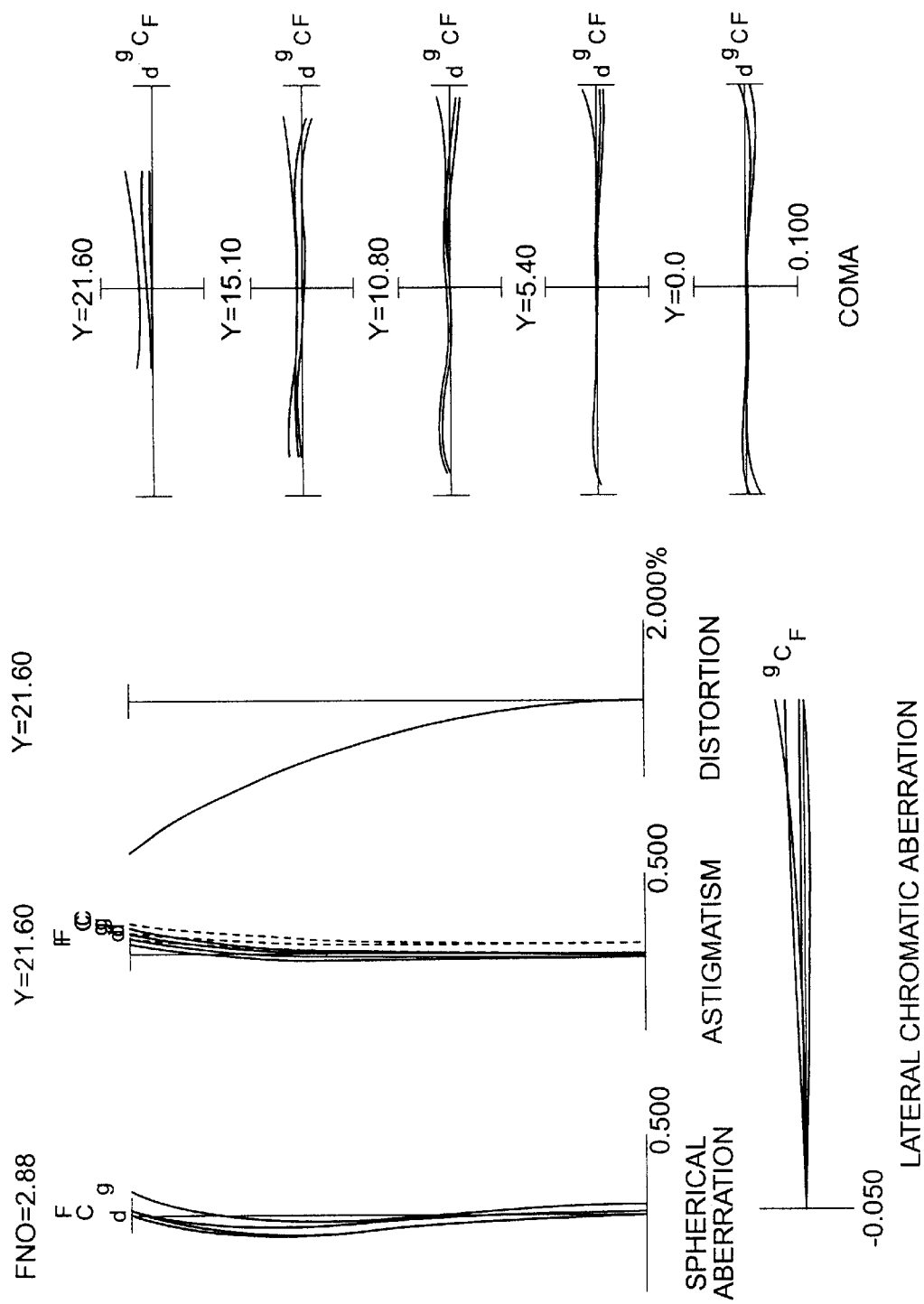
FIG. 30 graphically shows various aberrations of the zoom lens system according to Example 5 of the second embodiment in a wide-angle end state when the system is focused at infinity.
Figure 31:
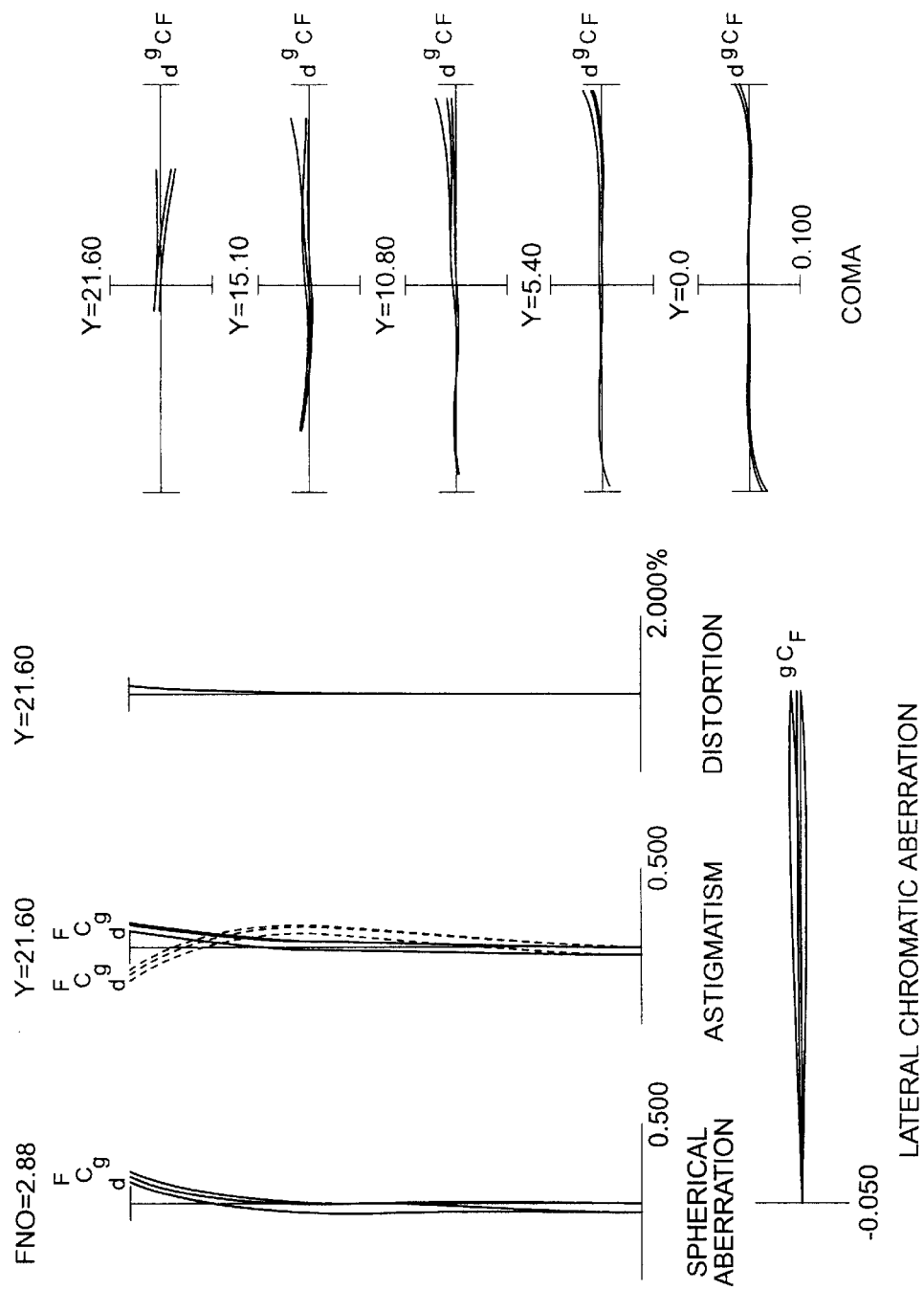
FIG. 31 graphically shows various aberrations of the zoom lens system according to Example 5 of the second embodiment in an intermediate focal length state when the system is focused at infinity.
Figure 32:
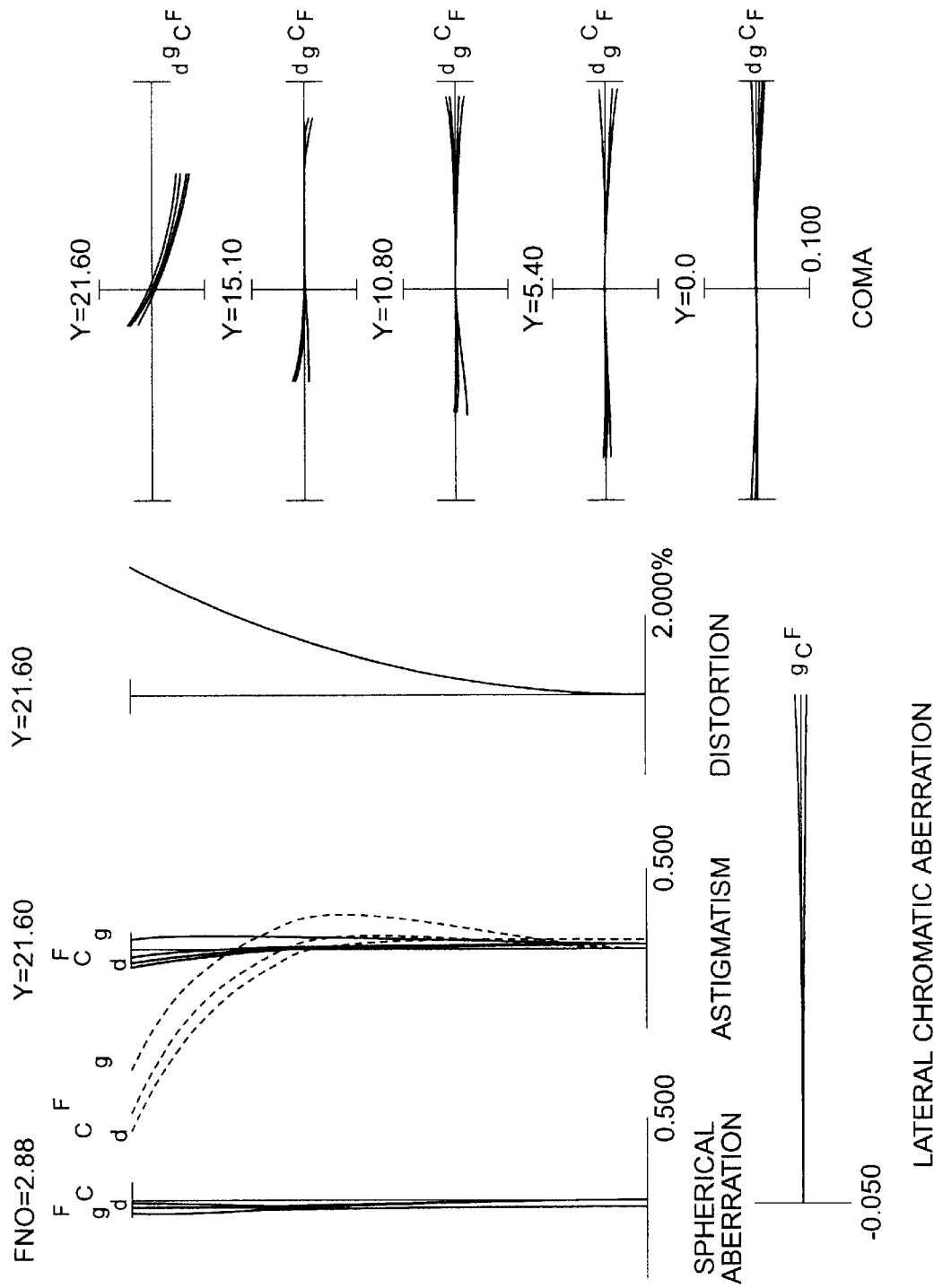
FIG. 32 graphically shows various aberrations of the zoom lens system according to Example 5 of the second embodiment in a telephoto end state when the system is focused at infinity.
Figure 33:
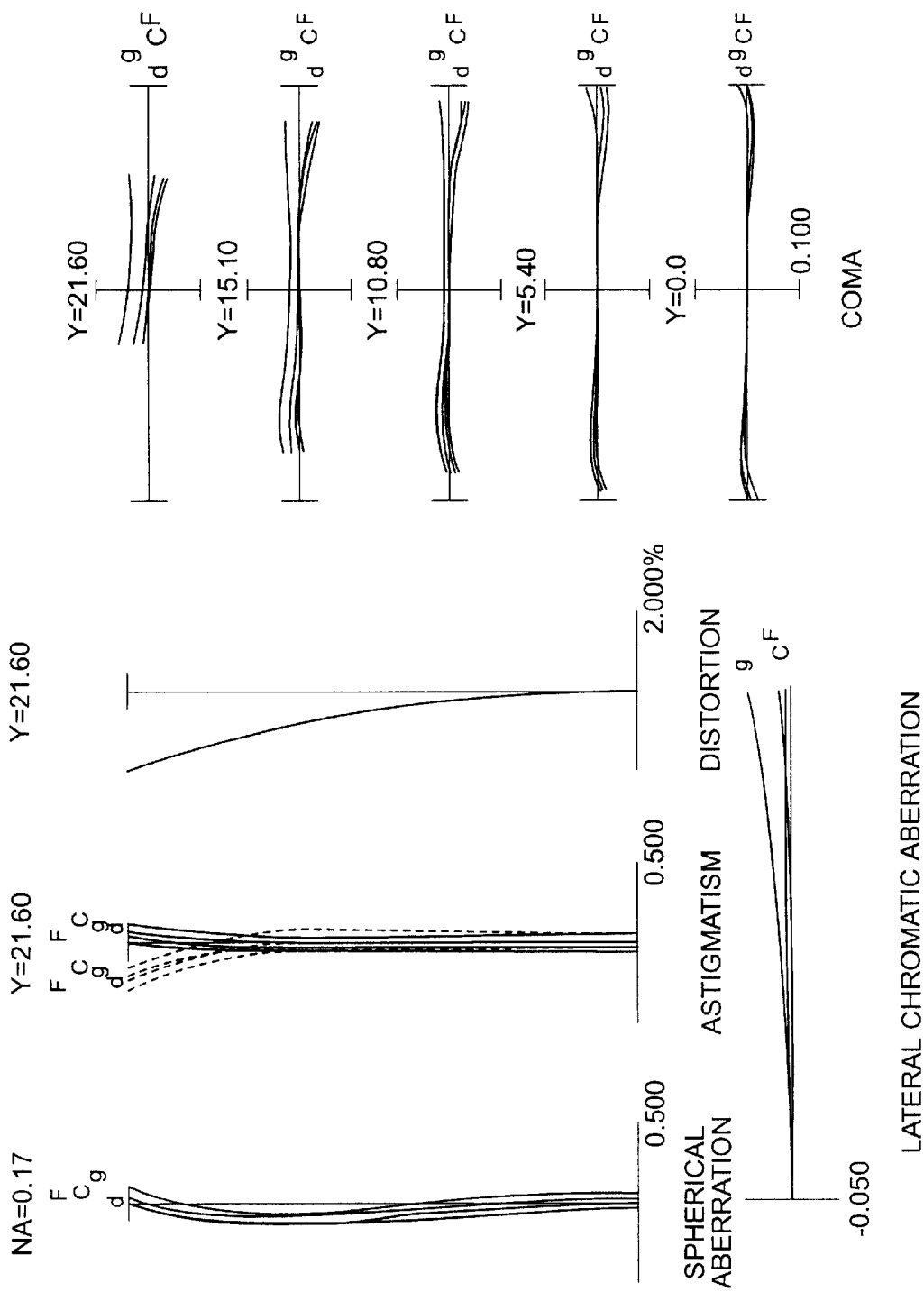
FIG. 33 graphically shows various aberrations of the zoom lens system according to Example 5 of the second embodiment in the wide-angle end state when the system is focused at the closest focusing distance.
Figure 34:
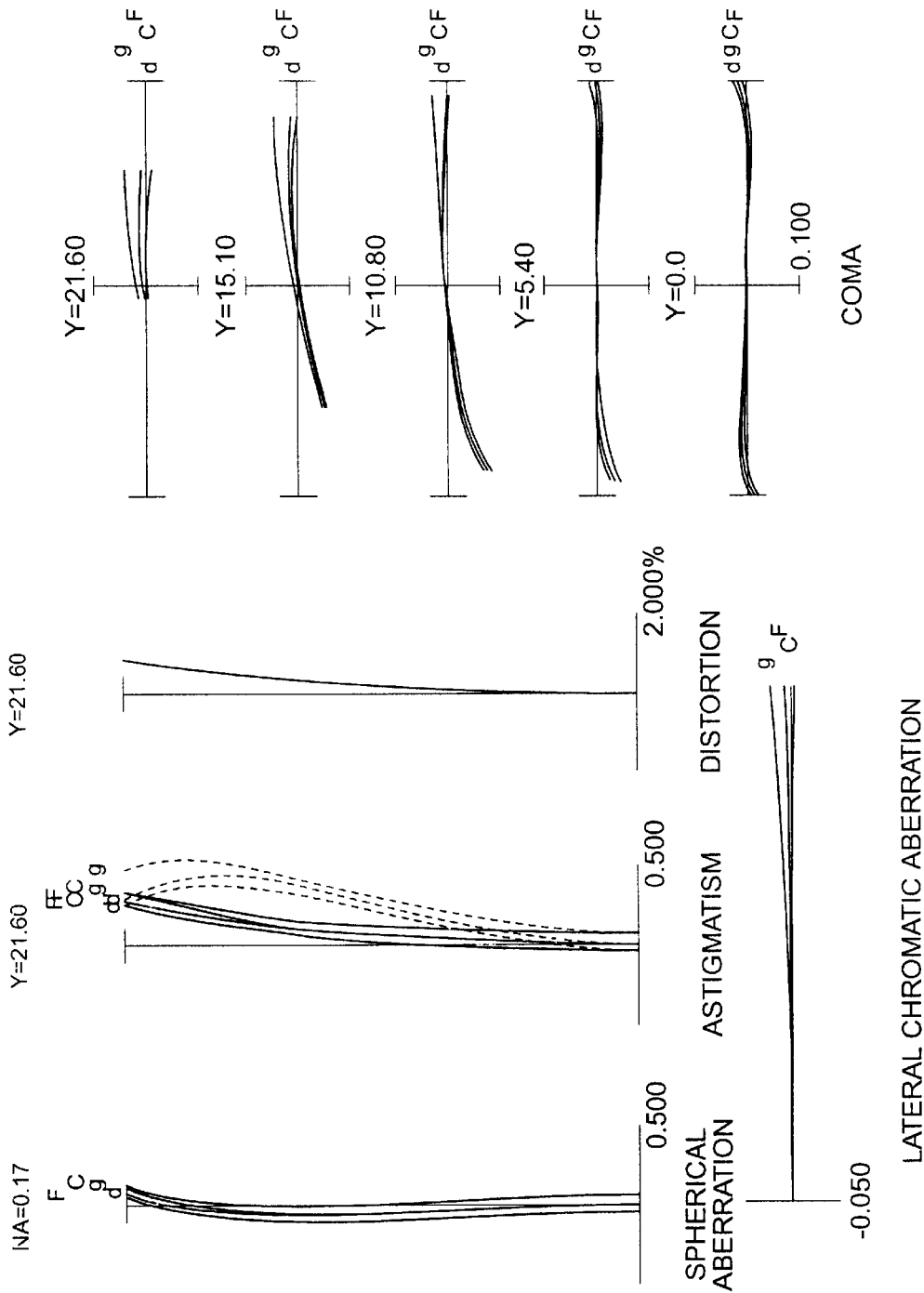
FIG. 34 graphically shows various aberrations of the zoom lens system according to Example 5 of the second embodiment in the intermediate focal length state when the system is focused at the closest focusing distance.
Figure 35:
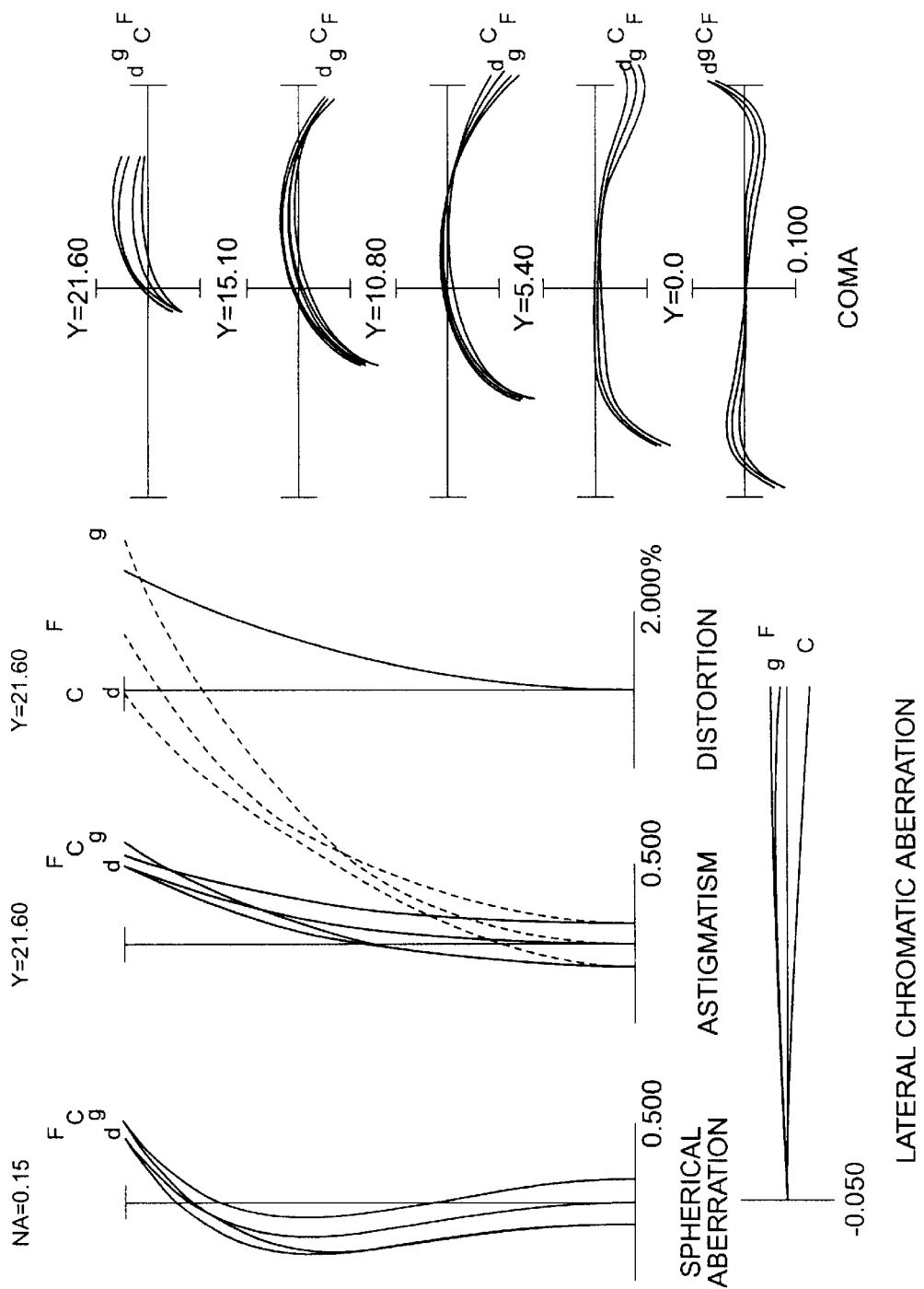
FIG. 35 graphically shows various aberrations of the zoom lens system according to Example 5 of the second embodiment in the telephoto end state when the system is focused at the closest focusing distance.

FIGS. 30, 31, 32 graphically show various aberrations of the zoom lens system according to Example 5 of the second embodiment in the wide-angle end state, the intermediate focal length state, and the telephoto end state, respectively, when the system is focused at infinity. FIGS. 33, 34, 35 graphically show various aberrations of the zoom lens system in the wide-angle end state, the intermediate focal length state, and the telephoto end state, respectively, when the system is focused at the closest focusing distance (R=1500 mm). As is apparent from the respective graphs showing various aberrations, excellent compensation is made for various aberrations.

EXAMPLE 6

Figure 36:
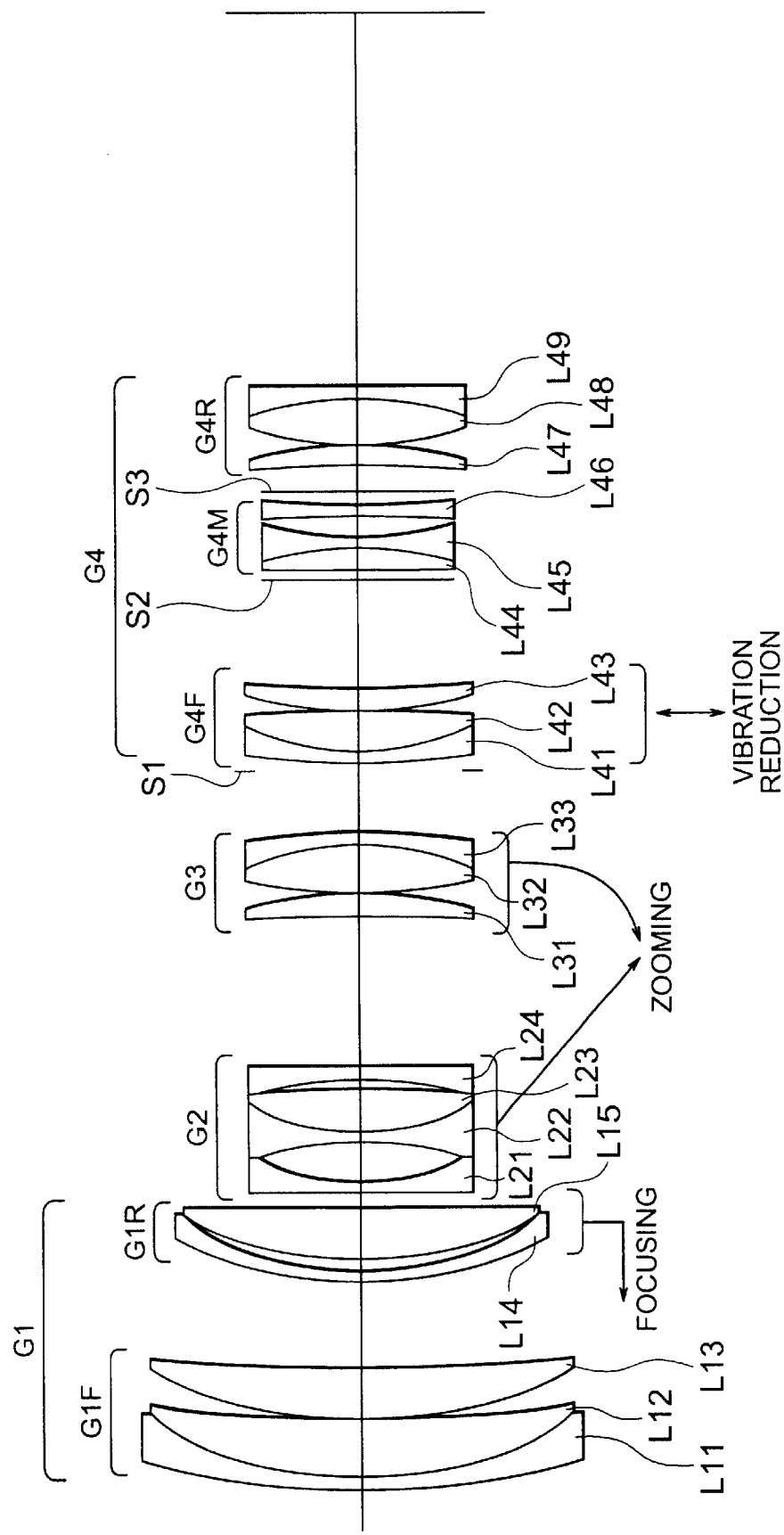
FIG. 36 is a diagram showing the lens arrangement of a large aperture internal focusing telephoto zoom lens system according to Example 6 of the second embodiment of the present invention.

FIG. 36 is a diagram showing the lens arrangement of a large aperture internal focusing telephoto zoom lens system according to Example 6 of the second embodiment of the present invention, together with the lens group positions in a wide-angle end state when the system is focused at infinity. The first lens group G1 is composed of, in order from the object, the front lens group G1F and the rear lens group G1R. The front lens group G1F is composed of, in order from the object, a cemented negative lens constructed by a negative meniscus lens L11 having a convex surface facing to the object cemented with a positive meniscus lens L12 having a convex surface facing to the object, and a positive meniscus lens L13 having a convex surface facing to the object. The rear lens group G1R is composed of, in order from the object, a negative meniscus lens L14 having a convex surface facing to the object, and a positive meniscus lens L15 having a convex surface facing to the object. The second lens group G2 is composed of, in order from the object, a double concave lens L21 having a stronger concave surface facing to the image, a cemented positive lens constructed by a double concave lens L22 cemented with a double convex lens L23, and a double concave lens L24 having a stronger concave surface facing to the object. The third lens group G3 is composed of, in order from the object, a positive meniscus lens L31 having a concave surface facing to the object, and a cemented positive lens constructed by a double convex lens L32 cemented with a negative meniscus lens L33 having a concave surface facing to the object. The fourth lens group G4 is composed of, in order from the object, a front group G4F having positive refractive power, a middle group G4M having negative refractive power, and a rear group G4R having positive refractive power. The front group G4F is composed of, in order from the object, an aperture stop S1, a cemented positive lens constructed by a negative meniscus lens L41 having a convex surface facing to the object cemented with a double convex lens L42, and a positive meniscus lens L43 having a convex surface facing to the object. The middle group G4M is composed of, in order from the object, a field stop S2 separated from the front group G4F by a wide air space, a cemented negative lens constructed by a double convex lens L44 cemented with a double concave lens L45, and a double concave lens L46. The rear group G4R is composed of, in order from the object, a field stop S3, a positive meniscus lens L47 having a concave surface facing to the object, a cemented positive lens constructed by a double convex lens L48 cemented with a negative meniscus lens L49 having a concave surface facing to the object.

Vibration reduction correction is carried out by varying the imaging position by means of shifting the front group G4F in the fourth lens group G4 in the direction perpendicular to the optical axis.

Various values associated with Example 6 are listed in Table 6.

TABLE 6

(Specifications)

F: 71.40 194.00 mm
FNO: 2.9

(Lens Data)

| | r | d | ν | nd | Φ |
|---|---|---|---|---|---|
| 1) | 124.3521 | 2.2000 | 46.58 | 1.804000 | |
| 2) | 64.5767 | 9.0000 | 82.52 | 1.497820 | |
| 3) | 188.7016 | 0.1000 | | | |
| 4) | 71.1599 | 8.9000 | 82.52 | 1.497820 | |
| 5) | 242.0536 | (D5) | | | |
| 6) | 65.0246 | 1.8000 | 23.78 | 1.846660 | |
| 7) | 52.2569 | 2.5000 | | | |
| 8) | 66.9629 | 8.7000 | 60.09 | 1.640000 | |
| 9) | 2181.3005 | (D9) | | | |
| 10) | 835.1704 | 1.9000 | 52.67 | 1.741000 | |
| 11) | 33.3680 | 8.0000 | | | |
| 12) | -54.2429 | 1.8000 | 70.41 | 1.487490 | |
| 13) | 36.8879 | 7.5000 | 25.43 | 1.805180 | |
| 14) | -177.6711 | 2.0000 | | | |
| 15) | -57.6962 | 1.9000 | 39.59 | 1.804400 | |
| 16) | 248.1846 | (D16) | | | |
| 17) | -243.2543 | 3.9000 | 91.03 | 1.446791 | |
| 18) | -55.9190 | 0.2000 | | | |
| 19) | 90.9952 | 8.0000 | 82.52 | 1.497820 | |
| 20) | -43.8137 | 2.0000 | 43.35 | 1.840421 | |
| 21) | -89.9719 | (D21) | | | |
| 22>) | | 1.0000 | | Aperture Stop S1 | |
| 23) | 117.7713 | 2.0000 | 25.43 | 1.805180 | ΦG4 = 37.9 |
| 24) | 48.6970 | 7.0000 | 55.52 | 1.696800 | |
| 25) | -368.6879 | 0.1000 | | | |
| 26) | 75.4366 | 3.5000 | 65.47 | 1.603000 | |
| 27) | 153.1669 | 19.0000 | | | |
| 28) | | 1.5717 | | Field Stop S2 | |
| 29) | 376.6169 | 3.8000 | 23.78 | 1.846660 | |
| 30) | -57.8860 | 1.5000 | 52.67 | 1.741000 | |
| 31) | 50.0430 | 3.9000 | | | |
| 32) | -246.4873 | 1.5000 | 52.67 | 1.741000 | |
| 33) | 102.2323 | 2.6367 | | | |
| 34) | | 4.0000 | | Field Stop S3 | |
| 35) | -493.9055 | 4.0000 | 82.52 | 1.497820 | |
| 36) | -58.2006 | 0.1000 | | | |
| 37) | 70.3277 | 7.5000 | 52.67 | 1.741000 | |
| 38) | -57.8755 | 2.0000 | 23.78 | 1.846660 | |
| 39) | -531.7554 | BF | | | |

(Variable distance upon focusing and zooming)

| | Wide-angle | Middle | Telephoto |
|---|---|---|---|
| <Focused at infinity> | | | |
| F | 71.4000 | 105.0000 | 196.0000 |
| D0 | ∞ | ∞ | ∞ |
| D5 | 14.30683 | 14.30683 | 14.30683 |
| D9 | 1.28113 | 17.93283 | 34.18853 |
| D16 | 26.07101 | 19.86374 | 3.14193 |
| D21 | 12.16200 | 1.71757 | 2.18368 |
| BF | 68.08423 | 68.08423 | 68.08423 |

TABLE 6-continued

<Focused at closest distance>

| β | −0.06026 | −0.08849 | −0.16518 |
|---|---|---|---|
| D0 | 1242.5863 | 1242.5863 | 1242.5863 |
| D5 | 3.44798 | 3.44798 | 3.44798 |
| D9 | 12.13997 | 28.79167 | 45.04737 |
| D16 | 26.07101 | 19.86374 | 3.14193 |
| D21 | 12.16200 | 1.71757 | 2.18368 |
| BF | 68.08423 | 68.08423 | 68.08423 |

(Values for Conditional Expressions)

<Various Values>

FW = 71.4000
FT = 196.0000
F1 = 104.4212
F1R = 160.0000
F2 = −26.0000
F23W = − 191.5950
F23T = −59.7102
F4 = 110.8731
N15 = 1.640000
ν15 = 60.09
(5) (F1 × F4)/(|F23W| × FW) = 0.846
(6) ν15/(F1 × F1R × N15) = 2.19 × 10$^{-3}$
(7) |F23T|/|F23W| = 0.312
(8) FW/(F1 × |F2|) = 0.0263

In Example 6, since the maximum diameter ΦG4 of the fourth lens group G4 is 37.9 mm, it can be said that the optical design is rather compact.

Figure 37:
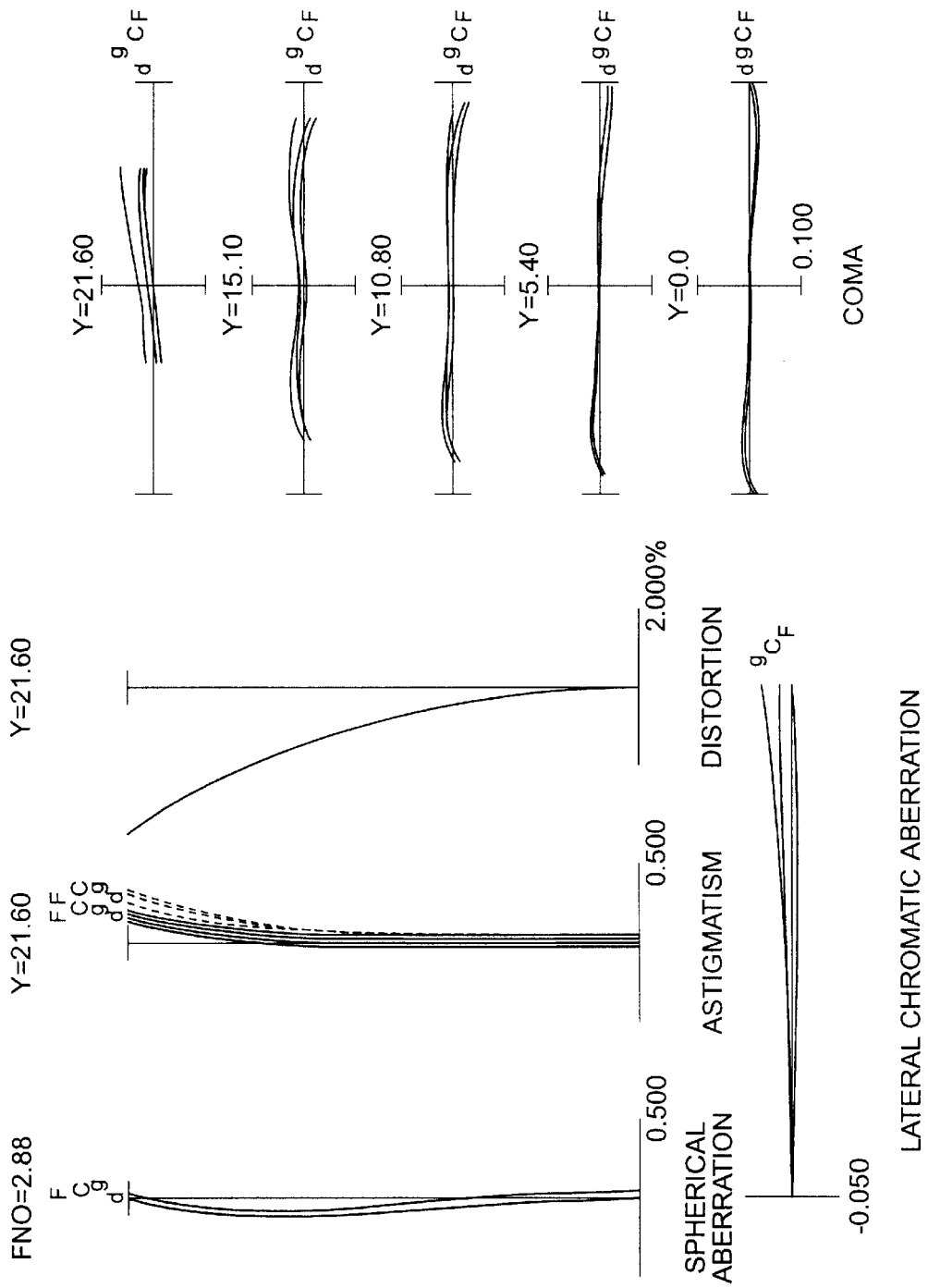
FIG. 37 graphically shows various aberrations of the zoom lens system according to Example 6 of the second embodiment in a wide-angle end state when the system is focused at infinity.
Figure 38:
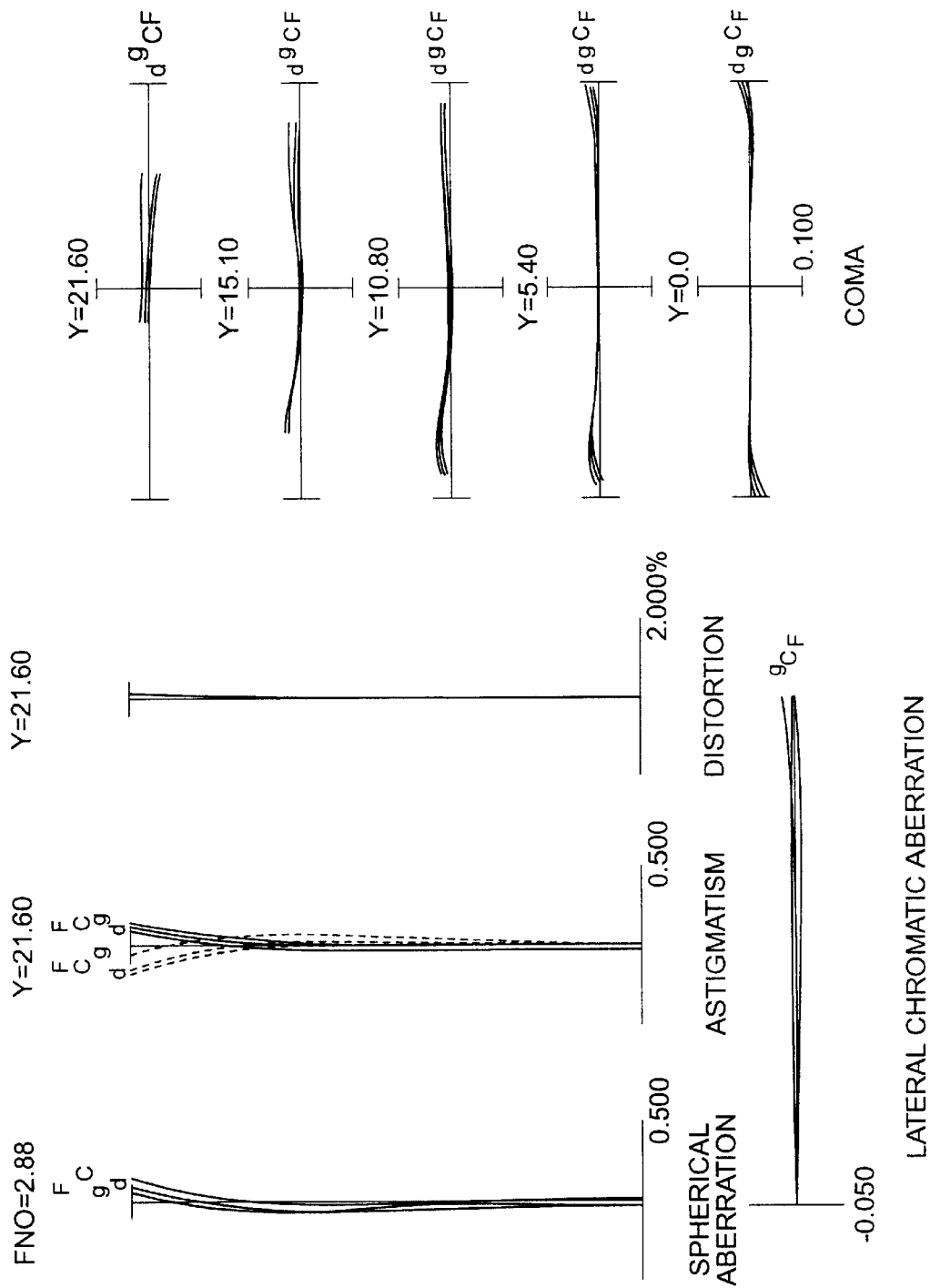
FIG. 38 graphically shows various aberrations of the zoom lens system according to Example 6 of the second embodiment in an intermediate focal length state when the system is focused at infinity.
Figure 39:
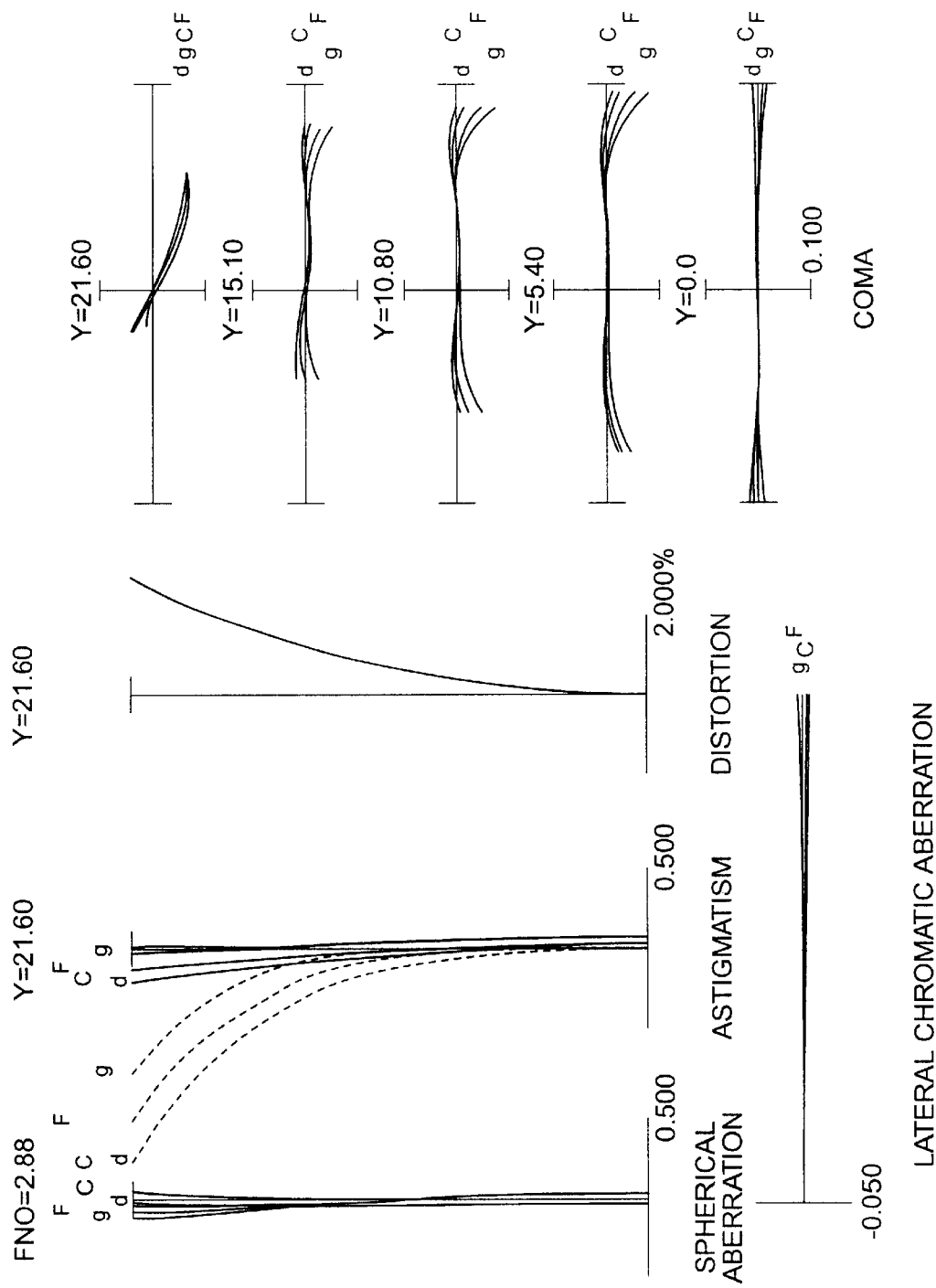
FIG. 39 graphically shows various aberrations of the zoom lens system according to Example 6 of the second embodiment in a telephoto end state when the system is focused at infinity.
Figure 40:
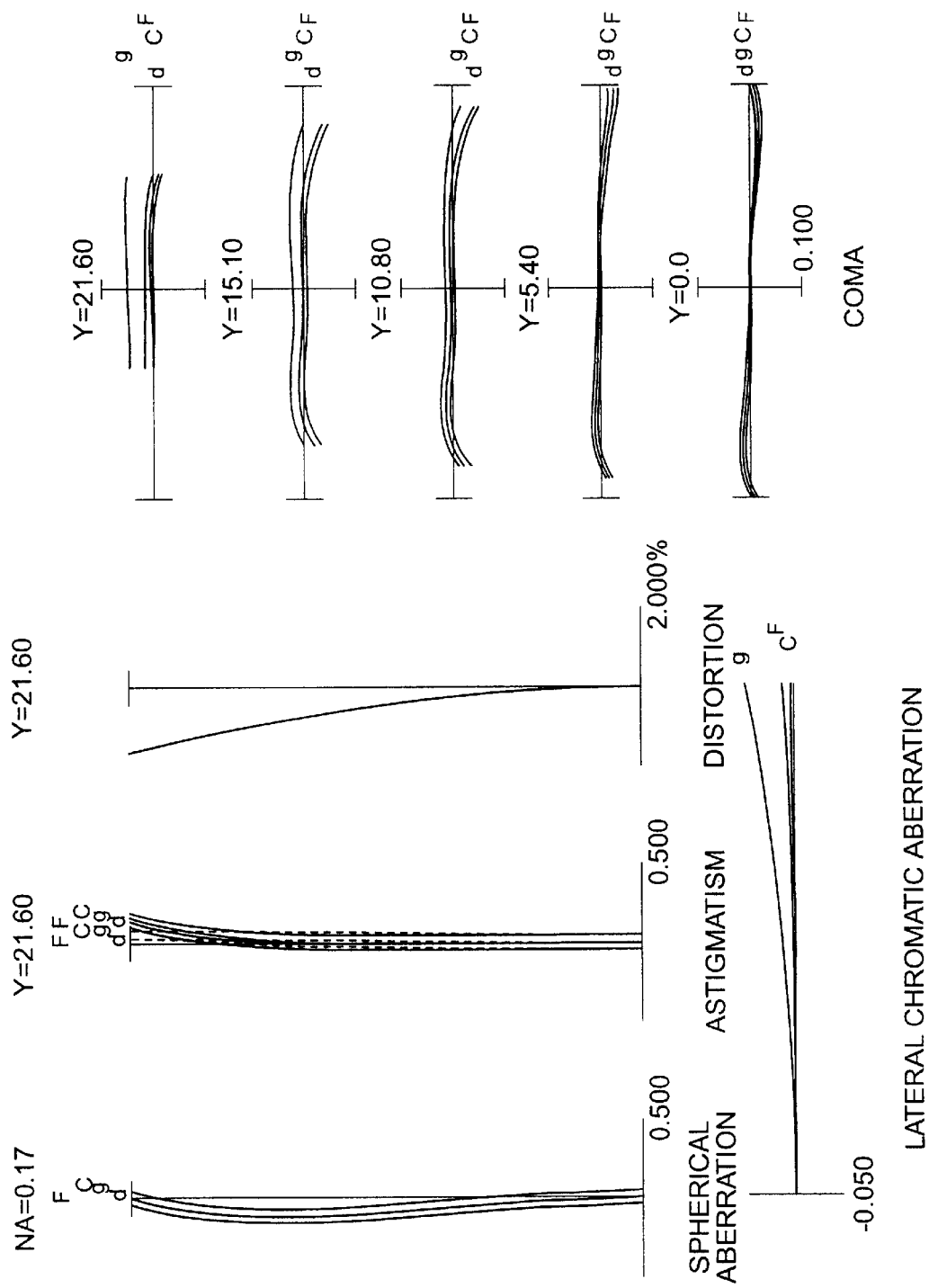
FIG. 40 graphically shows various aberrations of the zoom lens system according to Example 6 of the second embodiment in the wide-angle end state when the system is focused at the closest focusing distance.
Figure 41:
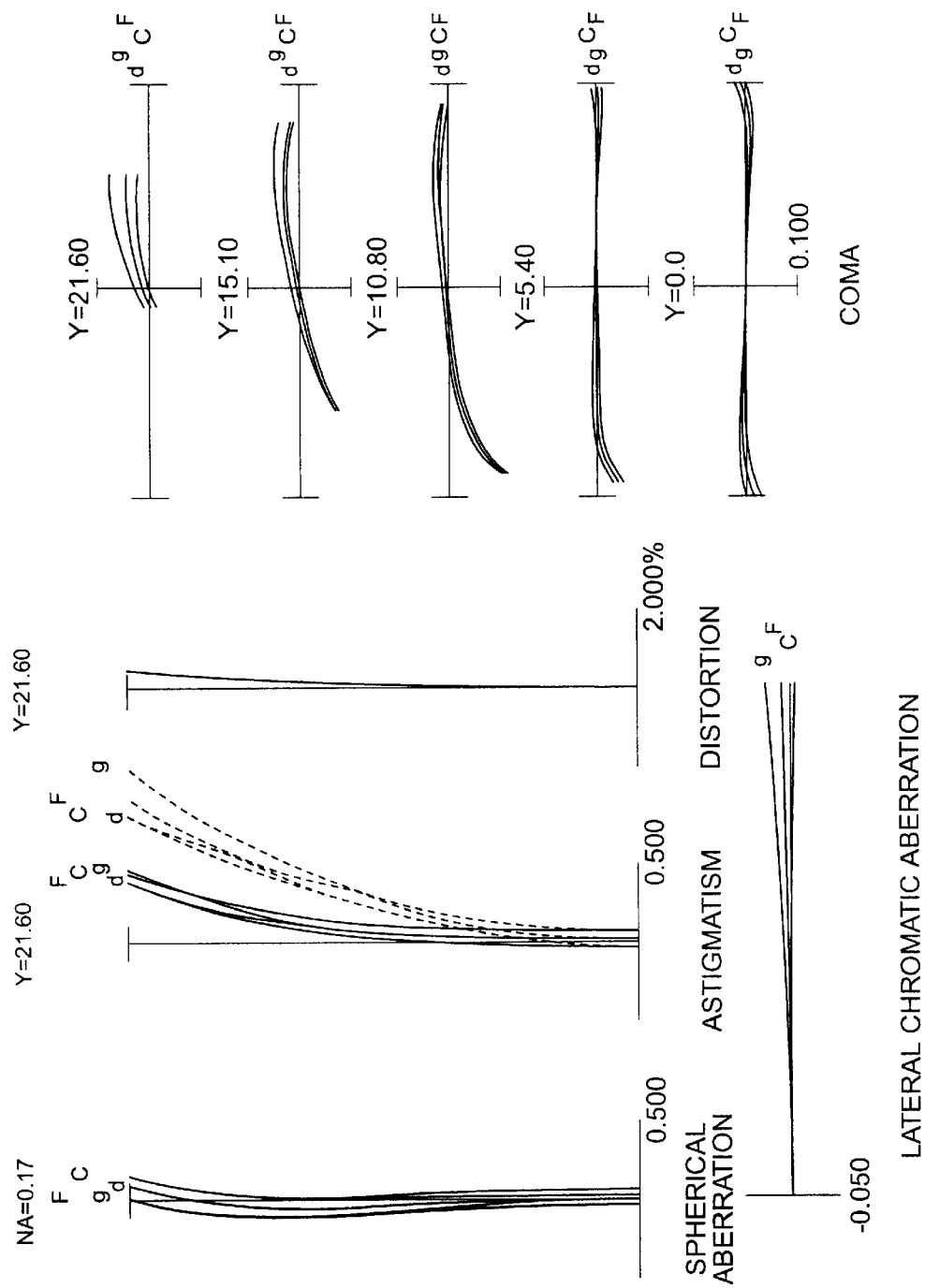
FIG. 41 graphically shows various aberrations of the zoom lens system according to Example 6 of the second embodiment in the intermediate focal length state when the system is focused at the closest focusing distance.
Figure 42:
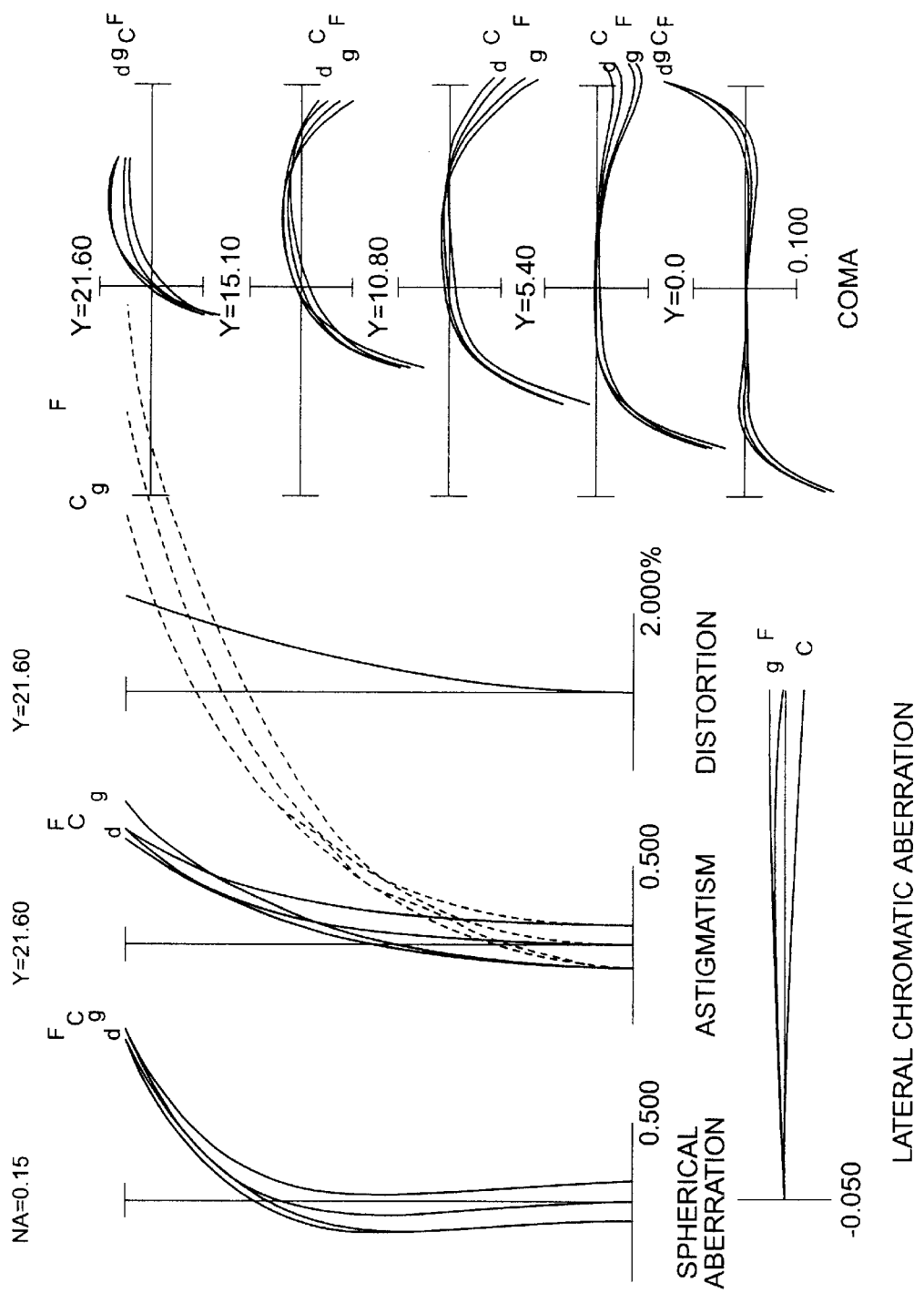
FIG. 42 graphically shows various aberrations of the zoom lens system according to Example 6 of the second embodiment in the telephoto end state when the system is focused at the closest focusing distance.

FIGS. 37, 38, 39 graphically show various aberrations of the zoom lens system according to Example 6 of the second embodiment in the wide-angle end state, the intermediate focal length state, and the telephoto end state, respectively, when the system is focused at infinity. FIGS. 40, 41, 42 graphically show various aberrations of the zoom lens system in the wide-angle end state, the intermediate focal length state, and the telephoto end state, respectively, when the system is focused at the closest focusing distance (R=1500 mm). As is apparent from the respective graphs showing various aberrations, excellent compensation is made for various aberrations.

EXAMPLE 7

Figure 43:
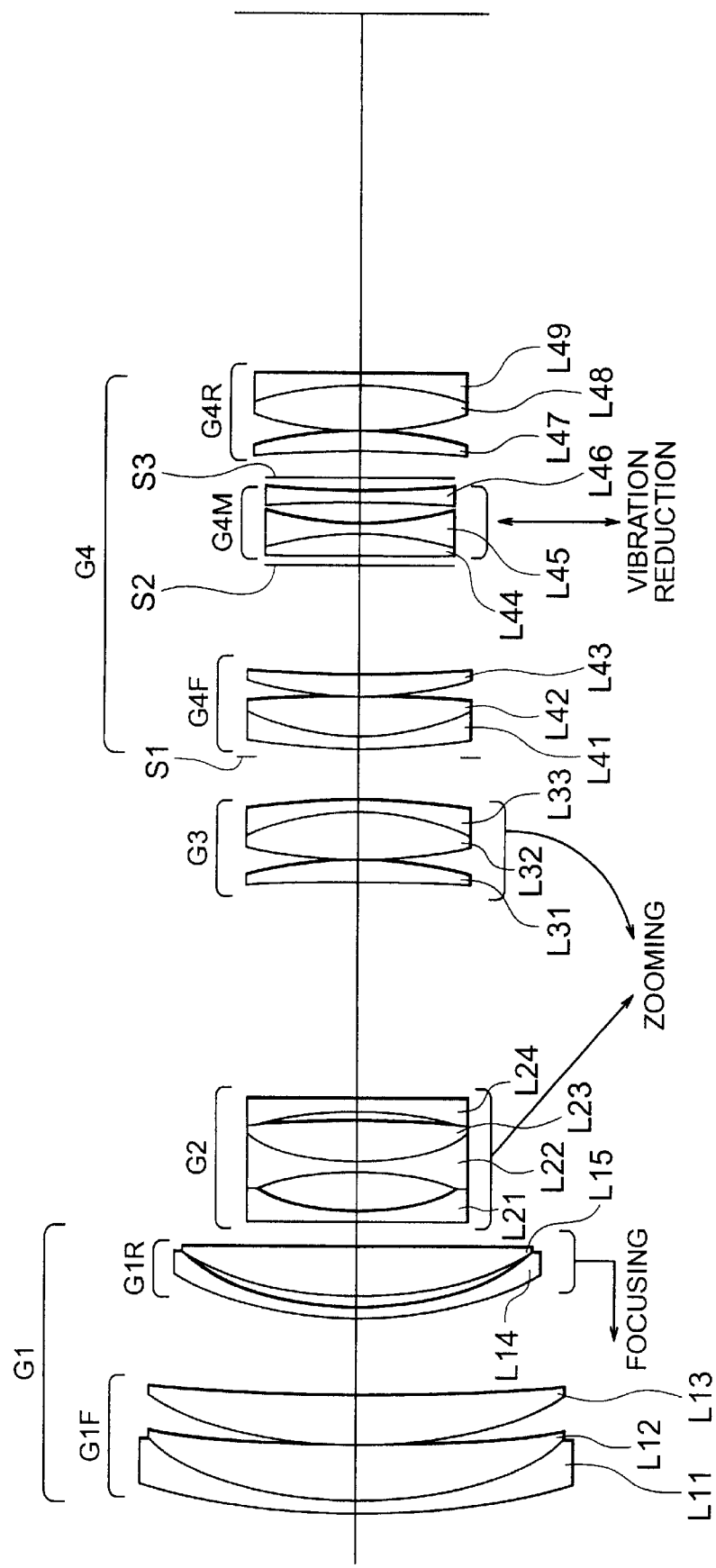
FIG. 43 is a diagram showing the lens arrangement of a large aperture internal focusing telephoto zoom lens system according to Example 7 of the second embodiment of the present invention.

FIG. 43 is a diagram showing the lens arrangement of a large aperture internal focusing telephoto zoom lens system according to Example 7 of the second embodiment of the present invention, together with the lens group positions in a wide-angle end state when the system is focused at infinity. The first lens group G1 is composed of, in order from the object, the front lens group G1F and the rear lens group G1R. The front lens group G1F is composed of, in order from the object, a cemented negative lens constructed by a negative meniscus lens L11 having a convex surface facing to the object cemented with a positive meniscus lens L12 having a convex surface facing to the object, and a positive meniscus lens L13 having a convex surface facing to the object. The rear lens group G1R is composed of, in order from the object, a negative meniscus lens L14 having a convex surface facing to the object, and a positive meniscus lens L15 having a convex surface facing to the object. The second lens group G2 is composed of, in order from the object, a double concave lens L21 having a stronger concave surface facing to the image, a cemented positive lens constructed by a double concave lens L22 cemented with a double convex lens L23, and a negative meniscus lens L24 having a concave surface facing to the object. The third lens group G3 is composed of, in order from the object, a positive meniscus lens L31 having a concave surface facing to the object, and a cemented positive lens constructed by a double convex lens L32 cemented with a negative meniscus lens L33 having a concave surface facing to the object. The fourth lens group G4 is composed of, in order from the object, a front group G4F having positive refractive power, a middle group G4M having negative refractive power, and a rear group G4R having positive refractive power. The front group G4F is composed of, in order from the object, an aperture stop S1, a cemented positive lens constructed by a negative meniscus lens L41 having a convex surface facing to the object cemented with a double convex lens L42, and a positive meniscus lens L43 having a convex surface facing to the object. The middle group G4M is composed of, in order from the object, a field stop S2 separated from the front group G4F by a wide air space, a cemented negative lens constructed by a double convex lens L44 cemented with a double concave lens L45, and a double concave lens L46. The rear group G4R is composed of, in order from the object, a field stop S3, a positive meniscus lens L47 having a concave surface facing to the object, a cemented positive lens constructed by a double convex lens L48 cemented with a negative meniscus lens L49 having a concave surface facing to the object.

Vibration reduction correction is carried out by varying the imaging position by means of shifting the middle group G4M in the fourth lens group G4 in the direction perpendicular to the optical axis.

Various values associated with Example 7 are listed in Table 7.

TABLE 7

(Specifications)

| F: | 71.40 | 194.00 mm |
|---|---|---|
| FNO: | 2.9 | |

(Lens Data)

| | r | d | ν | nd | Φ |
|---|---|---|---|---|---|
| 1) | 139.6382 | 2.2000 | 46.58 | 1.804000 | |
| 2) | 74.2467 | 9.0000 | 82.52 | 1.497820 | |
| 3) | 196.0979 | 0.1000 | | | |
| 4) | 76.8150 | 8.9000 | 82.52 | 1.497820 | |
| 5) | 367.2321 | (D5) | | | |
| 6) | 79.0596 | 1.8000 | 23.78 | 1.846660 | |
| 7) | 54.1997 | 1.3000 | | | |
| 8) | 60.8445 | 8.7000 | 52.30 | 1.748099 | |
| 9) | 791.8995 | (D9) | | | |
| 10) | −1010.8795 | 1.9000 | 52.67 | 1.741000 | |
| 11) | 34.1667 | 6.8180 | | | |
| 12) | −59.3436 | 1.8000 | 70.41 | 1.487490 | |
| 13) | 40.7956 | 7.0000 | 25.43 | 1.805180 | |
| 14) | −202.3053 | 1.8030 | | | |
| 15) | −66.5950 | 1.9000 | 39.59 | 1.804400 | |
| 16) | −23048.8880 | (D16) | | | |
| 17) | −788.1720 | 3.9000 | 82.52 | 1.497820 | |
| 18) | −80.6746 | 0.2000 | | | |
| 19) | 96.6251 | 8.0000 | 82.52 | 1.497820 | |
| 20) | −50.4196 | 2.0000 | 52.67 | 1.741000 | |
| 21) | −159.1747 | (D21) | | | |
| 22> | | 1.0000 | | Aperture Stop S1 | |
| 23) | 115.6456 | 2.0000 | 25.43 | 1.805180 | ΦG4 = 37.3 |
| 24) | 42.8355 | 7.0000 | 55.52 | 1.696800 | |
| 25) | −320.0918 | 0.1000 | | | |
| 26) | 76.1386 | 3.5000 | 65.47 | 1.603000 | |
| 27) | 151.7241 | 19.0000 | | | |
| 28) | | 1.6188 | | Field Stop S2 | |

TABLE 7-continued

| | | | | |
|---|---|---|---|---|
| 29) | 376.6169 | 3.8000 | 23.78 | 1.846660 |
| 30) | −57.8860 | 1.5000 | 52.67 | 1.741000 |
| 31) | 50.0430 | 3.9000 | | |
| 32) | −246.4873 | 1.5000 | 52.67 | 1.741000 |
| 33) | 102.2323 | 2.4093 | | |
| 34) | | 4.0000 | | Field Stop S3 |
| 35) | −281.5701 | 4.0000 | 82.52 | 1.497820 |
| 36) | −58.2122 | 0.1000 | | |
| 37) | 68.1486 | 7.5000 | 52.67 | 1.741000 |
| 38) | −63.4335 | 2.0000 | 23.78 | 1.846660 |
| 39) | −457.2580 | BF | | |

(Variable distance upon focusing and zooming)

| | Wide-angle | Middle | Telephoto |
|---|---|---|---|
| <Focused at infinity> | | | |
| F | 71.4000 | 105.0000 | 196.0000 |
| D0 | ∞ | ∞ | ∞ |
| D5 | 12.73394 | 12.73394 | 12.73394 |
| D9 | 4.19489 | 17.90766 | 31.47220 |
| D16 | 36.80605 | 27.14591 | 1.14149 |
| D21 | 7.79379 | 3.74115 | 16.18103 |
| BF | 66.05581 | 66.05581 | 66.05581 |
| <Focused at closest distance> | | | |
| β | −0.06059 | −0.08851 | −0.16521 |
| D0 | 1240.1664 | 1240.1664 | 1240.1664 |
| D5 | 3.07225 | 3.07225 | 3.07225 |
| D9 | 13.85658 | 27.56935 | 41.13389 |
| D16 | 36.80605 | 27.14591 | 1.14149 |
| D21 | 7.79379 | 3.74115 | 16.18103 |
| BF | 66.05581 | 66.05581 | 66.05581 |

(Values for Conditional Expressions)

<Various Values>

FW = 71.4000
FT = 196.0000
F1 = 98.7391
F1R = 151.7802
F2 = −30.0000
F23W = −195.1620
F23T = −56.7480
F4 = 110.8731
N15 = 1.748099
ν15 = 52.30
(5) $(F1 \times F4)/(|F23W| \times FW) = 0.786$
(6) $\nu15/(F1 \times F1R \times N15) = 2.00 \times 10^{-3}$
(7) $|F23T|/|F23W| = 0.291$
(8) $FW/(F1 \times |F2|) = 0.0241$ In Example 7, since the maximum diameter ΦG4 of the fourth lens group G4 is 37.3 mm, it can be said that the optical design is rather compact.

Figure 44:
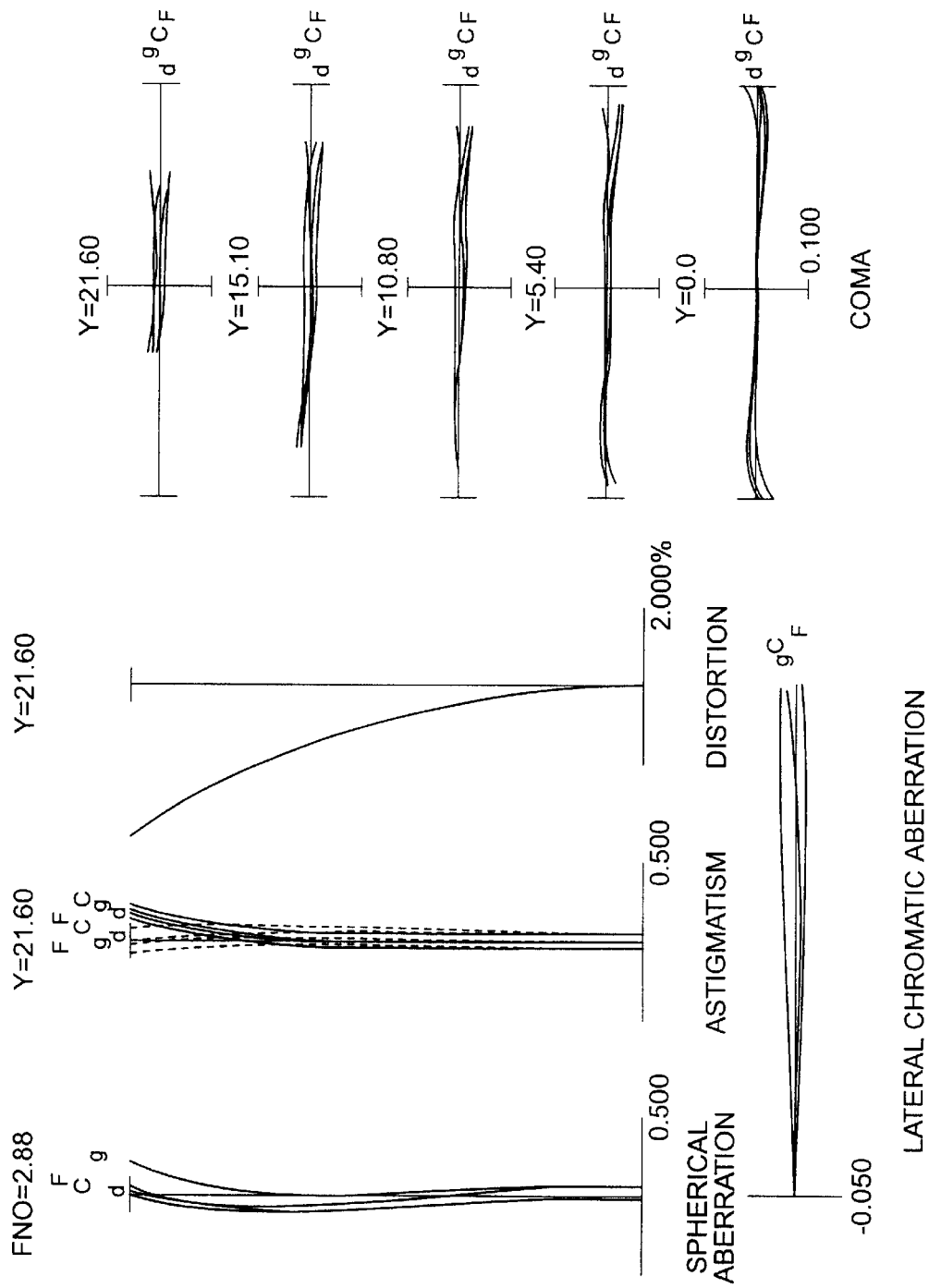
FIG. 44 graphically shows various aberrations of the zoom lens system according to Example 7 of the second embodiment in a wide-angle end state when the system is focused at infinity.
Figure 45:
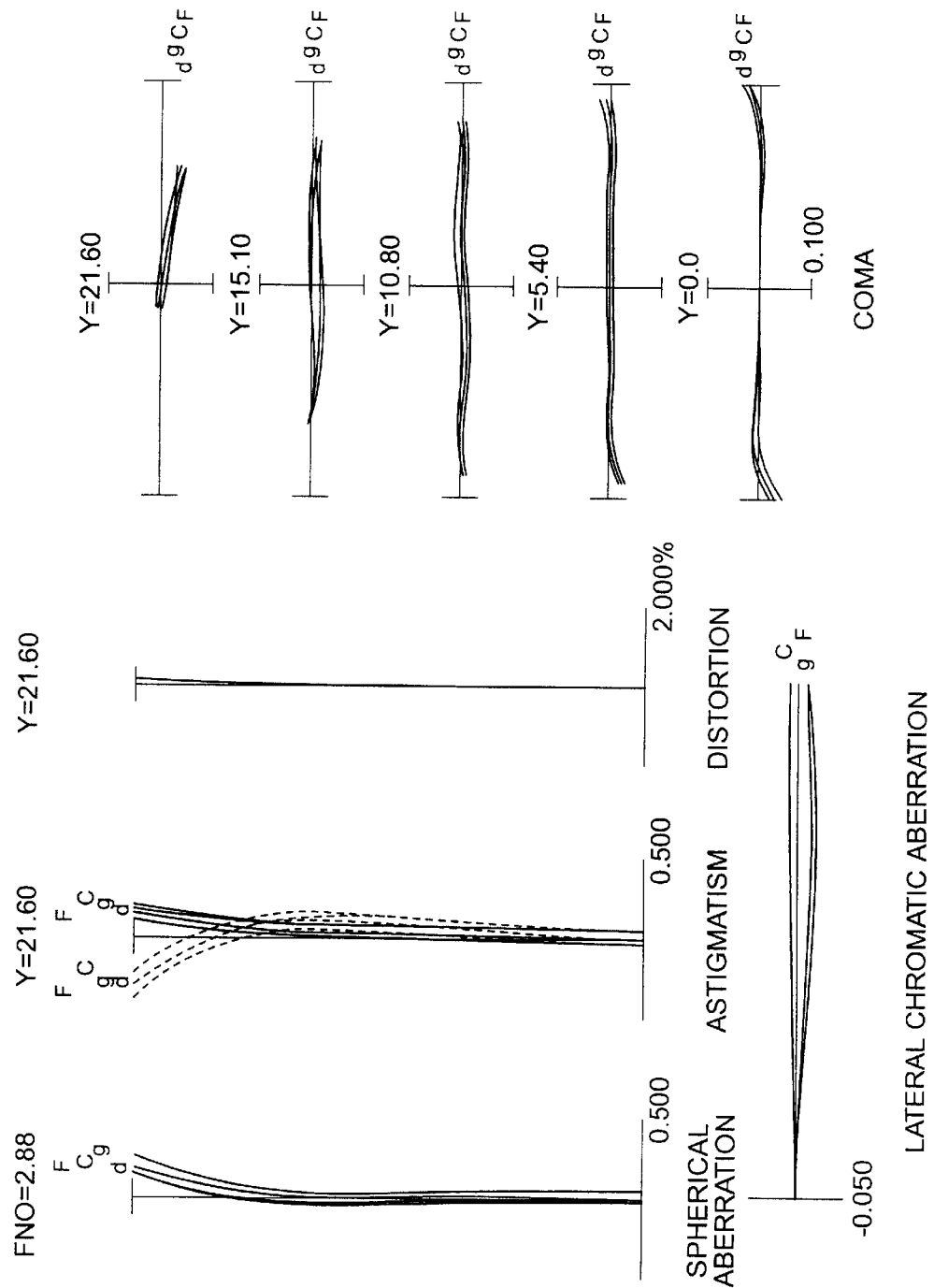
FIG. 45 graphically shows various aberrations of the zoom lens system according to Example 7 of the second embodiment in an intermediate focal length state when the system is focused at infinity.
Figure 46:
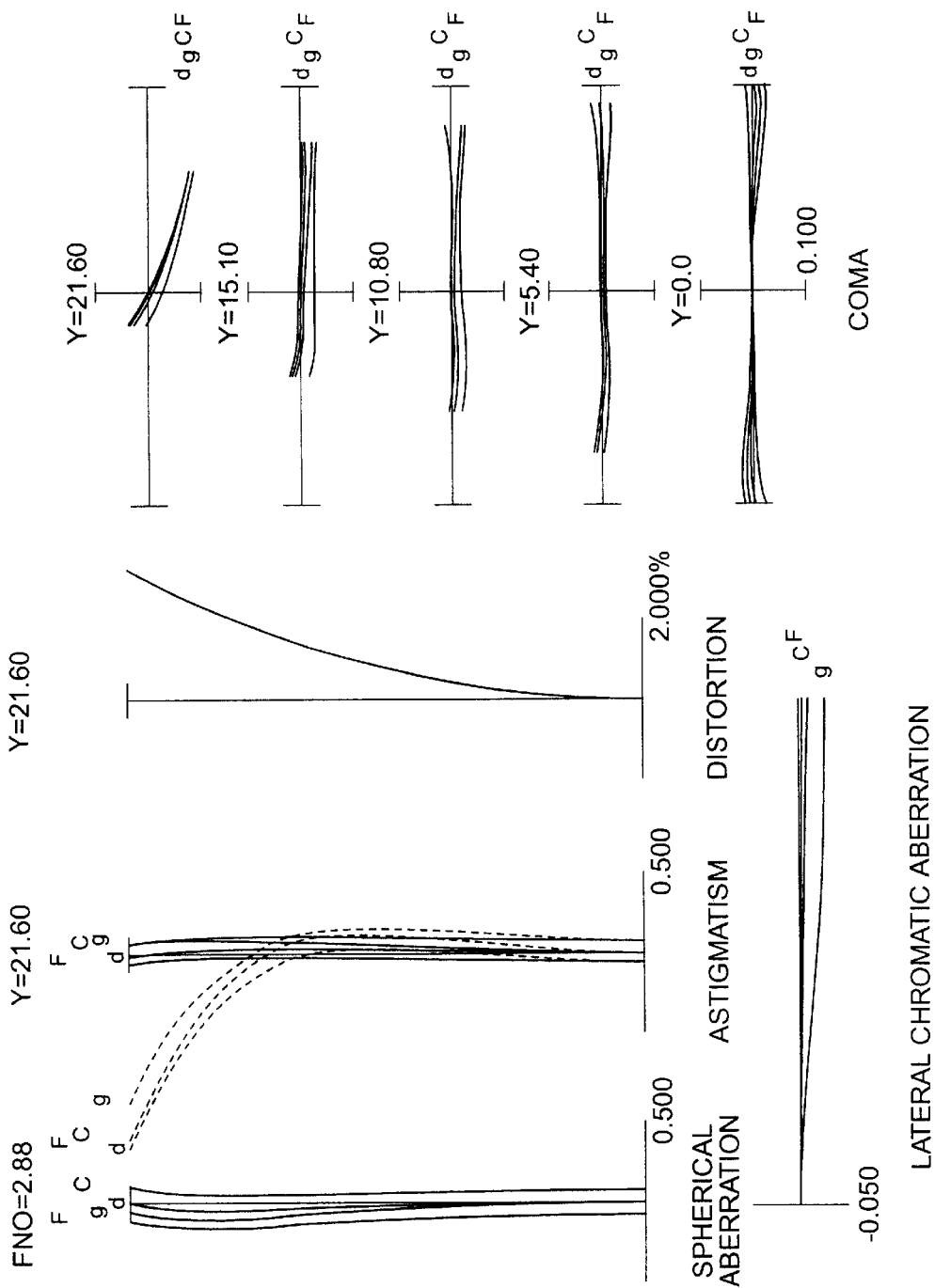
FIG. 46 graphically shows various aberrations of the zoom lens system according to Example 7 of the second embodiment in a telephoto end state when the system is focused at infinity.
Figure 47:
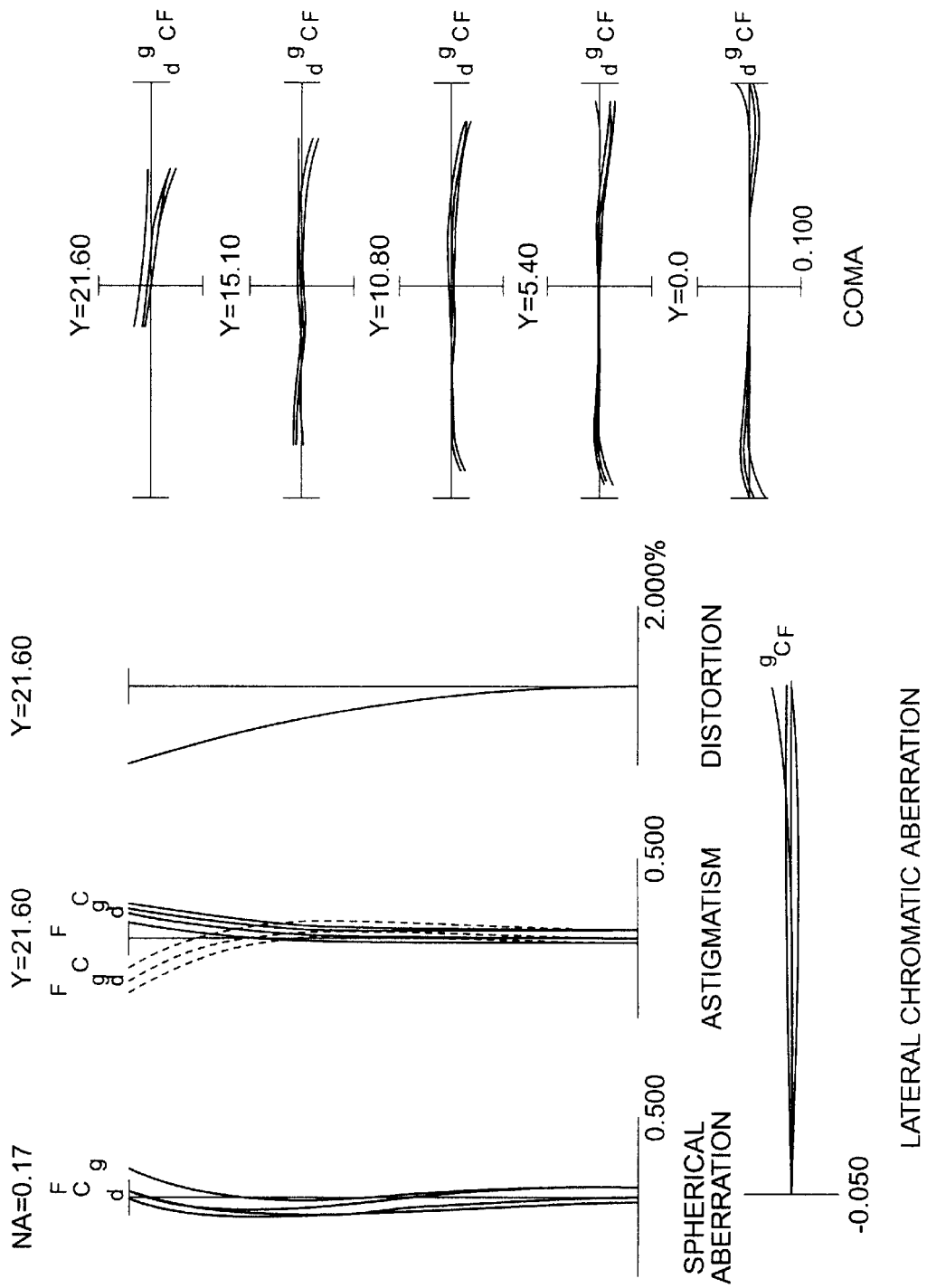
FIG. 47 graphically shows various aberrations of the zoom lens system according to Example 7 of the second embodiment in the wide-angle end state when the system is focused at the closest focusing distance.
Figure 48:
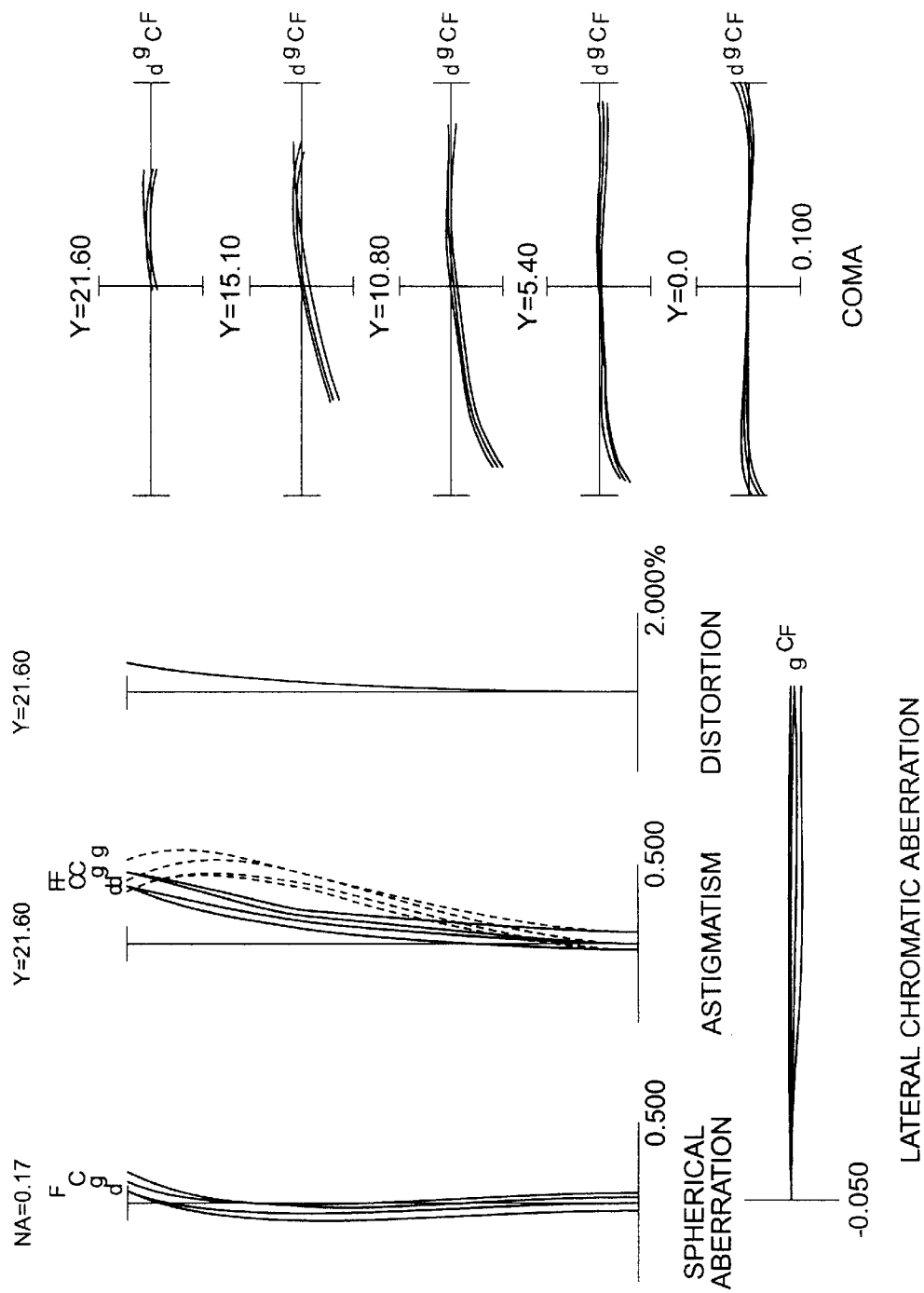
FIG. 48 graphically shows various aberrations of the zoom lens system according to Example 7 of the second embodiment in the intermediate focal length state when the system is focused at the closest focusing distance.
Figure 49:
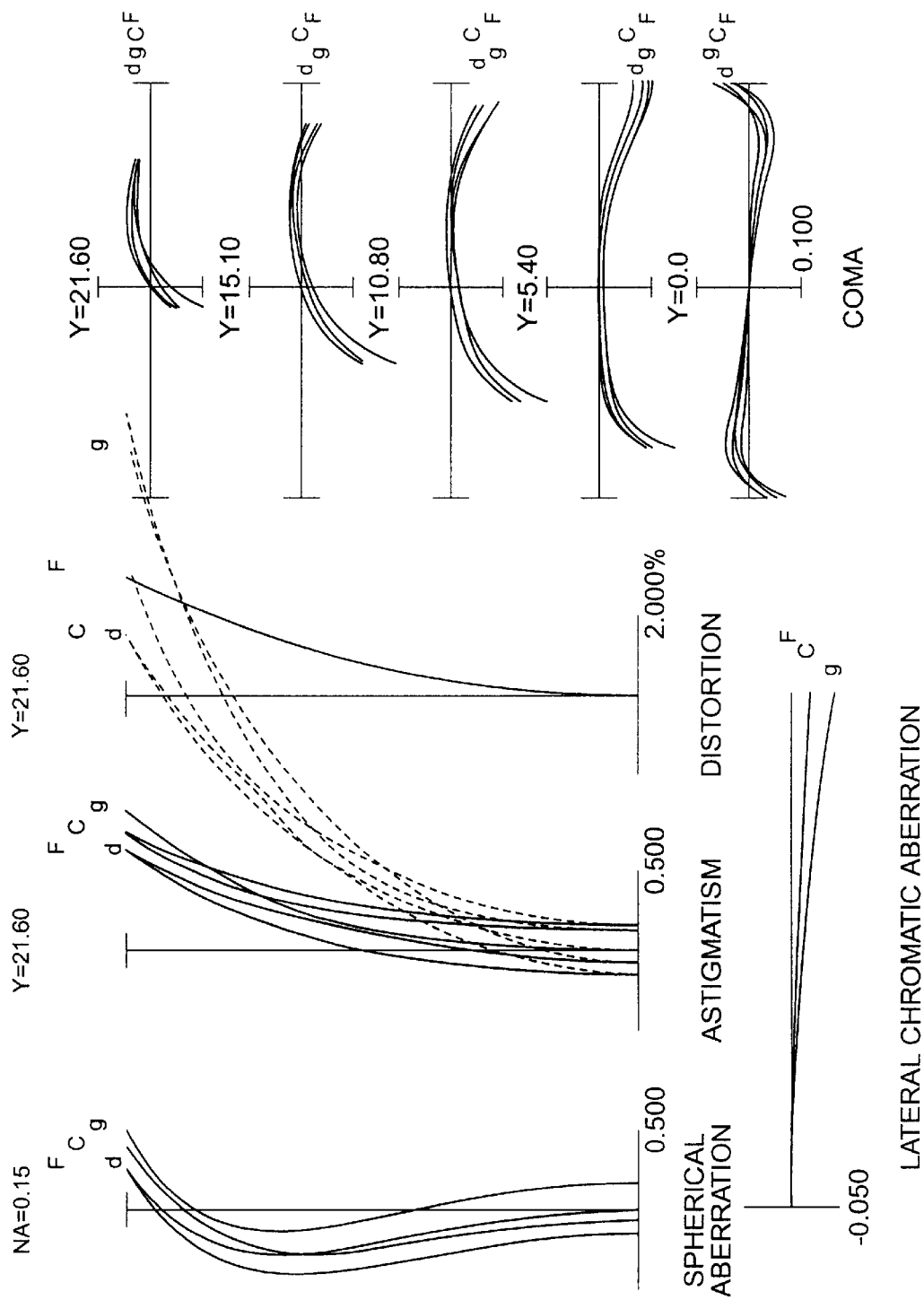
FIG. 49 graphically shows various aberrations of the zoom lens system according to Example 7 of the second embodiment in the telephoto end state when the system is focused at the closest focusing distance.

FIGS. 44, 45, 46 graphically show various aberrations of the zoom lens system according to Example 7 of the second embodiment in the wide-angle end state, the intermediate focal length state, and the telephoto end state, respectively, when the system is focused at infinity. FIGS. 47, 48, 49 graphically show various aberrations of the zoom lens system in the wide-angle end state, the intermediate focal length state, and the telephoto end state, respectively, when the system is focused at the closest focusing distance (R=1500 mm). As is apparent from the respective graphs showing various aberrations, excellent compensation is made for various aberrations.

EXAMPLE 8

Figure 50:
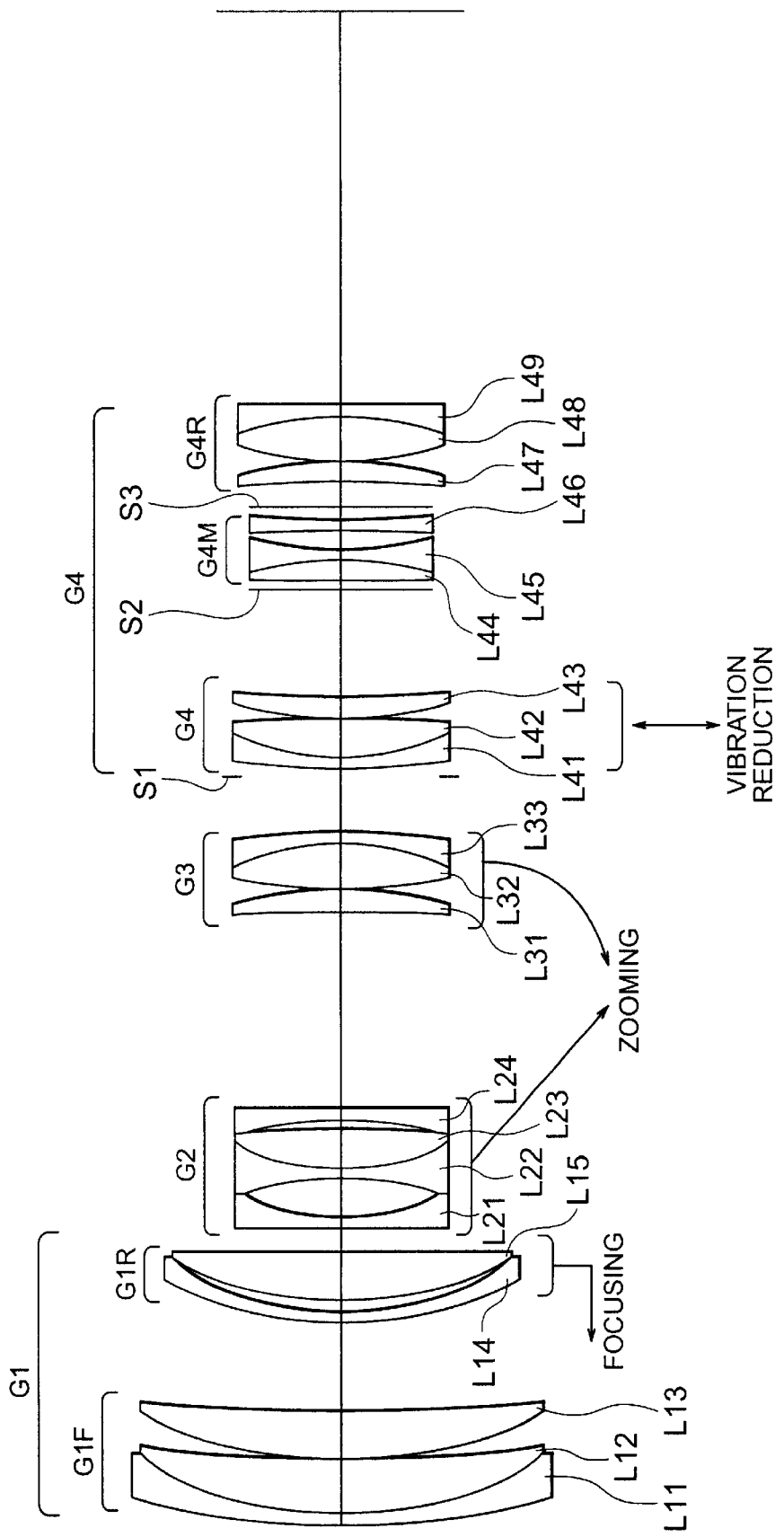
FIG. 50 is a diagram showing the lens arrangement of a large aperture internal focusing telephoto zoom lens system according to Example 8 of the second embodiment of the present invention.

FIG. 50 is a diagram showing the lens arrangement of a large aperture internal focusing telephoto zoom lens system according to Example 8 of the second embodiment of the present invention, together with the lens group positions in a wide-angle end state when the system is focused at infinity.

The first lens group G1 is composed of, in order from the object, the front lens group G1F and the rear lens group G1R. The front lens group G1F is composed of, in order from the object, a cemented negative lens constructed by a negative meniscus lens L11 having a convex surface facing to the object cemented with a positive meniscus lens L12 having a convex surface facing to the object, and a positive meniscus lens L13 having a convex surface facing to the object. The rear lens group G1R is composed of, in order from the object, a negative meniscus lens L14 having a convex surface facing to the object, and a positive meniscus lens L15 having a convex surface facing to the object.

The second lens group G2 is composed of, in order from the object, a double concave lens L21 having a stronger concave surface facing to the image, a cemented positive lens constructed by a double concave lens L22 cemented with a double convex lens L23, and a double concave lens L24 having a stronger concave surface facing to the object.

The third lens group G3 is composed of, in order from the object, a positive meniscus lens L31 having a concave surface facing to the object, and a cemented positive lens constructed by a double convex lens L32 cemented with a negative meniscus lens L33 having a concave surface facing to the object.

The fourth lens group G4 is composed of, in order from the object, a front group G4F having positive refractive power, a middle group G4M having negative refractive power, and a rear group G4R having positive refractive power. The front group G4F is composed of, in order from the object, an aperture stop S1, a cemented positive lens constructed by a negative meniscus lens L41 having a convex surface facing to the object cemented with a double convex lens L42, and a positive meniscus lens L43 having a convex surface facing to the object. The middle group G4M is composed of, in order from the object, a field stop S2 separated from the front group G4F by a wide air space, a cemented negative lens constructed by a double convex lens L44 cemented with a double concave lens L45, and a double concave lens L46. The rear group G4R is composed of, in order from the object, a field stop S3, a positive meniscus lens L47 having a concave surface facing to the object, a cemented positive lens constructed by a double convex lens L48 cemented with a negative meniscus lens L49 having a concave surface facing to the object.

Vibration reduction correction is carried out by varying the imaging position by means of shifting the front group G4F in the fourth lens group G4 in the direction perpendicular to the optical axis.

Various values associated with Example 8 are listed in Table 8.

TABLE 8

| (Specifications) | | |
|---|---|---|
| F: | 71.40 | 194.00 mm |
| FNO: | 2.9 | |

| (Lens Data) | | | | |
|---|---|---|---|---|
| | r | d | ν | nd | Φ |
| 1) | 142.2465 | 2.2000 | 46.58 | 1.804000 | |
| 2) | 67.3046 | 9.0000 | 82.52 | 1.497820 | |

TABLE 8-continued

| | | | | |
|---|---|---|---|---|
| 3) | 183.1425 | 0.1000 | | |
| 4) | 78.3549 | 8.9000 | 82.52 | 1.497820 |
| 5) | 662.0168 | (D5) | | |
| 6) | 69.1678 | 1.8000 | 23.78 | 1.846660 |
| 7) | 56.0679 | 1.9280 | | |
| 8) | 68.6795 | 8.7000 | 60.09 | 1.640000 |
| 9) | 1882.3507 | (D9) | | |
| 10) | −1576.2889 | 1.9000 | 52.67 | 1.741000 |
| 11) | 35.7885 | 6.8180 | | |
| 12) | −66.8389 | 1.8000 | 70.41 | 1.487490 |
| 13) | 39.0991 | 7.0000 | 25.43 | 1.805180 |
| 14) | −284.9403 | 1.8030 | | |
| 15) | −63.6184 | 1.9000 | 39.59 | 1.804400 |
| 16) | 533.2561 | (D16) | | |
| 17) | −736.6865 | 3.9000 | 82.52 | 1.497820 |
| 18) | −75.2359 | 0.2000 | | |
| 19) | 93.1518 | 8.0000 | 82.52 | 1.497820 |
| 20) | −48.4068 | 2.0000 | 52.67 | 1.741000 |
| 21) | −150.3566 | (D21) | | |
| 22> | | 1.0000 | | Aperture Stop S1 |
| 23) | 120.7563 | 2.0000 | 25.43 | 1.805180   ΦG4 = 39.2 |
| 24) | 46.4191 | 7.0000 | 55.52 | 1.696800 |
| 25) | −354.2982 | 0.1000 | | |
| 26) | 77.7663 | 3.5000 | 65.47 | 1.603000 |
| 27) | 158.5958 | 19.0000 | | |
| 28) | | 1.6292 | | Field Stop S2 |
| 29) | 376.6169 | 3.8000 | 23.78 | 1.846660 |
| 30) | −57.8860 | 1.5000 | 52.67 | 1.741000 |
| 31) | 50.0430 | 3.9000 | | |
| 32) | −246.4873 | 1.5000 | 52.67 | 1.741000 |
| 33) | 102.2323 | 2.7482 | | |
| 34) | | 4.0000 | | Field Stop S3 |
| 35) | −535.0275 | 4.0000 | 82.52 | 1.497820 |
| 36) | −59.3410 | 0.1000 | | |
| 37) | 67.9621 | 7.5000 | 52.67 | 1.741000 |
| 38) | −62.4776 | 2.0000 | 23.78 | 1.846660 |
| 39) | −736.2578 | BF | | |

(Variable distance upon focusing and zooming)

| | Wide-angle | Middle | Telephoto |
|---|---|---|---|
| <Focused at infinity> | | | |
| F | 71.4000 | 105.0000 | 196.0000 |
| D0 | ∞ | ∞ | ∞ |
| D5 | 6825 | 6825 | 6825 |
| D9 | 2.00532 | 18.23122 | 34.07520 |
| D16 | 34.71523 | 26.89757 | 5.89680 |
| D21 | 9.92541 | 1.51717 | 6.67396 |
| BF | 72.31687 | 72.31687 | 72.31687 |
| <Focused at closest distance> | | | |
| β | −0.06072 | −0.08922 | −0.16654 |
| D0 | 1233.0426 | 1233.0426 | 1233.0426 |
| D5 | 3.93048 | 3.93048 | 3.93048 |
| D9 | 12.84309 | 29.06899 | 44.91297 |
| D16 | 34.71523 | 26.89757 | 5.89680 |
| D21 | 9.92541 | 1.51717 | 6.67396 |
| BF | 72.31687 | 72.31687 | 72.31687 |

(Values for Conditional Expressions)

<Various Values>

FW = 71.4000
FT = 196.0000
F1 = 104.3678
F1R = 160.0000
F2 = −28.8496
F23W = −193.7940
F23T = −61.2706
F4 = 113.7910
N15 = 1.640000
ν15 = 60.09
(5) $(F1 \times F4)/(|F23W| \times FW) = 0.858$
(6) $\nu 15/(F1 \times F1R \times N15) = 2.19 \times 10^{-3}$
(7) $|F23T|/|F23W| = 0.316$
(8) $FW/(F1 \times |F2|) = 0.0237$ In Example 8, since the maximum diameter ΦG4 of the fourth lens group G4 is 39.2 mm, it can be said that the optical design is rather compact.

Figure 51:
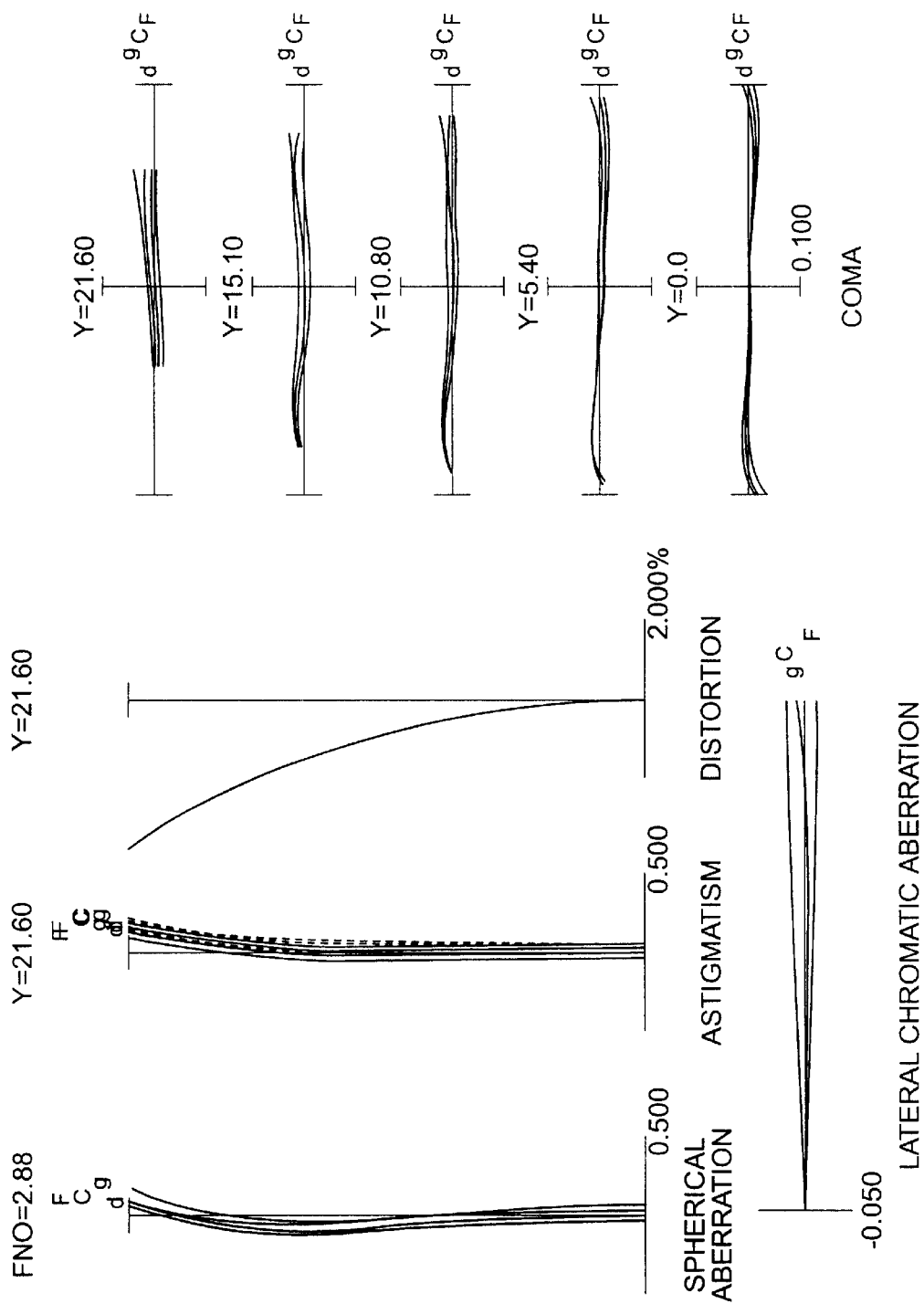
FIG. 51 graphically shows various aberrations of the zoom lens system according to Example 8 of the second embodiment in a wide-angle end state when the system is focused at infinity.
Figure 52:
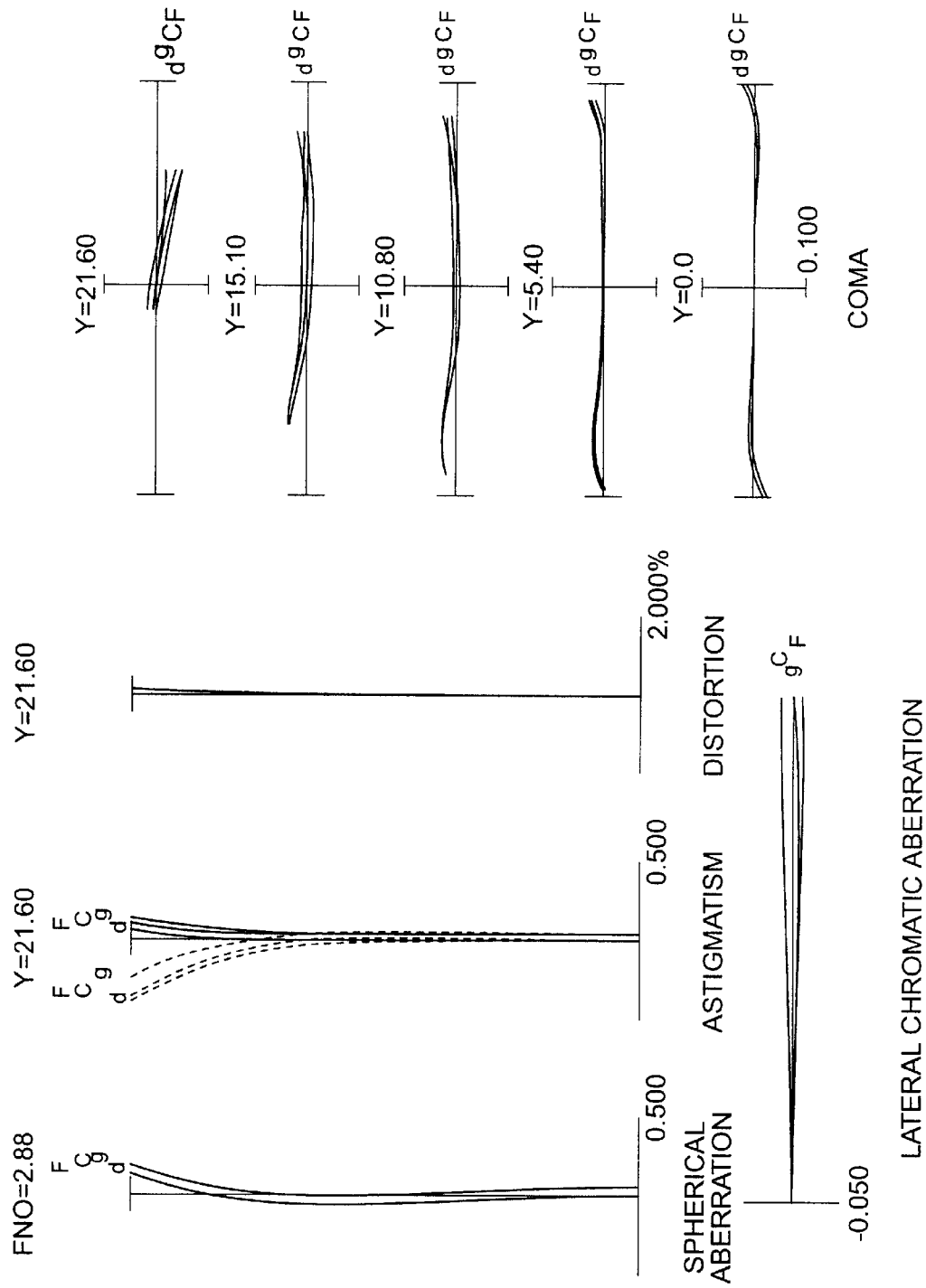
FIG. 52 graphically shows various aberrations of the zoom lens system according to Example 8 of the second embodiment in an intermediate focal length state when the system is focused at infinity.
Figure 53:
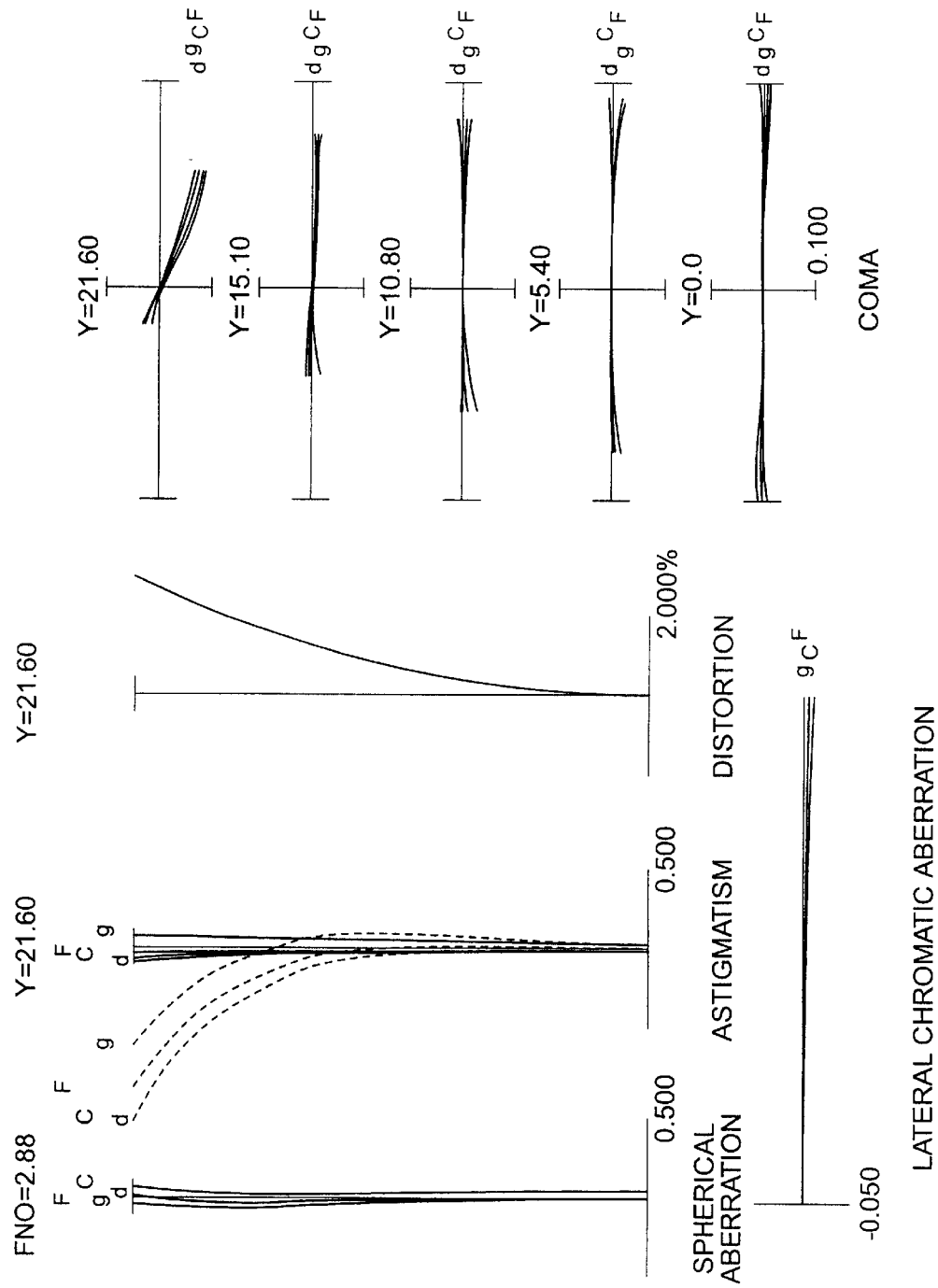
FIG. 53 graphically shows various aberrations of the zoom lens system according to Example 8 of the second embodiment in a telephoto end state when the system is focused at infinity.
Figure 54:
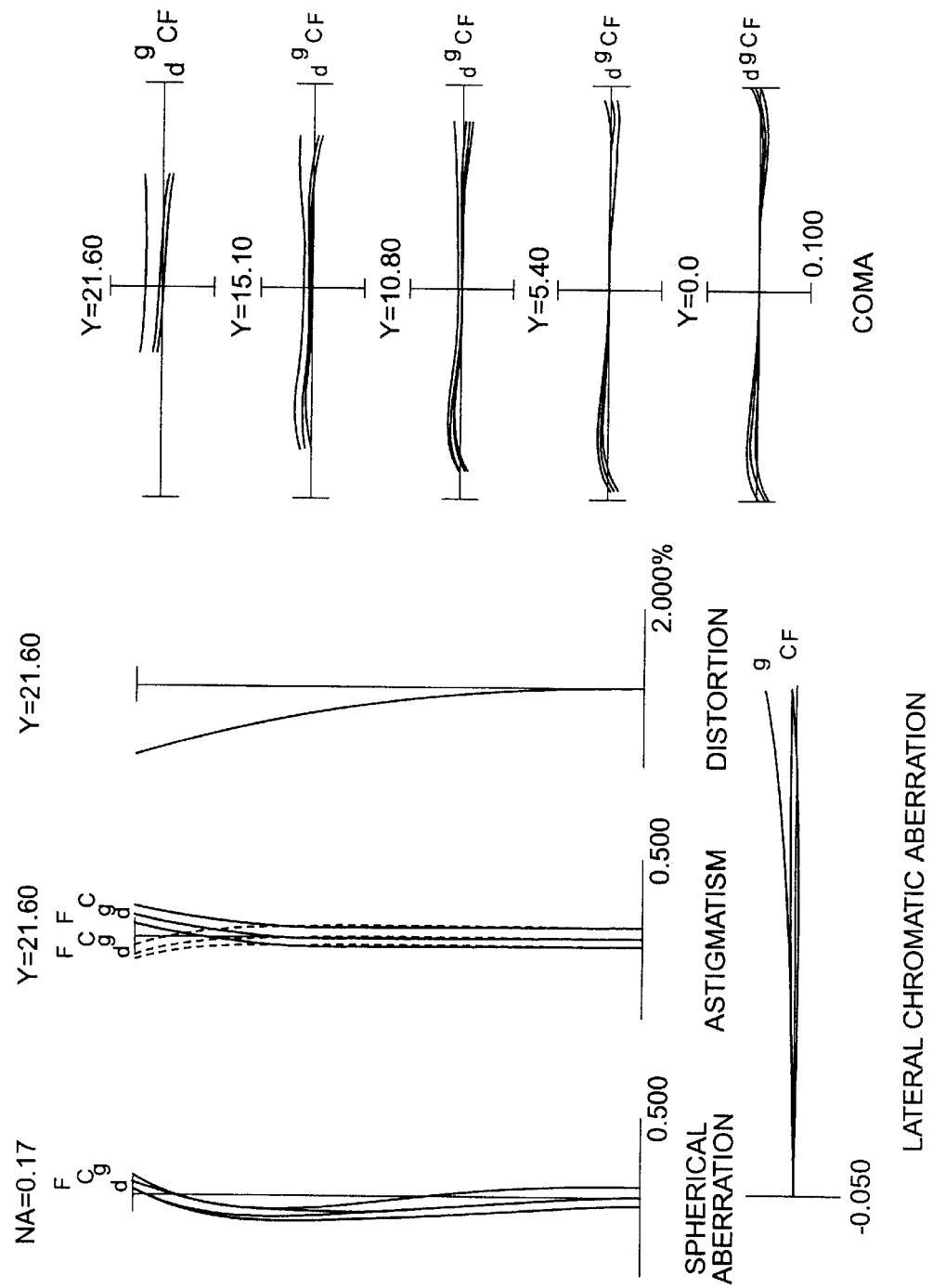
FIG. 54 graphically shows various aberrations of the zoom lens system according to Example 8 of the second embodiment in the wide-angle end state when the system is focused at the closest focusing distance.
Figure 55:
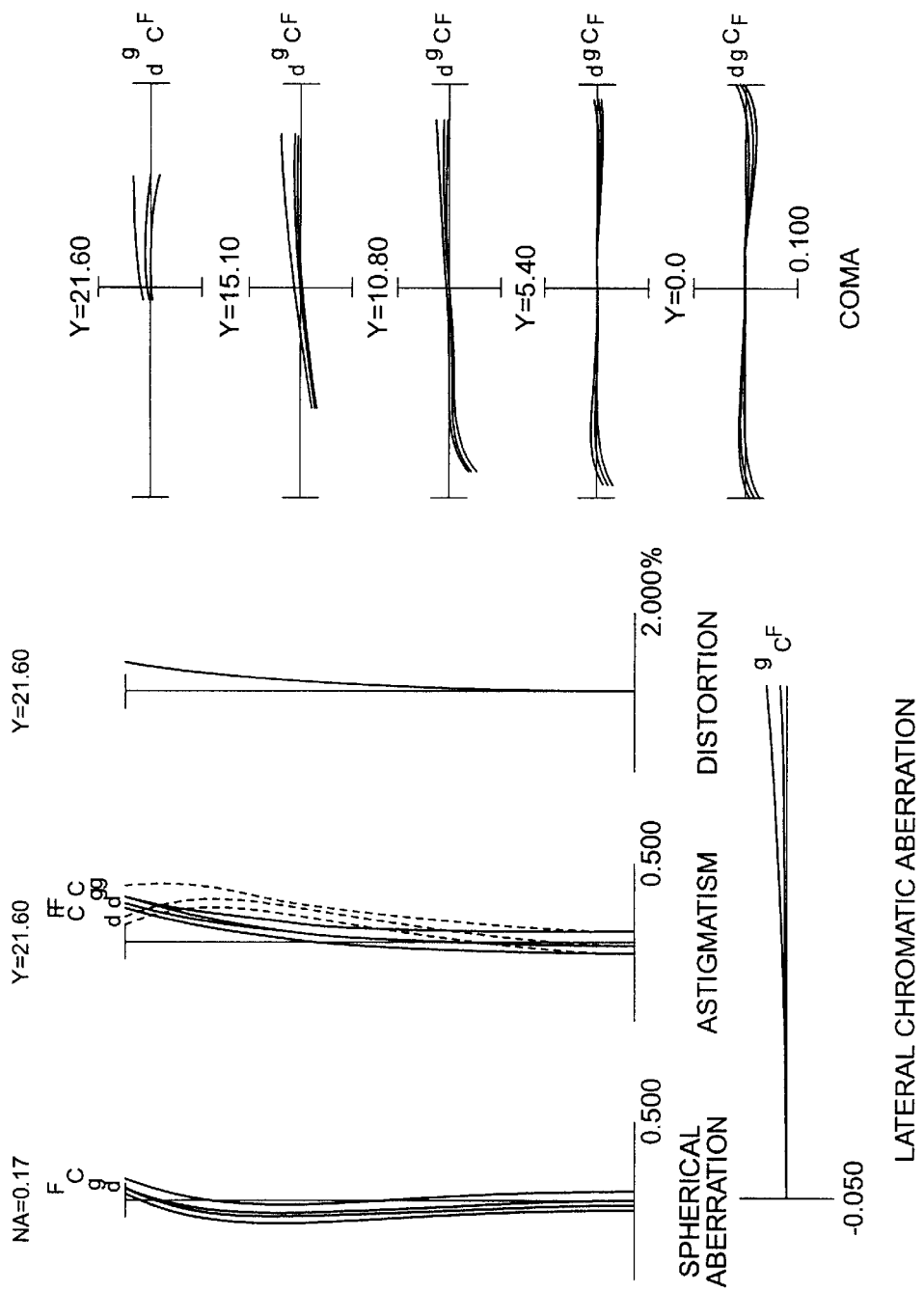
FIG. 55 graphically shows various aberrations of the zoom lens system according to Example 8 of the second embodiment in the intermediate focal length state when the system is focused at the closest focusing distance.
Figure 56:
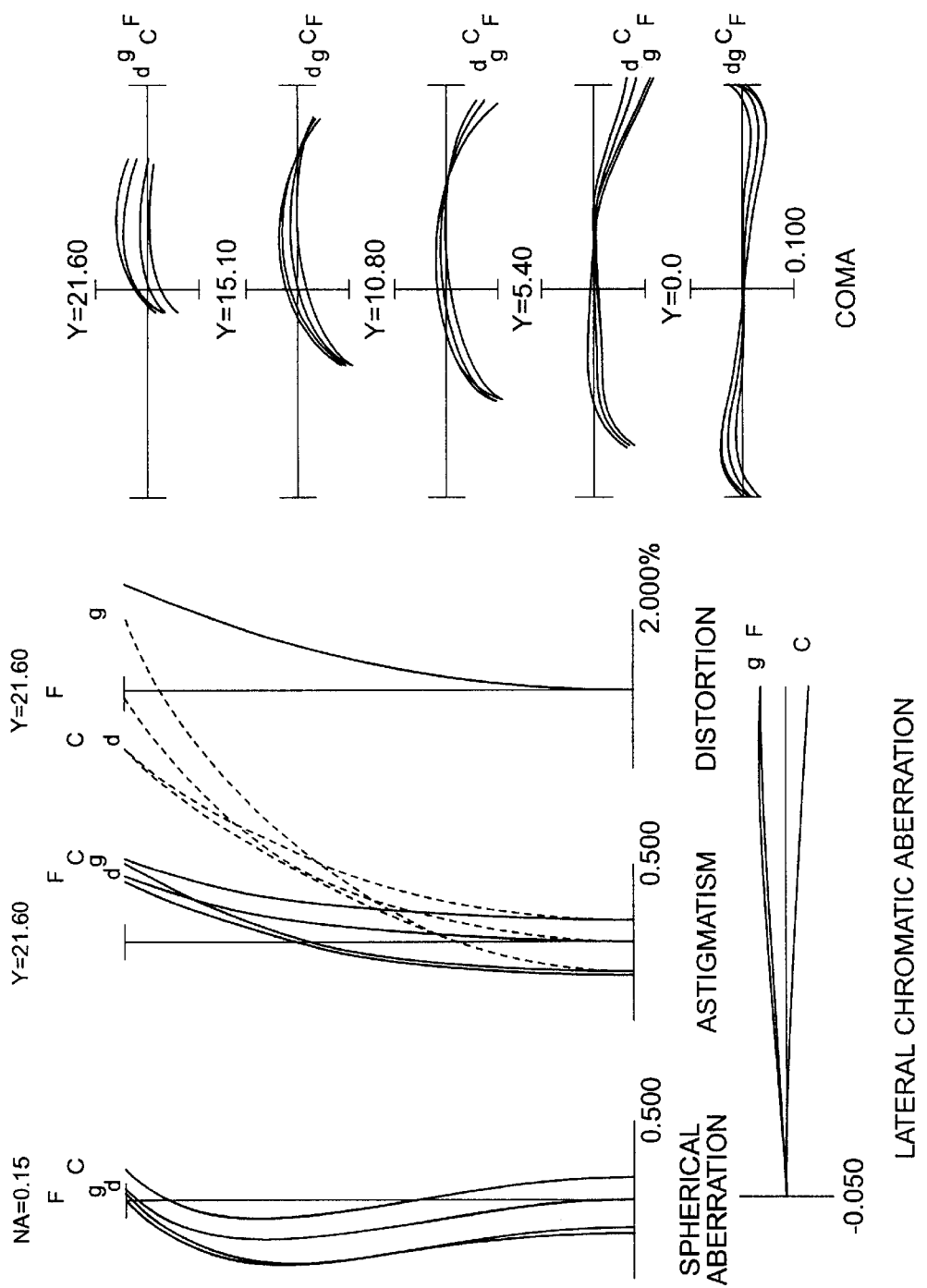
FIG. 56 graphically shows various aberrations of the zoom lens system according to Example 8 of the second embodiment in the telephoto end state when the system is focused at the closest focusing distance.

FIGS. 51, 52, 53 graphically show various aberrations of the zoom lens system according to Example 8 of the second embodiment in the wide-angle end state, the intermediate focal length state, and the telephoto end state, respectively, when the system is focused at infinity. FIGS. 54, 55, 56 graphically show various aberrations of the zoom lens system in the wide-angle end state, the intermediate focal length state, and the telephoto end state, respectively, when the system is focused at the closest focusing distance (R=1500 mm). As is apparent from the respective graphs showing various aberrations, excellent compensation is made for various aberrations.

As described above, the zoom lens system according to the present invention makes it possible to carry out vibration reduction correction with keeping good optical performance. Moreover, the zoom lens system according to the present invention makes it possible to keep superior optical performance when the system is focused at closest distance as well as focused at infinity. Furthermore, since the focusing lens group, the zooming lens group and the vibration reduction correction lens group are independent with each other, the zoom lens system can be made to have a simple mechanical structure, so that the system can be strong structure against a shock caused by vibration or a fall. Furthermore, the present invention makes it possible to provide a large aperture internal focusing telephoto zoom lens system having a relatively small thickness of a positive lens in the focusing lens group as a large aperture internal focusing telephoto zoom lens system, a light weight focusing lens group, the focal length in the wide-angle end state of 72 mm or less, that in the telephoto end state of 180 mm or more, the zoom ratio of about 2.7 or more, and the f-number of about three or less.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An afocal zoom lens system comprising, in order from an object:
   a first lens group having positive refractive power;
   a second lens group having negative refractive power;
   a third lens group having positive refractive power; and;
   a fourth lens group having positive refractive power;
   zooming being carried out by moving the second lens group and the third lens group along the optical axis;
   the fourth lens group being composed of, in order from the object;
   a front group having positive refractive power;

a middle group having negative refractive power; and a rear group having positive refractive power;

an imaging position being varied by shifting the middle group in the direction perpendicular to the optical axis; and the front group including a positive lens and a negative lens;

the middle group including a positive lens and two negative lenses; and the rear group including two positive lenses and a negative lens;

wherein the following conditional expression is satisfied;

$$0.70<|(F4\times F4M)/(F4F\times F4R)|<1.20$$

where F4 denotes the focal length of the fourth lens group, F4F denotes the focal length of the front group, F4M denotes the focal length of the middle group, and F4R denotes the focal length of the rear group.

2. The afocal zoom lens system according to claim 1, wherein the following conditional expression is satisfied;

$$0.008<F4/(F4F\times F4R\times Nd)<0.015$$

where Nd denotes the average refractive index at d-line of the lenses consisting of the middle group in the fourth lens group.

3. The afocal zoom lens system according to claim 2, wherein the following conditional expression is satisfied;

$$0.40<|(\Phi F\times F4R)/(F4\times\Phi M)|<0.80$$

where ΦF denotes the maximum effective diameter of the front group, and ΦM denotes the maximum effective diameter of the middle group.

4. The afocal zoom lens system according to claim 2, wherein the following conditional expression is satisfied;

$$0.70<|(FT\times F23T\times F4M)/(F1\times F4F\times F4R)|<1.20$$

where FT denotes the focal length of the zoom lens system in the telephoto end state, F1 denotes the focal length of the first lens group, and F23T denotes the composite focal length of the second lens group and the third lens group in the telephoto end state.

5. The afocal zoom lens system according to claim 2, wherein the front group is composed of two positive lenses and a negative lens, and the rear group is composed of two positive lenses and a negative lens.

6. The afocal zoom lens system according to claim 2, wherein the first lens group having positive refractive power is composed of a front lens group fixed along the optical axis and a rear lens group movable along the optical axis, and wherein focusing is carried out by moving the rear lens group along the optical axis.

7. The afocal zoom lens system according to claim 1, wherein the following conditional expression is satisfied;

$$0.40<|(\Phi F\times F4R)/(F4\times\Phi M)|<0.80$$

where ΦF denotes the maximum effective diameter of the front group, and ΦM denotes the maximum effective diameter of the middle group.

8. The afocal zoom lens system according to claim 7, wherein the following conditional expression is satisfied;

$$0.70<|(FT\times F23T\times F4M)/(F1\times F4F\times F4R)|<1.20$$

where FT denotes the focal length of the zoom lens system in the telephoto end state, F1 denotes the focal length of the first lens group, and F23T denotes the composite focal length of the second lens group and the third lens group in the telephoto end state.

9. The afocal zoom lens system according to claim 7, wherein the front group is composed of two positive lenses and a negative lens, and the rear group is composed of two positive lenses and a negative lens.

10. The afocal zoom lens system according to claim 7, wherein the first lens group having positive refractive power is composed of a front lens group fixed along the optical axis and a rear lens group movable along the optical axis, and wherein focusing is carried out by moving the rear lens group along the optical axis.

11. The afocal zoom lens system according to claim 1, wherein the following conditional expression is satisfied;

$$0.70<|(FT\times F23T\times F4M)/(F1\times F4F\times F4R)|<1.20$$

where FT denotes the focal length of the zoom lens system in the telephoto end state, F1 denotes the focal length of the first lens group, and F23T denotes the composite focal length of the second lens group and the third lens group in the telephoto end state.

12. The afocal zoom lens system according to claim 11, wherein the front group is composed of two positive lenses and a negative lens, and the rear group is composed of two positive lenses and a negative lens.

13. The afocal zoom lens system according to claim 11, wherein the first lens group having positive refractive power is composed of a front lens group fixed along the optical axis and a rear lens group movable along the optical axis, and wherein focusing is carried out by moving the rear lens group along the optical axis.

14. The afocal zoom lens system according to claim 1, wherein the front group is composed of two positive lenses and a negative lens, and the rear group is composed of two positive lenses and a negative lens.

15. The afocal zoom lens system according to claim 14, wherein the first lens group having positive refractive power is composed of a front lens group fixed along the optical axis and a rear lens group movable along the optical axis, and wherein focusing is carried out by moving the rear lens group along the optical axis.

16. The afocal zoom lens system according to claim 1, wherein the first lens group having positive refractive power is composed of a front lens group fixed along the optical axis and a rear lens group movable along the optical axis, and wherein focusing is carried out by moving the rear lens group along the optical axis.

17. A zoom lens system comprising, in order from an object;

a first lens group having positive refractive power;

a second lens group having negative refractive power;

a third lens group having positive refractive power; and;

a fourth lens group having positive refractive power;

zooming being carried out by moving the second lens group and the third lens group along the optical axis;

the first lens group being composed of, in order from the object;

a front lens group having positive refractive power; and a rear lens group having stronger positive refractive power than that of the front lens group;

focusing being carried out by moving the rear lens group along the optical axis;

the front lens group being composed of, in order from the object;

a negative meniscus lens having a convex surface facing to the object;

a positive lens having a convex surface facing to the object; and a positive lens having a convex surface facing to the object;

the rear lens group being composed of, in order from the object;

a negative meniscus lens having a convex surface facing to the object; and a positive lens;

and wherein the following conditional expressions are satisfied;

$$0.5<(F1\times F4)/(|F23W|\times FW)<1.2$$

$$1.0\times10^{-3}<v15/(F1\times F1R\times N15)<2.6\times10^{-3}$$

where FW denotes the focal length of the zoom lens system in the wide-angle end state, F1 denotes the focal length of the first lens group, F1R denotes the focal length of the rear lens group of the first lens group, N15 denotes the refractive index of the positive lens in the rear lens group at d-line, v15 denotes Abbe number of the positive lens in the rear lens group, F23W denotes the composite focal length of the second lens group and the third lens group in the wide-angle end states, F4 denotes the focal length of the fourth lens group.

18. The zoom lens system according to claim 17, wherein the following conditional expression is satisfied;

$$0.10<|F23T|/|F23W|<0.45$$

where F23T denotes the composite focal length of the second lens group and the third lens group in the telephoto end state.

19. The zoom lens system according to claim 18, wherein the following conditional expression is satisfied;

$$0.015<FW/(F1\times|F2|)<0.028$$

where F2 denotes the focal length of the second lens group.

20. The zoom lens system according to claim 17, wherein the following conditional expression is satisfied;

$$0.015<FW/(F1\times|F2|)<0.028$$

where F2 denotes the focal length of the second lens group.

* * * * *